(12) United States Patent
Takami et al.

(10) Patent No.: US 9,778,596 B2
(45) Date of Patent: Oct. 3, 2017

(54) TONER CONTAINER AND IMAGE FORMING APPARATUS INCLUDING A SHUTTER HAVING EXTENSION

(71) Applicants: Nobuo Takami, Kanagawa (JP); Noriyuki Kimura, Kanagawa (JP); Eisuke Hori, Tokyo (JP); Hideki Kimura, Kanagawa (JP); Kenji Kikuchi, Kanagawa (JP); Yuji Suzuki, Tokyo (JP)

(72) Inventors: Nobuo Takami, Kanagawa (JP); Noriyuki Kimura, Kanagawa (JP); Eisuke Hori, Tokyo (JP); Hideki Kimura, Kanagawa (JP); Kenji Kikuchi, Kanagawa (JP); Yuji Suzuki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/379,985

(22) Filed: Dec. 15, 2016

(65) Prior Publication Data

US 2017/0097586 A1   Apr. 6, 2017

Related U.S. Application Data

(60) Division of application No. 15/075,810, filed on Mar. 21, 2016, now Pat. No. 9,541,862, which is a division
(Continued)

(30) Foreign Application Priority Data

Mar. 10, 2010  (JP) .................................. 2010-052607
Mar. 10, 2010  (JP) .................................. 2010-052640
(Continued)

(51) Int. Cl.
*G03G 15/08*   (2006.01)

(52) U.S. Cl.
CPC ..... *G03G 15/0886* (2013.01); *G03G 15/0872* (2013.01); *G03G 2215/0692* (2013.01)

(58) Field of Classification Search
CPC ........... G03G 15/0886; G03G 15/0836; G03G 15/0837; G03G 15/087; G03G 15/0872;
(Continued)

(56) References Cited

U.S. PATENT DOCUMENTS

| 4,949,123 A | 8/1990 | Takashima |
| 5,331,382 A | 7/1994 | Miura et al. |

(Continued)

FOREIGN PATENT DOCUMENTS

| JP | 1-129273 A | 5/1989 |
| JP | 1-130159 U | 9/1989 |

(Continued)

OTHER PUBLICATIONS

International Search Report dated Apr. 19, 2011, issued for International Application No. PCT/JP2011/056129, filed on Mar. 9, 2011 (English).
(Continued)

*Primary Examiner* — Robert Beatty
(74) *Attorney, Agent, or Firm* — Oblon, McClelland, Maier & Neustadt, L.L.P.

(57) ABSTRACT

A system with a container including a protrusion, and a receiver to receive the container. The receiver includes a slide block that is movable relative to a body of the receiver, the slide block including two surfaces, a first surface, initially contacted by the protrusion of the container during insertion of the container into the receiver, having a first slope to resist movement of the container towards the receiver, and a second surface, subsequently contacted by the protrusion of the container during the insertion of the container into the receiver, having a second slope to interact
(Continued)

with the protrusion of the container to assist movement of the container towards the receiver. This construction provides the user with a changing insertion force to indicate proper mounting of the container.

17 Claims, 36 Drawing Sheets

Related U.S. Application Data of application No. 14/807,288, filed on Jul. 23, 2015, now Pat. No. 9,329,529, which is a division of application No. 14/522,217, filed on Oct. 23, 2014, now Pat. No. 9,128,415, which is a division of application No. 13/434,096, filed on Mar. 29, 2012, now Pat. No. 8,929,779, which is a continuation of application No. PCT/JP2011/056129, filed on Mar. 9, 2011.

(30) Foreign Application Priority Data

| Date | | Number |
|---|---|---|
| Mar. 10, 2010 | (JP) | 2010-052751 |
| Jun. 11, 2010 | (JP) | 2010-134313 |
| Jun. 11, 2010 | (JP) | 2010-134320 |
| Jun. 11, 2010 | (JP) | 2010-134332 |
| Jan. 20, 2011 | (JP) | 2011-010008 |
| Jan. 20, 2011 | (JP) | 2011-010106 |
| Jan. 20, 2011 | (JP) | 2011-010172 |

(58) Field of Classification Search
CPC ... G03G 2215/0692; G03G 2215/0663; G03G 2215/0665; G03G 2215/0668
USPC ............ 399/258, 262; 222/167, 412, DIG. 1
See application file for complete search history.

(56) References Cited

U.S. PATENT DOCUMENTS

| | | | |
|---|---|---|---|
| 5,565,973 A | 10/1996 | Fujishiro et al. | |
| 5,614,996 A | 3/1997 | Tanda | |
| 5,812,914 A * | 9/1998 | Johroku | G03G 15/0855 399/252 |
| 6,751,431 B2 | 6/2004 | Ichikawa et al. | |
| 6,826,381 B2 | 11/2004 | Muramatsu et al. | |
| 6,882,817 B2 | 4/2005 | Kita | |
| 7,149,462 B2 | 12/2006 | Kawamura et al. | |
| 7,248,824 B2 | 7/2007 | Takami | |
| 7,313,349 B2 | 12/2007 | Suzuki et al. | |
| 7,389,071 B2 | 6/2008 | Katsuyama et al. | |
| 7,457,564 B2 | 11/2008 | Takami | |
| 7,480,476 B2 | 1/2009 | Hosokawa et al. | |
| 7,515,855 B2 | 4/2009 | Katsuyama et al. | |
| 7,590,374 B2 | 9/2009 | Takami | |
| 7,620,349 B2 | 11/2009 | Katsuyama | |
| 7,720,416 B2 | 5/2010 | Taguchi et al. | |
| 7,734,230 B2 | 6/2010 | Takami | |
| 7,787,784 B2 | 8/2010 | Hori | |
| 7,826,777 B2 | 11/2010 | Taguchi et al. | |
| 8,213,841 B2 * | 7/2012 | Kitagawa | G03G 15/0875 220/345.2 |
| 8,649,713 B2 | 2/2014 | Hori et al. | |
| 8,792,809 B2 | 7/2014 | Kenji et al. | |
| 8,909,093 B2 | 12/2014 | Kenji et al. | |
| 8,929,779 B2 * | 1/2015 | Takami | G03G 15/0886 399/262 |
| 9,128,415 B2 * | 9/2015 | Takami | G03G 15/0886 |
| 9,329,529 B2 * | 5/2016 | Takami | G03G 15/0886 |
| 9,541,862 B2 * | 1/2017 | Takami | G03G 15/0886 |
| 2006/0104673 A1 | 5/2006 | Sasae et al. | |
| 2006/0182469 A1 | 8/2006 | Koyama et al. | |
| 2007/0048029 A1 | 3/2007 | Takuwa | |
| 2008/0013983 A1 | 1/2008 | Mihara | |
| 2009/0103955 A1 | 4/2009 | Takuwa | |
| 2009/0238608 A1 * | 9/2009 | Murase | G03G 15/0868 399/262 |
| 2010/0003055 A1 | 1/2010 | Kikuchi et al. | |
| 2010/0034557 A1 | 2/2010 | Arai et al. | |
| 2010/0129118 A1 | 5/2010 | Kimura et al. | |
| 2010/0166460 A1 * | 7/2010 | Maeshima | G03G 15/0868 399/119 |
| 2014/0119780 A1 | 5/2014 | Hori et al. | |
| 2014/0294435 A1 | 10/2014 | Kikuchi et al. | |

FOREIGN PATENT DOCUMENTS

| | | | |
|---|---|---|---|
| JP | 04-001681 | 1/1992 | |
| JP | 7-20705 | 1/1995 | |
| JP | 07-168430 A | 7/1995 | |
| JP | 8-62979 A | 3/1996 | |
| JP | EP 0843233 A2 * | 5/1998 | ......... G03G 15/0875 |
| JP | 2000-062970 A | 2/2000 | |
| JP | 2002-162819 A | 6/2002 | |
| JP | EP 1211570 A2 * | 6/2002 | ......... G03G 15/0875 |
| JP | 2002-268344 A | 9/2002 | |
| JP | 2002-351203 A | 12/2002 | |
| JP | 2004-101789 A | 4/2004 | |
| JP | 2005-107141 A | 4/2005 | |
| JP | 2006-71762 A | 3/2006 | |
| JP | 2006-072166 A | 3/2006 | |
| JP | 2006-139070 A | 6/2006 | |
| JP | 2006-221079 A | 8/2006 | |
| JP | 2006-350229 A | 12/2006 | |
| JP | 2007-065368 A | 3/2007 | |
| JP | 2007-65368 A | 3/2007 | |
| JP | 2007-65613 A | 3/2007 | |
| JP | 2007-148006 | 6/2007 | |
| JP | 2008-020679 A | 1/2008 | |
| JP | 2010-020343 A | 1/2010 | |

OTHER PUBLICATIONS

International Written Opinion dated Apr. 19, 2011, issued for International Application No. PCT/JP2011/056129, filed on Mar. 9, 2011 (English).

Office Action dated Jan. 9, 2015 in Japanese Patent Application No. 2011 010172.

Combined Chinese Office Action and Search Report issued Feb. 17, 2015 in Patent Application No. 201180023248.4 (with English language translation).

Japanese Office Action dated Sep. 2, 2014 in Patent Application No. 2011-010172 (without English Translation).

Japanese Office Action issued Sep. 2, 2014 in Patent Application No. 2011-010008 (without English Translation).

* cited by examiner

FIG.7A
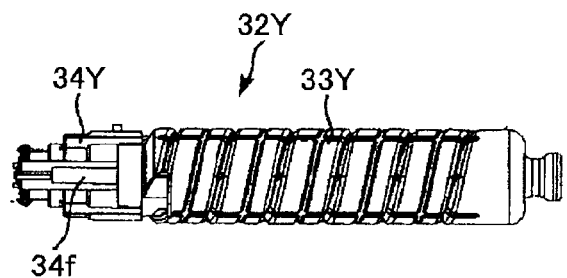
FIG.7B  FIG.7C  FIG.7D
 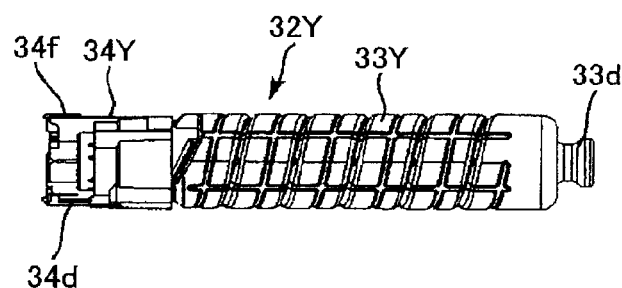 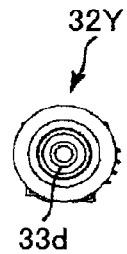
FIG.7E
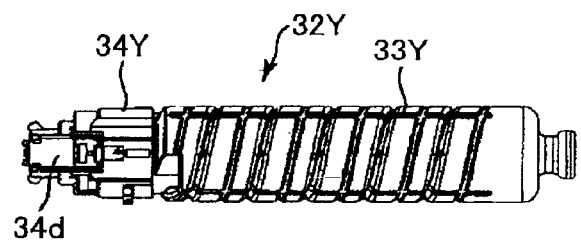
FIG.7F
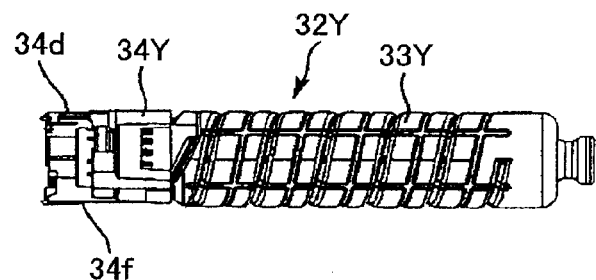

FIG.23
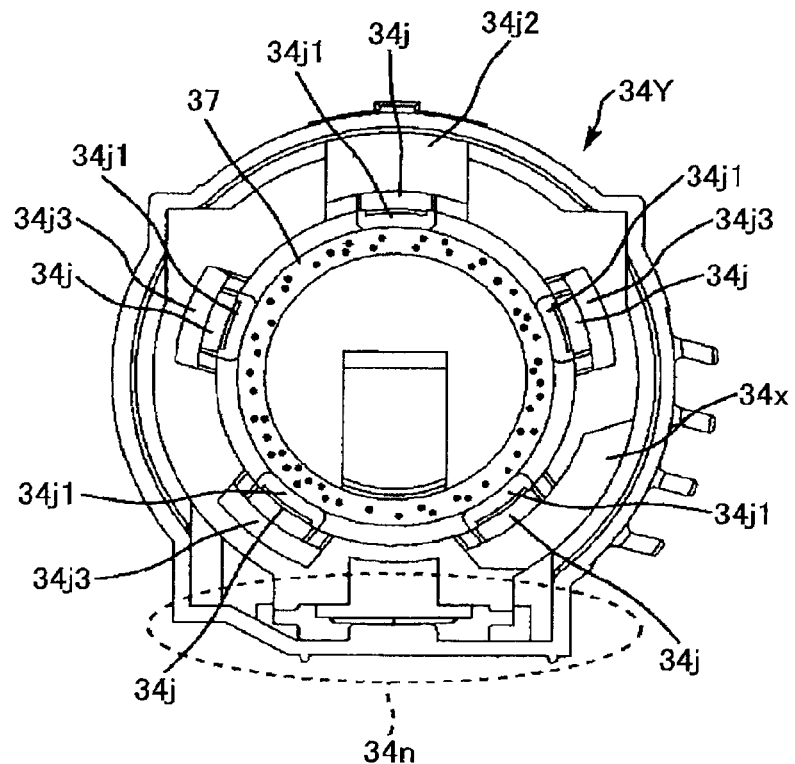
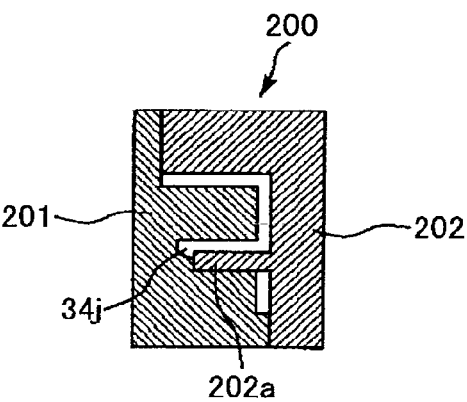
FIG.24A
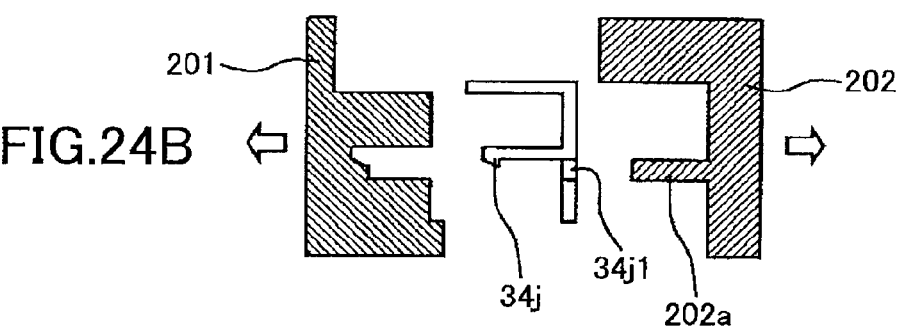
FIG.24B

TONER CONTAINER AND IMAGE FORMING APPARATUS INCLUDING A SHUTTER HAVING EXTENSION

CROSS-REFERENCE TO RELATED APPLICATIONS

The present application is a divisional application of U.S. application Ser. No. 15/075,810, filed Mar. 21, 2016, which is a divisional application of U.S. application Ser. No. 14/807,288 (now U.S. Pat. No. 9,329,529), filed Jul. 23, 2015, which is a divisional application of U.S. application Ser. No. 14/522,217 (now U.S. Pat. No. 9,128,415), filed Oct. 23, 2014, which is a divisional application of U.S. application Ser. No. 13/434,096, filed on Mar. 29, 2012 (now U.S. Pat. No. 8,929,779), which is based upon and claims the benefit of priority of PCT Application No. PCT/JP2011/056129 filed on Mar. 9, 2011, the entire contents of which are incorporated herein by reference. The present application is also based upon and claims the benefit of priority of Japanese Patent Application Nos. 2010-052607 filed Mar. 10, 2010, 2010-052640 filed Mar. 10, 2010, 2010-052751 filed Mar. 10, 2010, 2010-134313 filed Jun. 11, 2010, 2010-134320 filed Jun. 11, 2010, 2010-134332 filed Jun. 11, 2010, 2011-010008 filed Jan. 20, 2011, 2011-010106 filed Jan. 20, 2011, and 2011-010172 filed Jan. 20, 2011, the entire contents of each of which are incorporated herein by reference.

TECHNICAL FIELD

The present disclosure relates to a toner container disposed in an image forming device, such as a copier, a printer, a facsimile or a multi-function peripheral, and relates to an image forming device in which a toner container is arranged in a body of the image forming device.

SUMMARY

Embodiments of the invention include a system with a container including a protrusion, and a receiver to receive the container. The receiver includes a slide block that is movable relative to a body of the receiver, the slide block including two surfaces, a first surface, initially contacted by the protrusion of the container during insertion of the container into the receiver, having a first slope to resist movement of the container towards the receiver, and a second surface, subsequently contacted by the protrusion of the container during the insertion of the container into the receiver, having a second slope to interact with the protrusion of the container to assist movement of the container towards the receiver.

According to another embodiment, there is a toner container for use with an image forming system. The toner container includes a body to hold toner, and a cap. The cap includes an outlet, and protrusions disposed symmetrically on the cap, the protrusions configured to interact with corresponding slide blocks of a receiver of an image forming device, the slide blocks each including two surfaces, a first surface, initially contacted by the protrusions of the cap during insertion of the toner container into the receiver, having a first slope to resist movement of the toner container towards the receiver, and a second surface, subsequently contacted by the protrusions of the toner container during the insertion of the toner container into the receiver, having a second slope to interact with the protrusions of the cap to assist movement of the container towards the receiver.

According to yet another embodiment, there is a container including a protrusion, and a receiver to receive the container. The receiver includes means for sliding, movable relative to a body of the receiver, the means for sliding interacting with the protrusion of the container, the means for sliding initially resisting insertion of the container into the receiver, and subsequently assisting insertion of the container into the receiver.

Other objects, features and advantages of the present disclosure will become more apparent from the following detailed description when read in conjunction with the accompanying drawings.

BRIEF DESCRIPTION OF THE DRAWINGS

FIGS. 7A-7F are diagrams showing the outline of the toner container.

FIG. 23 is a diagram showing the rear of the cap part when viewed from the side of the container main part.

FIG. 24A and FIG. 24B are diagrams showing metallic molds which are used to perform the injection molding of the cap part.

BEST MODE FOR CARRYING OUT THE INVENTION

A description will be predetermined of embodiments of the present disclosure with reference to the accompanying drawings.

Embodiment 1:

FIGS. 1-46 are diagrams for explaining the embodiment 1 of the present disclosure. The composition and operation of the image forming device will be described.

Figure 1:
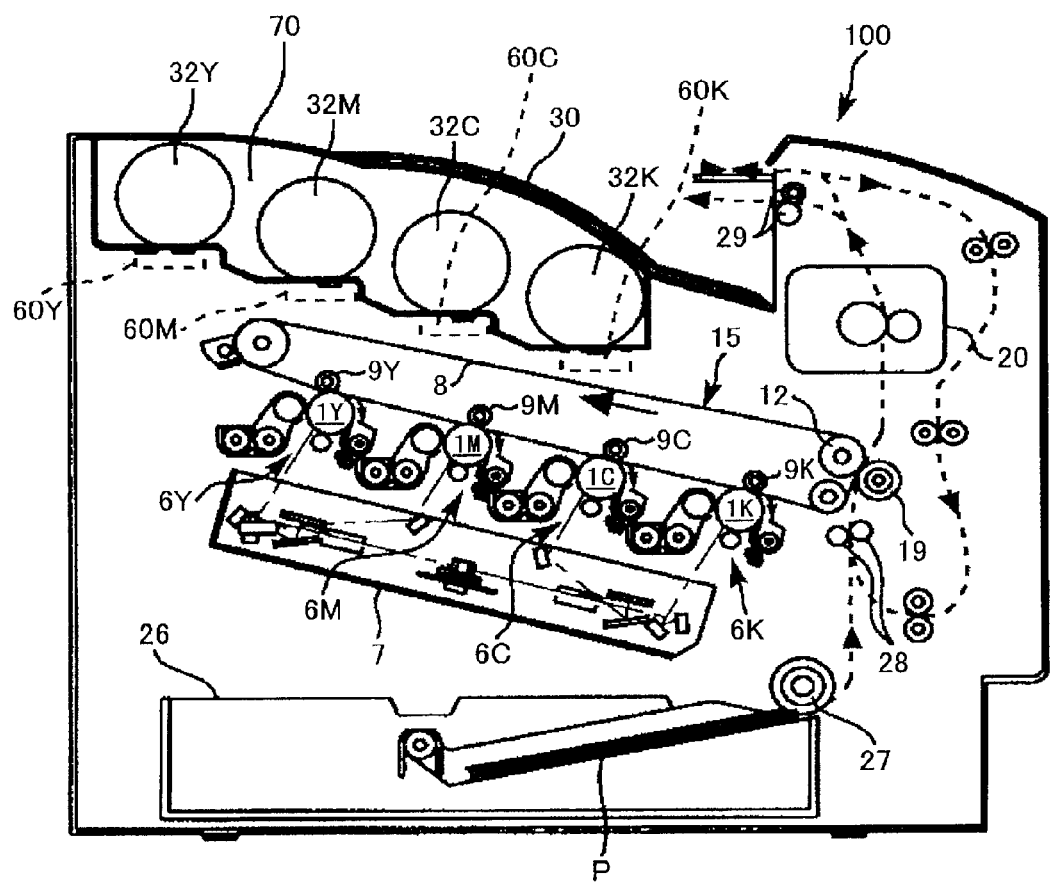
FIG. 1 is a diagram showing the composition of an image forming device of the embodiment 1 of the present disclosure.
Figure 3:
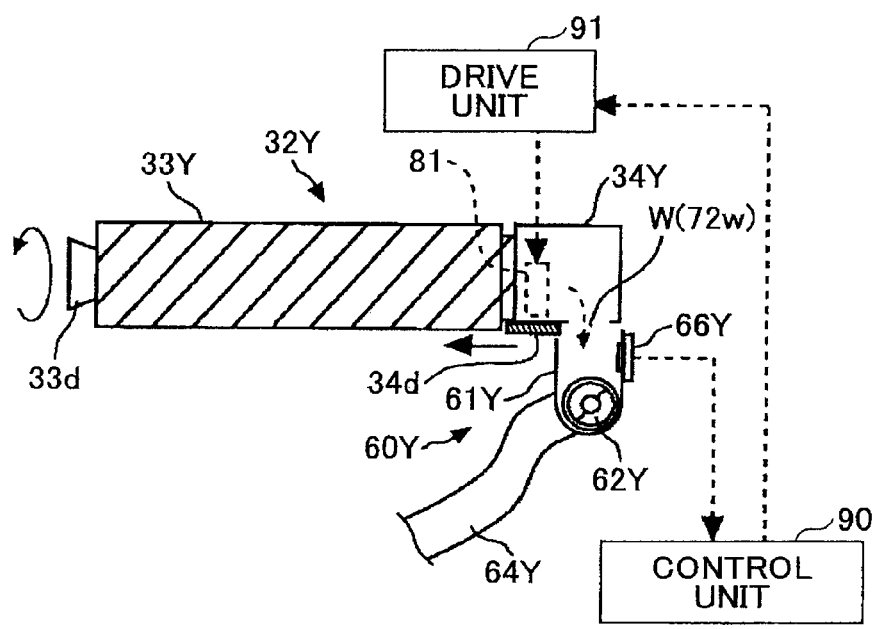
FIG. 3 is a diagram showing the state in which a toner container is installed in a toner replenishing device.
Figure 4:
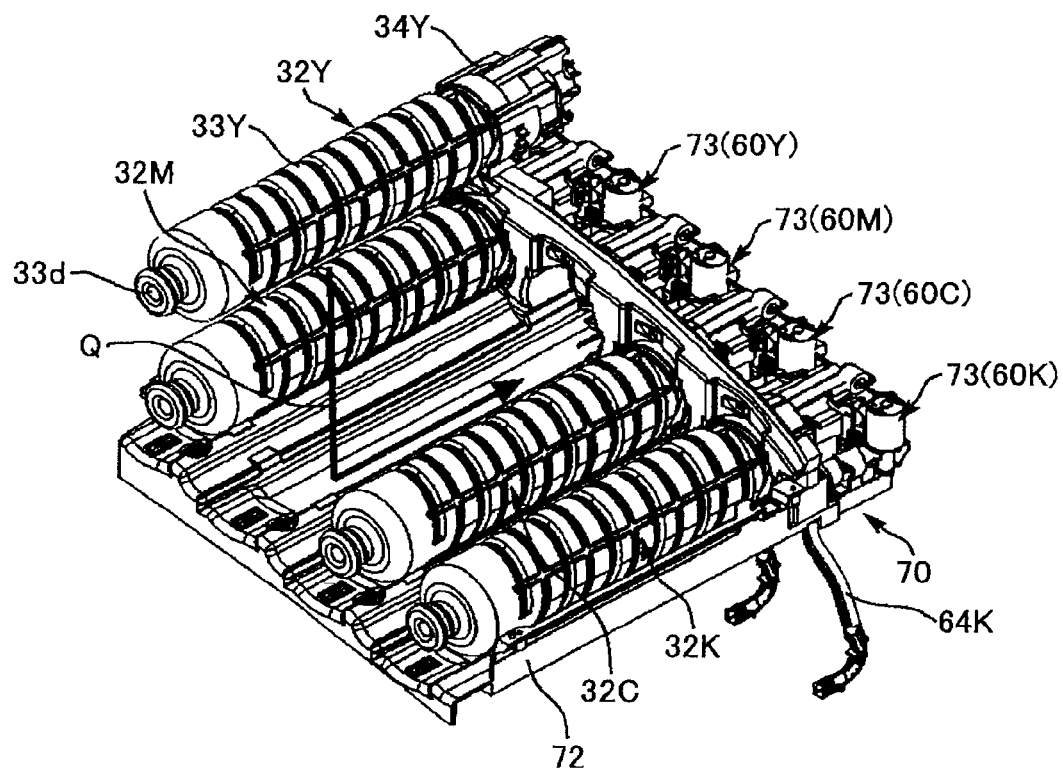
FIG. 4 is a diagram showing the state in which toner containers are installed in a toner container accommodating part.
Figure 36:
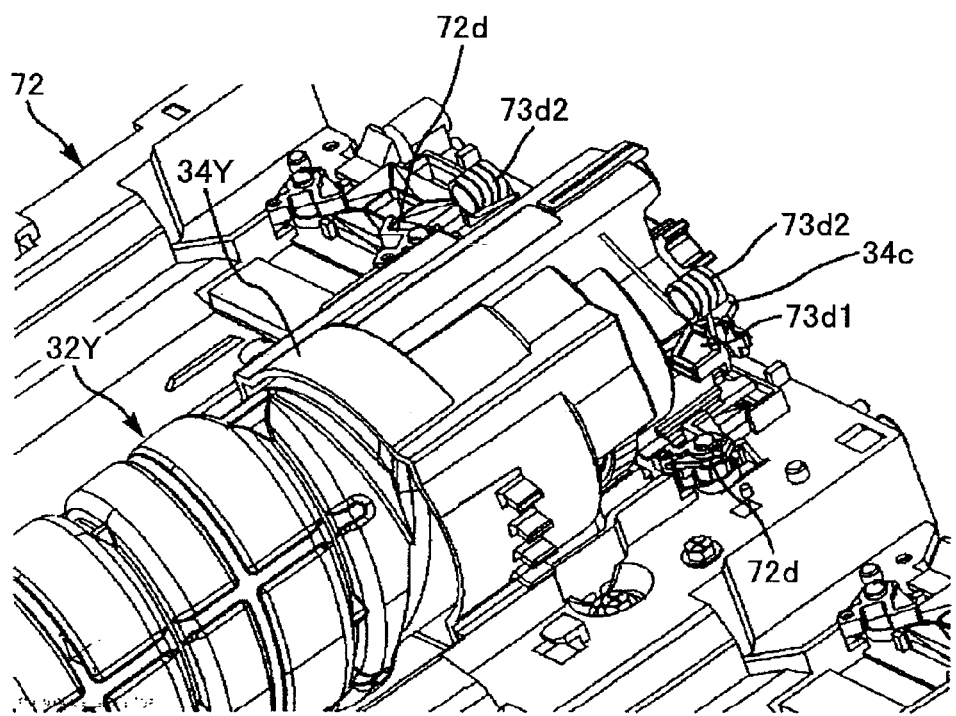
FIG. 36 is a diagram showing the state following the state of FIG. 35.

As shown in FIG. 1, in the toner container accommodating part 70 which is located above the image forming device body 100, four toner containers 32Y, 32M, 32C, and 32K corresponding to respective colors (yellow, magenta, cyan, black) are detachably installed (see FIG. 3, FIG. 4, and FIG. 36).

The intermediate transfer unit 15 is disposed under the toner container accommodating part 70. The imaging parts 6Y, 6M, 6C and 6K corresponding to respective colors (yellow, magenta, cyan, black) are installed side by side so that intermediate transfer belt 8 of the intermediate transfer unit 15 may be faced.

Under the toner containers 32Y, 32M, 32C, and 32K, the toner replenishing devices 60Y, 60M, 60C, and 60K are disposed, respectively. The toner contained in toner containers 32Y, 32M, 32C, and 32K is supplied in the developing devices of the imaging parts 6Y, 6M, 6C, and 6K by the toner replenishing devices 60Y, 60M, 60C, and 60K, respectively.

Figure 2:
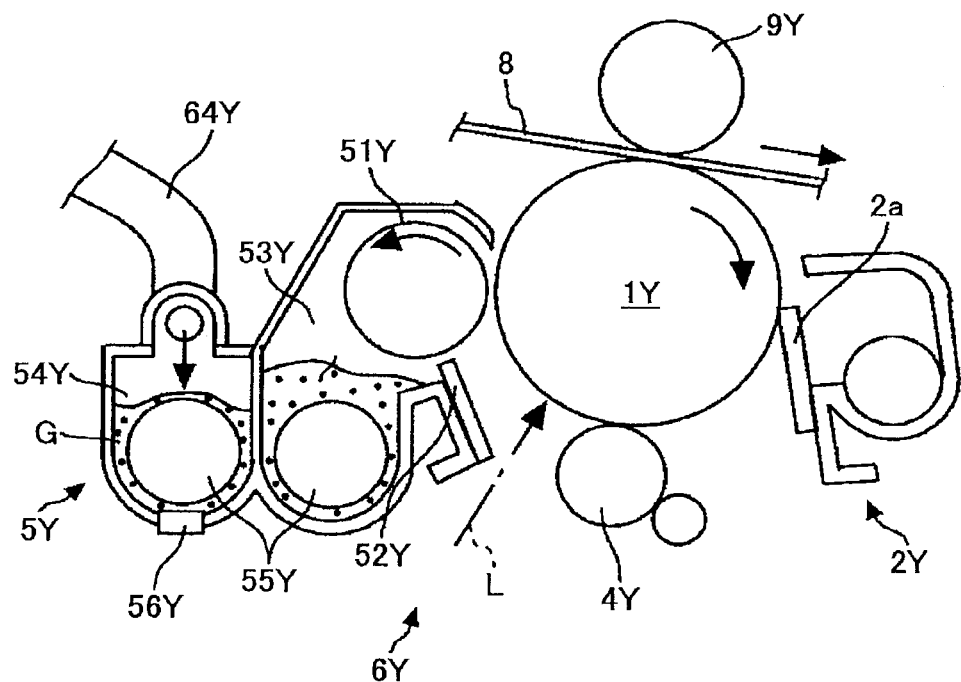
FIG. 2 is a diagram showing the composition of an imaging part in the image forming device.

As shown in FIG. 2, the imaging part 6Y corresponding to yellow includes the photoconductor drum 1Y, the charging part 4Y, the developing device 5Y (developing part), the cleaning part 2Y, the electric discharge part (not illustrates), etc. which are disposed around the photoconductor drum 1Y.

On the photoconductor drum 1Y, an imaging process (a charging process, an exposure process, a developing process, a transfer process, a cleaning process) will be performed, and a yellow image is formed on the photoconductor drum 1Y.

Except that the color of the toner used in other three imaging parts 6M, 6C, and 6K differs, each image part has the same composition as the imaging part 6Y corresponding to yellow, and the image corresponding to each toner color is formed.

Next, a description of other three imaging parts 6M, 6C, and 6K will be omitted, and only the imaging part 6Y corresponding to yellow will be described.

As shown in FIG. 2, the photoconductor drum 1Y is rotated in the clockwise direction in FIG. 2 by a drive motor (not illustrated). The surface of photoconductor drum 1Y is charged uniformly in the position of the charging part 4Y (charging process).

Then, the surface of photoconductor drum 1Y arrives at the irradiation position of laser beam L emitted from aligner 7 (see FIG. 1), and the electrostatic latent image corresponding to yellow is formed of an exposure scan in this position (exposure process).

Then, the surface of photoconductor drum 1Y arrives at an opposed position with the developing device 5Y, an electrostatic latent image is developed in this position, and the toner image of yellow is formed (developing process).

Then, the surface of the photoconductor drum 1Y arrives at the opposed position with the intermediate transfer belt 8 and the first transfer bias roller 9Y, and the toner image on the photoconductor drum 1Y is transferred to the intermediate transfer belt 8 in this position (primary transfer process).

At this time, non-transferred toner remains slightly on the photoconductor drum 1Y.

Then, the surface of photoconductor drum 1Y arrives at the opposed position with the cleaning part 2Y, and the non-transferred toner remaining on the photoconductor drum 1Y in this position is mechanically recovered by the cleaning blade 2a (cleaning process).

Finally, the surface of photoconductor drum 1Y arrives at the opposed position with the non-illustrated electric discharge part, and the rest potential on the photoconductor drum 1Y is removed in this position.

In this way, a series of imaging processes performed on the photoconductor drum 1Y are completed. The imaging process mentioned above is performed on the other imaging parts 6M, 6C, and 6K similar to the yellow imaging part 6Y. That is, the laser beam L based on image information is irradiated from the exposure part 7 disposed under the imaging part to the photoconductor drum of each of the imaging parts 6M, 6C, and 6K. The exposure part 7 emits the laser beam L from a light source, and the laser beam is focused on the photoconductor drum via two or more optical elements, and scanning is performed by the polygon mirror which rotates the laser beam L.

Then, the toner image of each color formed on each photoconductor drum through the developing process is formed on the intermediate transfer belt 8. In this way, a color image is formed on the intermediate transfer belt 8.

As shown in FIG. 1, the intermediate transfer unit 15 comprises primary transfer bias rollers 9Y, 9M, and 9C of 8 or 4 intermediate transfer belts, 9K or secondary transfer backup roller 12, two or more tension rollers, a medium transfer cleaning part, etc.

The intermediate transfer belt 8 is laid firmly and supported by the roller components, and endless movement of the belt is performed by rotation of one roller component 12 in the arrow direction in FIG. 1. Four primary transfer bias rollers 9Y, 9M, 9C, and 9K put intermediate transfer belt 8 among photoconductor drums 1Y, 1M, 1C, and 1K, and form a primary transfer nip, respectively.

Transfer bias contrary to the polarity of the toner is impressed to the primary transfer bias rollers 9Y, 9M, 9C, and 9K. The intermediate transfer belt 8 is rotated in the arrow direction, and passes the primary transfer nip of each of the primary transfer bias rollers 9Y, 9M, 9C, and 9K one by one. In this way, the primary toner image of each color on the photoconductor drums 1Y, 1M, and 1C and 1K is formed on the intermediate transfer belt 8.

The intermediate transfer belt 8 with which the toner image of each color is transferred in piles arrives at an opposed position with secondary transfer roller 19. In this position, the secondary transfer backup roller 12 puts the intermediate transfer belt 8 between the secondary transfer rollers 19, and forms a secondary transfer nip in it.

The toner image of four color formed on intermediate transfer belt 8 is transferred to the recording media P, such as a decalcomania paper delivered in the position of this secondary transfer nip.

At this time, the non-transferred toner which is not transferred by recording medium P remains in intermediate transfer belt 8.

Then, the intermediate transfer belt 8 arrives at the position of a medium transfer cleaning part (it did not illustrate). The non-transferred toner on the intermediate transfer belt 8 is collected in this position. In this way, a series of transfer processes performed on the intermediate transfer belt 8 are completed.

A recording medium P delivered in the position of the secondary transfer nip is delivered via the feed roller 27 or the resist roller pair 28 from the feeding part 26 disposed under the device body part 100. A plurality of recording media P are stored in piles in the feeding part 26. When the feed roller 27 is rotated counterclockwise in FIG. 1, the top recording medium P is fed to the space between the rollers of the resist roller pair 28. The recording medium P delivered by the resist roller pair 28 stops in the position of the roller nip of the resist roller pair 28 which stops rotation.

In accordance with the timing with the color image on the intermediate transfer belt 8, the resist roller pair 28 is rotated and the recording medium P is delivered to a secondary transfer nip. In this way, a desired color image is transferred to the recording medium P.

Then, the recording medium P to which the color image is transferred in the position of the secondary transfer nip is delivered in the position of the fixing part 20. The heat and pressure by the fixing roller and the pressurizing roller are fixed to the color image transferred to the surface on recording medium P in this position.

Then, the recording medium P is delivered to the space between the rollers of the delivery roller pair 29 and discharged out of the image forming device. The recording medium P discharged by the delivery roller pair 29 is stacked on the stack part 30 as an output image. In this way, a series of image formation processes in the image forming device are completed.

Next, FIG. 2 is a diagram for explaining the composition and operation of the developing device in the imaging part. The developing device 5Y includes the doctor blade 52Y which faces the developing roller 51Y which faces photoconductor drum 1Y, and the developing roller 51Y, the developer accommodating part 53Y, two conveying screws 55Y disposed in 54Y, concentration detection sensor 56Y which detects the toner concentration in a developer, etc.

The developing roller 51Y includes a magnet fixed to the inside, a sleeve turning around the circumference of the magnet, etc. In the developer accommodating parts 53Y and 54Y, 2 component developer G which consists of a carrier and toner is contained.

The developer accommodating part 54Y is open for free passage in the toner conveyance pipe 64Y (toner conveying route) via the opening formed in the upper part. Operation of the developing device 5Y will be described.

The sleeve of developing roller 51Y rotates to the arrow direction of FIG. 2. The developer G supported on the developing roller 51Y moves with rotation of the sleeve in the developing-roller 51Y top by the magnetic surface formed with the magnet.

The developer G in the developing device 5Y is adjusted so that it may be within the limits of the toner in the developer comparatively (toner concentration) predetermined. The toner contained in toner container 32Y according to the toner consumption in the developing device 5Y is supplied in the developer accommodating part 54Y via the toner replenishing device 60Y (see FIG. 3). The composition and operation of the toner replenishing device will be described later.

The toner supplied in the developer accommodating part 54Y circulates through the two developer accommodating parts 53Y and 54Y by the two conveying screws 55Y, being mixed and agitated with the developer G (which is the vertical movement in FIG. 2). The toner in the developer G sticks to the carrier and is supported on the developing roller 51Y with the carrier by the magnetism formed on the developing roller 51Y. The developer G supported on the developing roller 51Y is delivered in the arrow direction in FIG. 2, and arrives at the position of the doctor blade 52Y.

The developer G on the developing roller 51Y is delivered to the opposed position (a developing area) with the photoconductor drum 1Y after a proper quantity of the amount of developer turn in this position. The latent image formed on the photoconductor drum 1Y of the electric surface formed in the developing area is adsorbed in toner.

Then, the developer G remaining on the developing roller 51Y reaches above the developer accommodating part 53Y with rotation of the sleeve, and is removed from the developing roller 51Y in this position.

Next, the toner replenishing devices 60Y, 60M, 60C, and 60K will be described with reference to FIGS. 3 and 4.

The toner in each of the toner containers 32Y, 32M, 32C and 32K installed in the toner container accommodating part 70 of the device body part 100, with reference to FIG. 3 is suitably supplied in each developing device by the toner replenishing devices 60Y, 60M, 60C, and 60K formed for every toner color, according to the toner consumption in the developing device of each color.

The toner replenishing devices 60Y, 60M, 60C, and 60K or the toner containers 32Y, 32M, 32C, and 32K have the identical structure except that the color of the toner used for the imaging process differs. A description will be predetermined of only the toner replenishing device 60Y corresponding to yellow and the toner container 32Y, and a description of the toner replenishing devices 60M, 60C, and 60K corresponding to other three colors and the toner containers 32M, 32C, and 32K will be omitted.

When the toner containers 32Y, 32M, 32C, and 32K are attached to the toner container accommodating part 70 of the device body part 100 as shown in FIG. 4 (which is the movement indicated by the arrow Q). Interlocked with the attaching operation, the shutter member 34d of each of the toner containers 32Y, 32M, 32C, and 32K is moved to open the toner outlet W.

The toner replenishment mouth 72w (see FIG. 3 and FIGS. 37-39) of the toner container accommodating part 70 (toner replenishing devices 60Y, 60M, 60C, and 60K) and the toner outlet W are open for free passage.

The toner containers 32Y, 32M, 32C and 32K and the toner contained therein will be discharged from the toner outlet W, and will be stored in the toner tank part 61Y from the toner replenishment mouth 72w of the toner container accommodating part 70 (the toner replenishing devices 60Y, 60M, 60C, and 60K).

As shown in FIG. 3, the toner container 32Y is a cylindrical toner container, and includes the cap part 34Y held by non rotation in the toner container accommodating part 70, and the container main part 33Y in which the gear 33c is formed.

Figure 42:
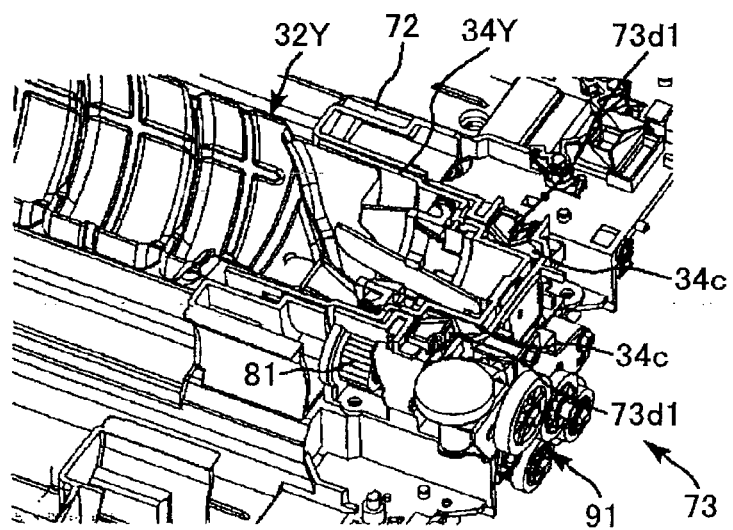
FIG. 42 is a diagram showing the state following the state of FIG. 41.

The main part 33Y of the toner container is rotatably held on the cap part 34Y, and rotated by the actuator 91 in the direction indicated by the arrow in FIG. 3 (which includes the drive motor and the drive gear 81 as shown in FIG. 42).

With the projection 33b spirally formed in the inner circumference side of the container main part 33Y because the main part of container 33Y itself rotates the toner contained in the inside of the toner container 32Y (the container main part 33Y) is delivered in the longitudinal direction (it is conveyance to the method of the right from the left of FIG. 3), and toner is discharged from the toner outlet W of the cap part 34Y. That is, the toner is suitably supplied to the toner tank part 61Y because the container main part 33Y of the toner container 32Y rotates suitably by the actuator 91.

The toner containers 32Y, 32M, 32C, and 32K are exchanged for new one when the life is reached.

As shown in FIG. 3, each of the toner replenishing devices 60Y, 60M, 60C, and 60K includes the toner container accommodating part 70, the toner tank part 61Y, the toner conveyance coil 62Y, the toner end sensor 66Y, the actuator 91, etc.

The toner tank part 61Y is disposed under the toner outlet W of the toner container 32Y, and the toner discharged from the toner outlet W of the toner container 32Y is stored.

The bottom of the toner tank part 61Y is connected to the upstream part of the toner conveyance pipe 64Y. The toner end sensor 66Y which detect that the toner stored by the toner tank part 61Y is below a predetermined amount are installed in the surface of the wall of the toner tank part 61Y. A piezoelectric sensor or the like may be used as the toner end sensor 66Y.

When it is detected by the control unit 90 that the toner stored in the toner tank part 61Y is below a predetermined amount by the toner end sensor 66Y (toner end detection), the control unit 90 performs rotation of the container main part 33Y of the toner container 32Y by the actuator 91 (drive gear 81) by a predetermined time, and performs toner replenishment to the toner tank part 61Y.

When the toner end detection by the toner end sensor 66Y is not canceled after such control is repeatedly performed, a message reporting that no toner is in the toner container 32Y and urging the user to perform exchange of the toner container 32Y is displayed on the display (not illustrated) of the device body part 100.

Although the illustration is omitted, the toner conveyance coil 62Y is installed in the toner conveyance pipe 64Y, and the toner stored in the toner tank part 61Y is delivered to the developing device 5Y via the toner conveyance pipe 64Y. The toner conveyance coil 62Y delivers the toner along with the toner conveyance pipe 64Y to the upper part of the developing device 5Y from the bottom (the lowest point) of the toner tank part 61Y. The toner delivered with toner conveyance coil 62Y is supplied to the developing device 5Y (the developer accommodating part 54Y).

As shown in FIG. 4, the toner container accommodating part 70 is constituted to include the cap receiving part 73 for holding cap part 34Y of the toner container 32Y, and the container receiving part 72 for holding the container main part 33Y of the toner container 32Y.

The composition and operation of the toner container accommodating part 70 (the container receiving part 72, the cap receiving part 73) will be described later with reference to FIGS. 29-46.

When the body cover (not illustrates) installed above the near side (which is a space vertically near side of FIG. 1) of the device body part 100 is opened as shown in FIG. 1, the toner container accommodating part 70 will be exposed.

Where the longitudinal direction of each toner containers 32Y, 32M, 32C, and 32K is made horizontal, detaching operation (it is the detaching operation which makes the longitudinal direction of a toner container a path of insertion) of each toner containers 32Y, 32M, 32C, and 32K from the near-side upper part of the device body part 100 is performed.

At the time of the attaching operation to the device body part 100, each of the toner containers 32Y, 32M, 32C, and 32K is laid on the toner container accommodating part 70 from the upper part of the device body part 100 in the state in which the body cover is opened, the cap part 34Y is made into the head after that and it is pushed horizontally (which is the movement indicated by the arrow Q in FIG. 4).

On the other hand, at the time of the detaching operation from the device body part 100, operation that each toner containers 32Y, 32M, 32C, and 32K are contrary to the time of the attaching will be performed.

Figure 30:
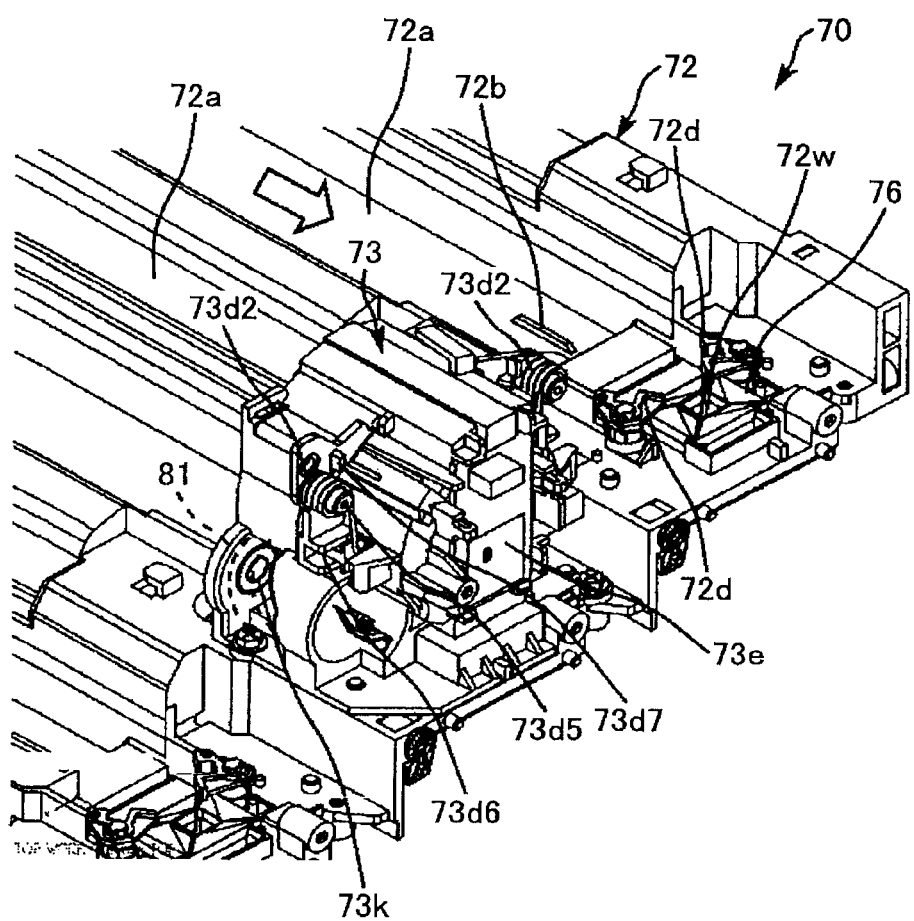
FIG. 30 is a diagram showing a portion of the toner container accommodating part in the neighborhood of the container receiving part.
Figure 31:
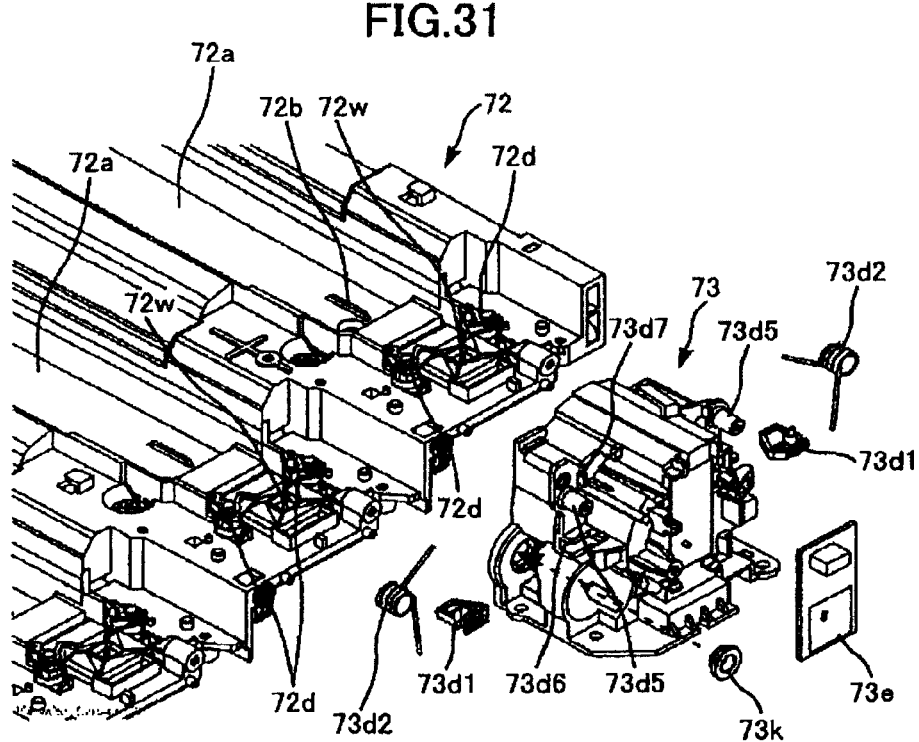
FIG. 31 is an exploded diagram showing a part of the toner container accommodating part.

In the embodiment 1, the antenna 73e (the RFID antenna) is detachably installed in the cap receiving part 73 of the toner container accommodating part 70 installed side by side of each of the toner containers 32Y 32M, 32C, and 32K (refer to FIG. 30 and FIG. 31).

The antenna 73e is provided for performing non-contact wireless communications which is installed in the end face of the cap part 34Y of the toner container 32Y and the RFID chip 35 (see FIG. 5 and FIG. 9) as the electronic data storage medium. The transfer of the required information is performed between the RFID chips 35 (electronic data storage media) of the toner containers 32Y, 32M, 32C, 32K and the antenna 73e (the RFID antenna) of the device body part 100.

As information which communicates among both sides, there is information, including information, including information, including the serial number of the toner container, the number of times of recycling, etc., the capacity of the toner, a lot number, color, etc., the using history of image forming device body 100, etc.

Before such electronic data is installed in image forming device body 100 by chip 35 (electronic data storage medium) for RFID, it is beforehand stored in it (or after being installed, the information received from the device body part 100 is stored).

Figure 5:
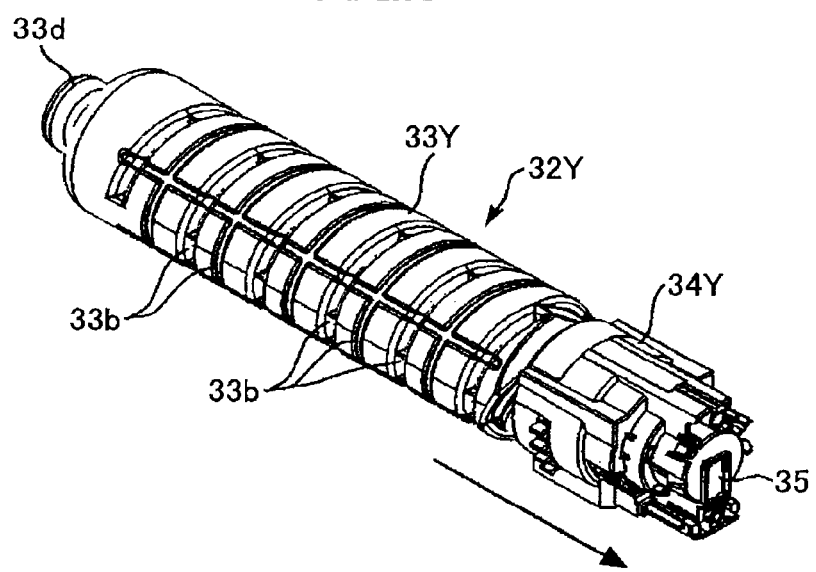
FIG. 5 is a diagram showing a toner container of the present disclosure when viewed from a slanting upper portion.
Figure 6:
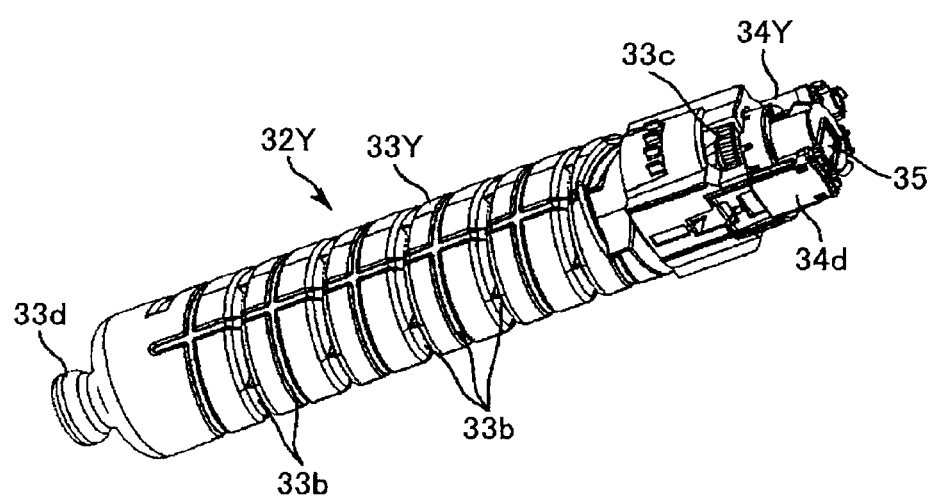
FIG. 6 is a diagram showing the toner container of the present disclosure when viewed from a slanting lower portion.

Next, the toner containers 32Y, 32M, 32C, and 32K will be described with reference to FIGS. 5-28. As shown in FIGS. 5-7, the toner container 32Y is composed of the container main part 33Y (container body) and the cap part 34Y (container cap) provided in the head of the container main part. As shown in FIG. 9, the toner container 32Y is decomposed into the RFID chip 35 as the electronic data storage medium, the cap seal 37 as the sealing material, the stirring member 33f, the shutter member 34d, the shutter seal 36, the container main part 33Y, and the cap part 34Y.

Figure 14:
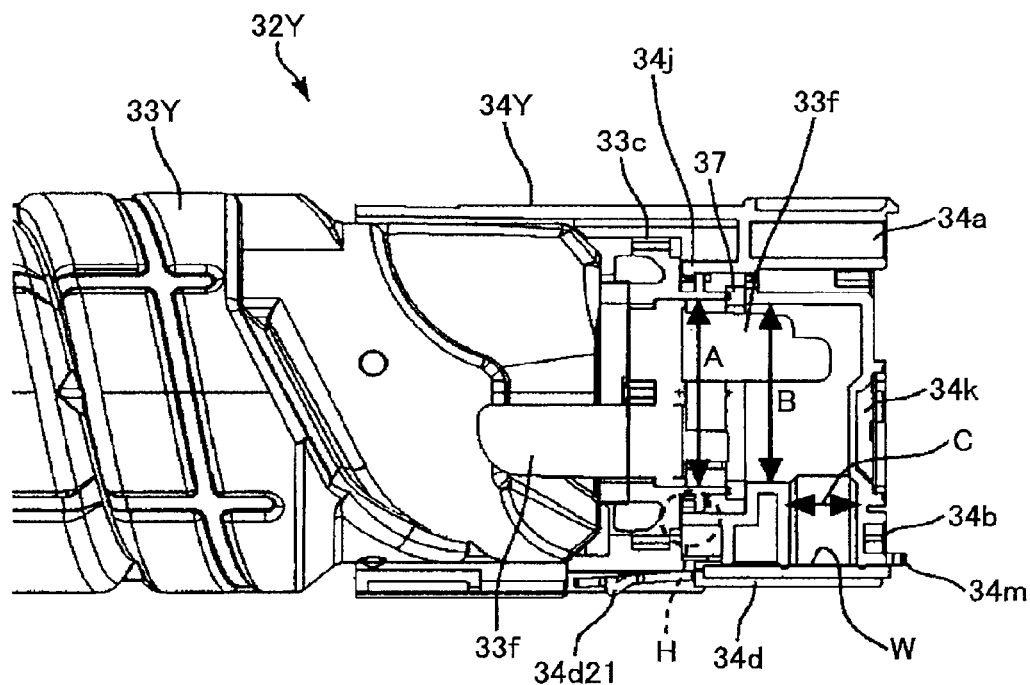
FIG. 14 is a diagram showing the neighborhood of the cap part of the toner container.

The gear 33c which is rotated integrally with the container main part 33Y or with the opening, and the opening A are provided in the head of the container main part 33Y at the end in the longitudinal direction (which is the vertical direction in FIG. 8) as shown in FIG. 9). The opening A is provided for turning to the space in the cap part 34Y (which the hollow part B as shown in FIG. 14) the toner which is provided in the head (it is a position which serves as them in the attaching operation) of the container main part 33Y and is contained in the container main part 33Y and the opening A discharging it. Delivery of the toner (rotation of the container main part 33Y) to the hollow part B of the cap part 34Y from the container main part 33Y is suitably performed to make the toner in the cap part 34Y is not lower than the predetermined waterline.

The gear 33c is engaged with the drive gear 81 provided in the toner container accommodating part 70 of the device body part 100, in order to rotate the container main part 33Y around its the rotating shaft. Specifically, the gear 33c is formed around the circumference of the opening A, and the plurality of teeth of the gear 33c are formed in radial directions from the rotating shaft of the container main part 33Y.

Figure 8:
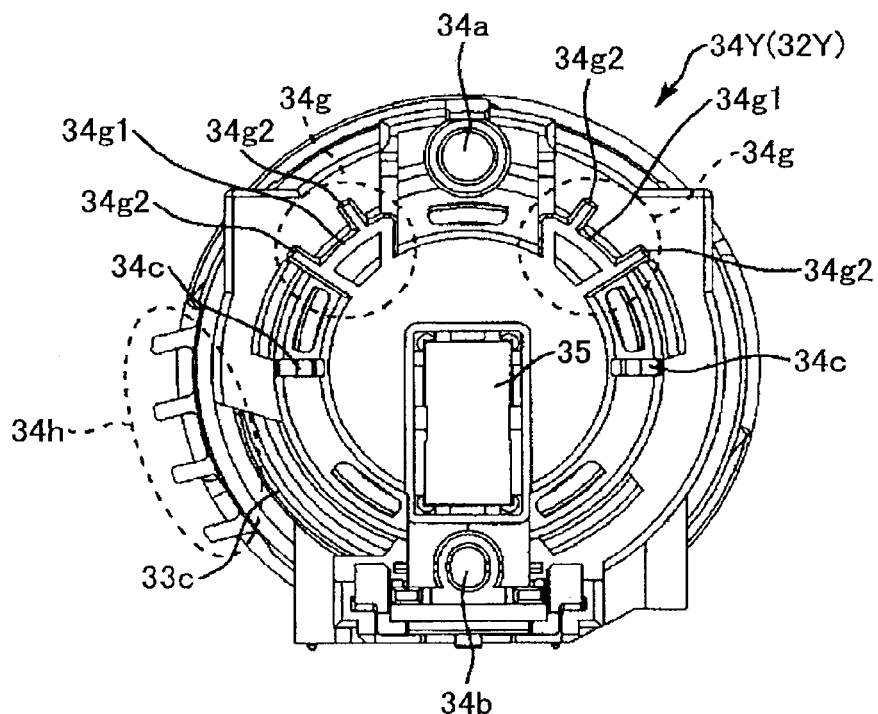
FIG. 8 is a diagram showing the front of the toner container when viewed from the cap part side.
Figure 9:
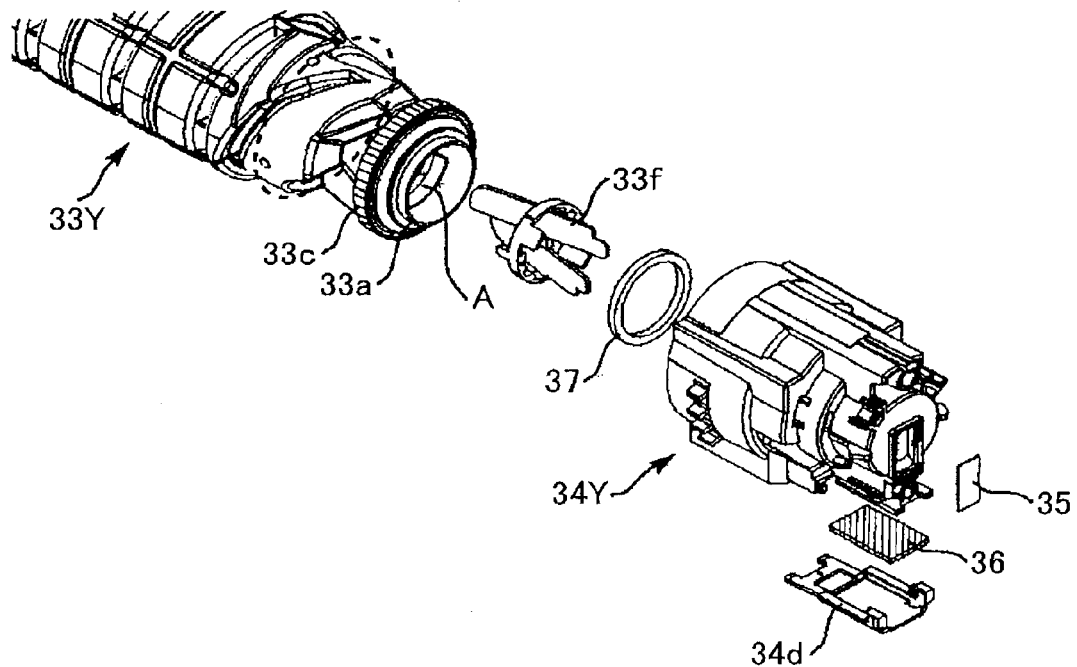
FIG. 9 is an exploded view of a part of the toner container.

The gear 33c is partially exposed from the notch 34x (see FIG. 16) formed in the cap part 34Y, and engaged with the drive gear 81 of the device body part 100 in the engagement position of the slanting lower portion in FIG. 8. The driving force from the drive gear 81 is transmitted to the gear 33c, and the container main part 33Y is rotated in the clockwise rotation of FIG. 8. In the embodiment 1, the drive gear 81 and the gear 33c are spur gears.

As shown in FIGS. 5 and 6, the grip part 33d to be held by the user when performing the attaching or detaching operation of the toner container 32Y is provided at the other end of the container main part 33Y in the longitudinal direction. While holding the grip part 33d, the user attaches the toner container 32Y to the image forming device body 100 (the toner container 32Y is moved in the direction indicated by the arrow in FIG. 5).

A spiral projection 33b is formed in the inner circumference surface of the container main part 33Y (which may be a spiral groove if viewed from the outer circumference surface). This spiral projection 33b is for rotating the container main part 33Y to a determined direction, and discharging toner from opening A.

Figure 10:
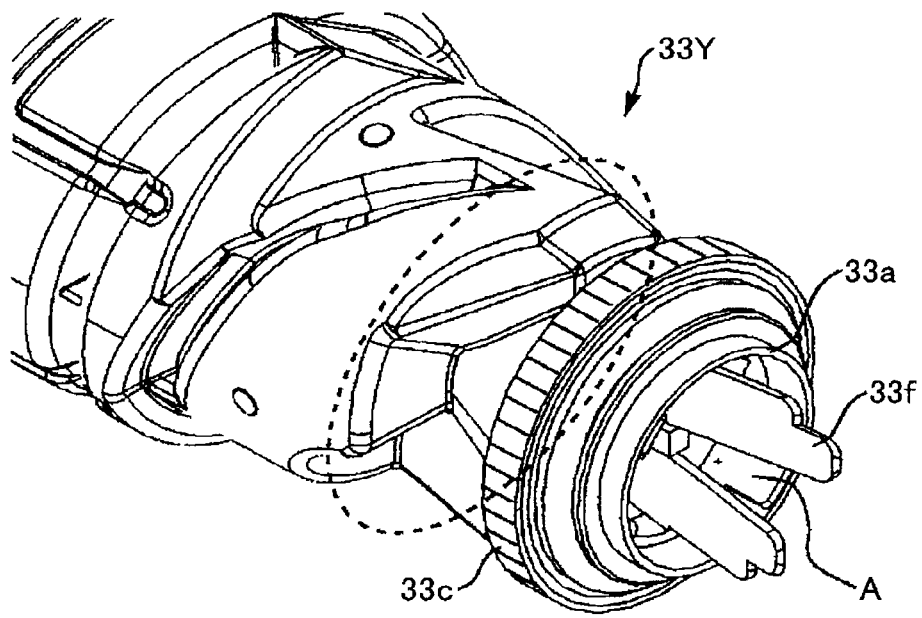
FIG. 10 is a diagram showing the head part of the container main part of the toner container.

The container main part 33Y constituted in this way can be manufactured by blow molding with the gear 33c and the grip part 33d which are disposed on the circumference. As shown in FIGS. 9 and 10, the fit of the stirring part 33f which rotate the toner container 32Y in the embodiment 1 with the container main part 33Y is performed to the bottle mouth part 33a (opening A).

The stirring parts 33f are one pair of tabular members installed to the inside of the container main part 33Y from the hollow part B in the cap part 34Y (see FIG. 14). The stirring members 33f are inclined so that one pair of tabular members may become alternate, respectively. The stirring members while the stirring parts 33f are constituted so that the head may arrive above outlet W in cap part 34Y when cap part 34Y and the container main part 33Y are attached. It is constituted so that the back end (end of the opposite side) may pump up and the part (the portion indicated by the dotted line of FIG. 9 and FIG. 10) may be reached.

The toner ejection characteristic from the opening A improves because the stirring part 33f is rotated with the opening A of the container main part 33Y.

As shown in FIGS. 9 and 10, the fitting part (convex part) is formed in the bottle mouth part 33a of the container main part 33Y throughout the outer periphery thereof for engaging with the claw part 34j (see FIG. 14 and FIG. 19) of the cap part 34Y, and connecting the parts 33Y and 34Y together. The container main part 33Y is rotatably fitted to the cap part 34Y. Therefore, the gear 33c is rotated relative to the cap part 34Y.

The inside diameter of the head (which is near the position in which the gear 33c is formed) of the container main part 33Y is formed to be smaller than the inside diameter of the accommodating part (which is the position in which spiral projection 33b is formed) in which toner is contained (see FIG. 14).

The pumping part (the portion indicated by the dotted line in FIG. 9 and FIG. 10) formed so that the circumference might push out toward an inside is provided in the head of the container main part 33Y. The toner delivered by the spiral projection 33b to the opening A by rotation of the container main part 33Y is pumped up by the pumping part (the portion indicated by the dotted line in FIG. 9 and FIG. 10) at the small-diameter portion of the head.

Then, the toner pumped up by the small-diameter portion of the head is discharged to the hollow part B of the cap part 34Y from opening A, being agitated by the stirring part 33f.

As shown in FIGS. 11-14, the shutter member 34d, the shutter seal 36, the cap seal 37, and the RFID chip 35 (electronic data storage medium) are disposed in the cap part 34Y of the toner container 32Y. In the cap part 34Y, the opening A of the container main part 33Y is inserted in an accommodating part 34z (see FIG. 17) which is formed to have an inside diameter larger than the diameter of the hollow part B.

Figure 13:
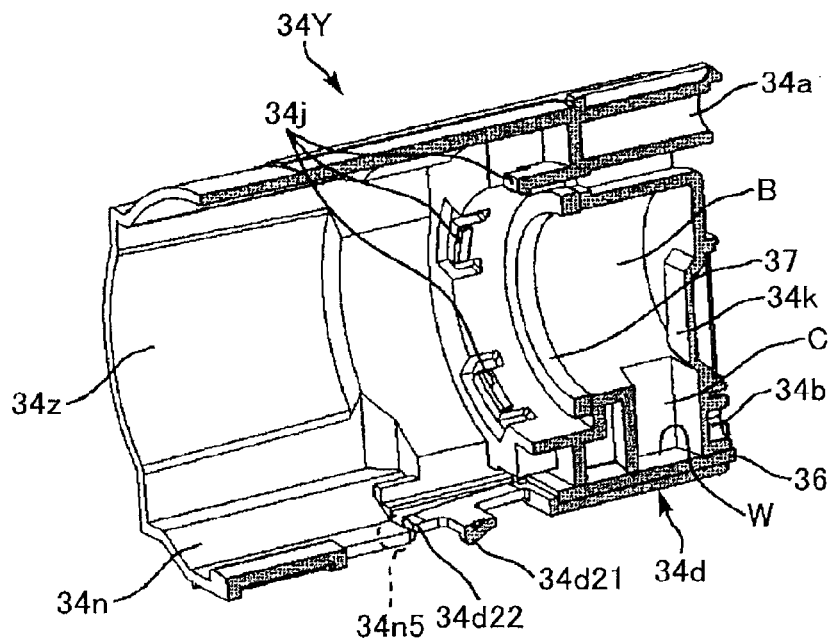
FIG. 13 is a cut-away view showing the cap part of the toner container.
Figure 16:
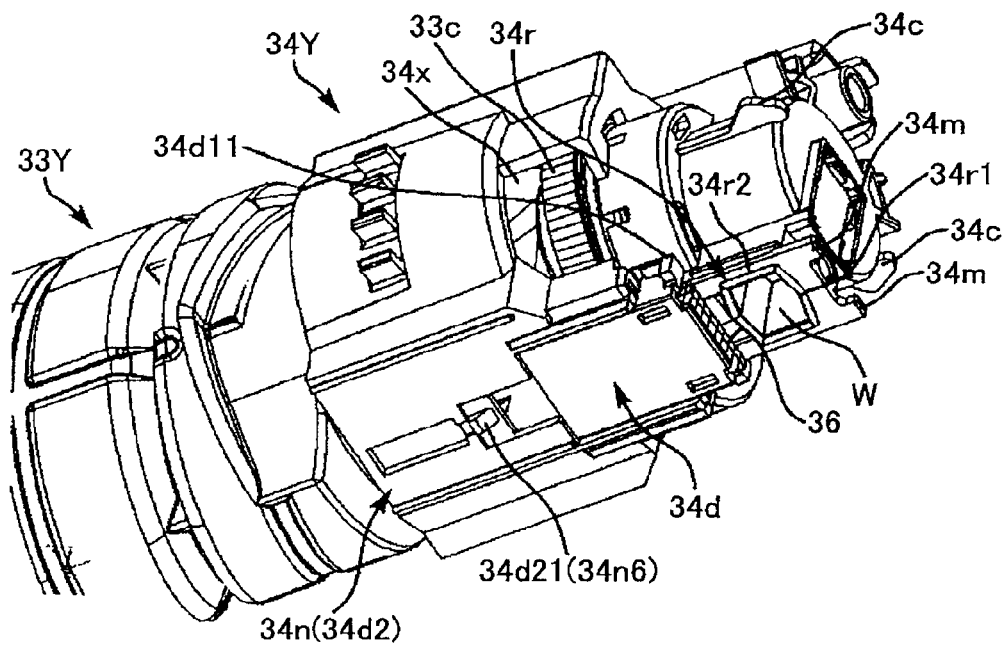
FIG. 16 is a diagram showing the state in which the toner outlet is opened by the shutter member of the toner container.

As shown in FIG. 13 and FIG. 16, the toner outlet W for being outside a container and making the vertical direction lower part discharge the toner discharged from opening A of the container main part 33Y (prudence drop) is formed in the bottom of the cap part 34Y. The shutter member the shutter member 34d for opening and closing the toner outlet W are held possible slide movement at the bottom of the cap part 34Y. By the relative movement, the shutter member 34Y opens the toner outlet W (it is movement to the left of FIG. 14) from the cap part 34Y side to the container main part 33Y side in the longitudinal direction.

The relative movement (which is a movement in the right direction in FIG. 14) of the longitudinal direction from the container main part 33Y side to the cap part 34Y side, the shutter member 34Y closes the toner outlet W. The opening/closing action of the shutter member 34d is interlocked with the attaching/detaching operation of the longitudinal direction of the toner container 32Y to the toner container accommodating part 70 (the device body part 100) and is performed.

Figure 15:
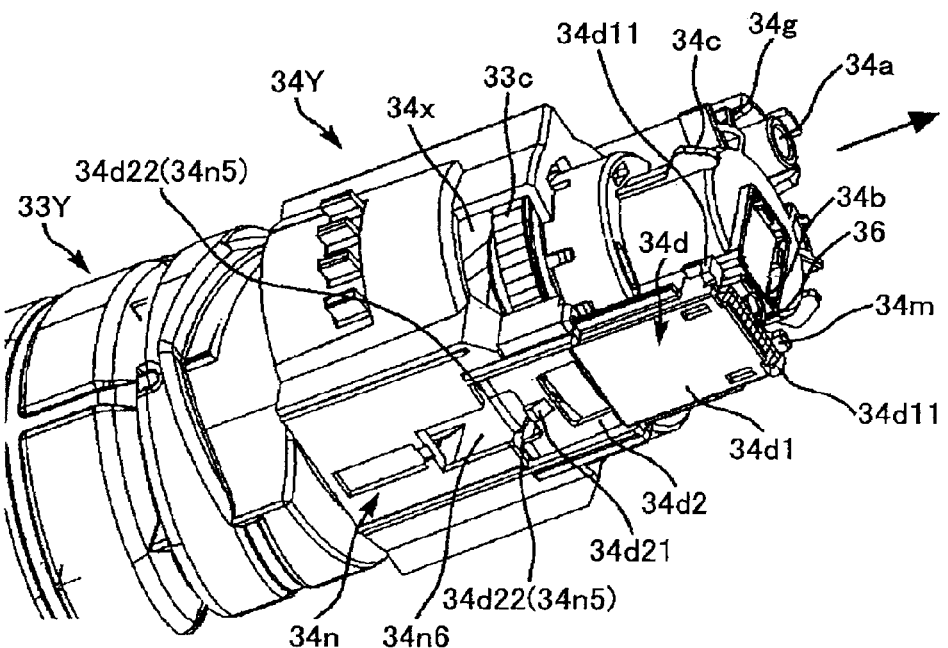
FIG. 15 is a diagram showing the state in which a toner outlet is closed by a shutter member of the toner container.

FIGS. 15 and 16 show operation after the shutter member 34d start opening of the toner outlet W until the opening is completed.

Figure 18A:
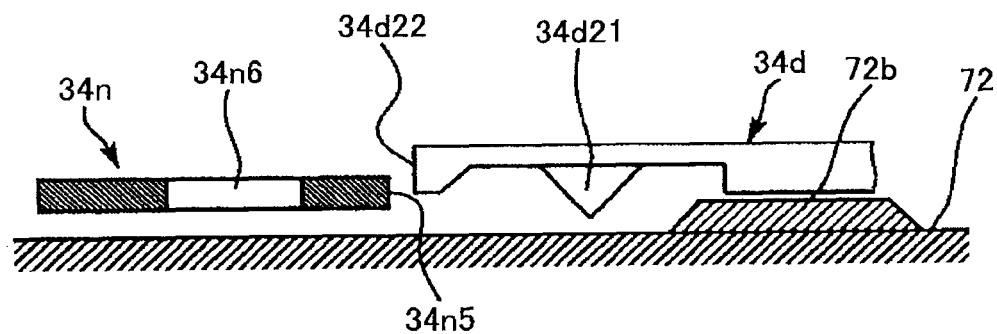
FIGS. 18A-18C are diagrams for explaining the opening operation of the shutter member which is interlocked with the attaching operation of the toner container to the toner container accommodating part.
Figure 18B:
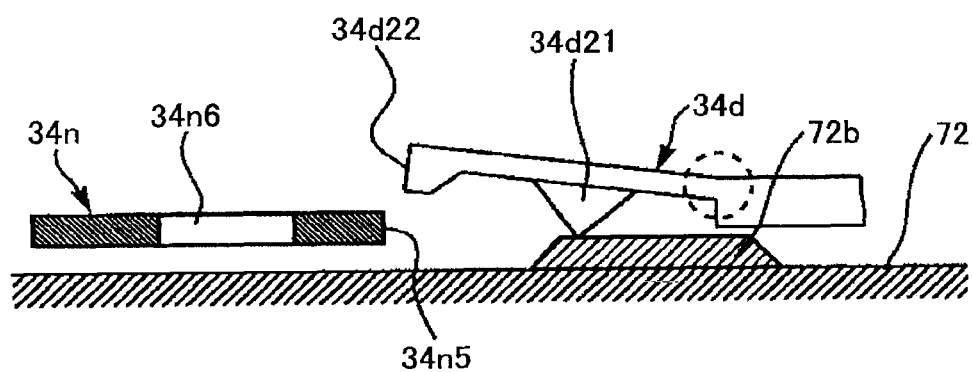
Figure 18C:
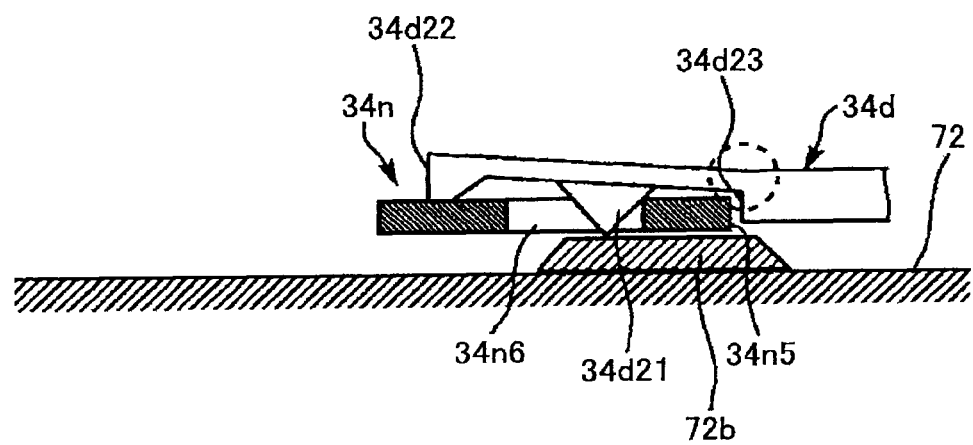

FIGS. 18A, 18B and 18C are diagrams for explaining the opening operation of (the shutter deforming part 34d2) of the shutter member 34d at that time.

Figure 11:
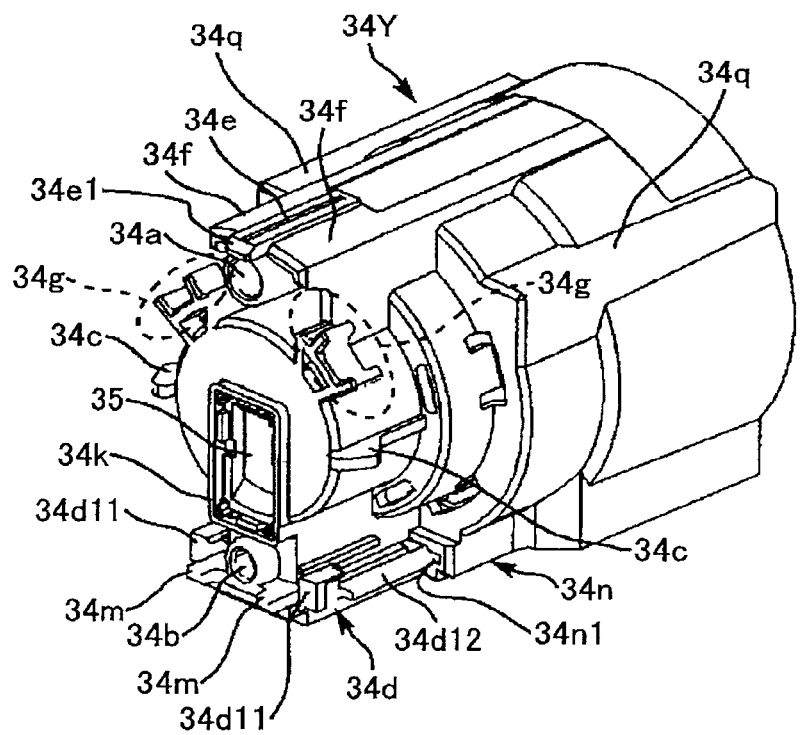
FIG. 11 is a diagram showing the cap part of the toner container.
Figure 12:
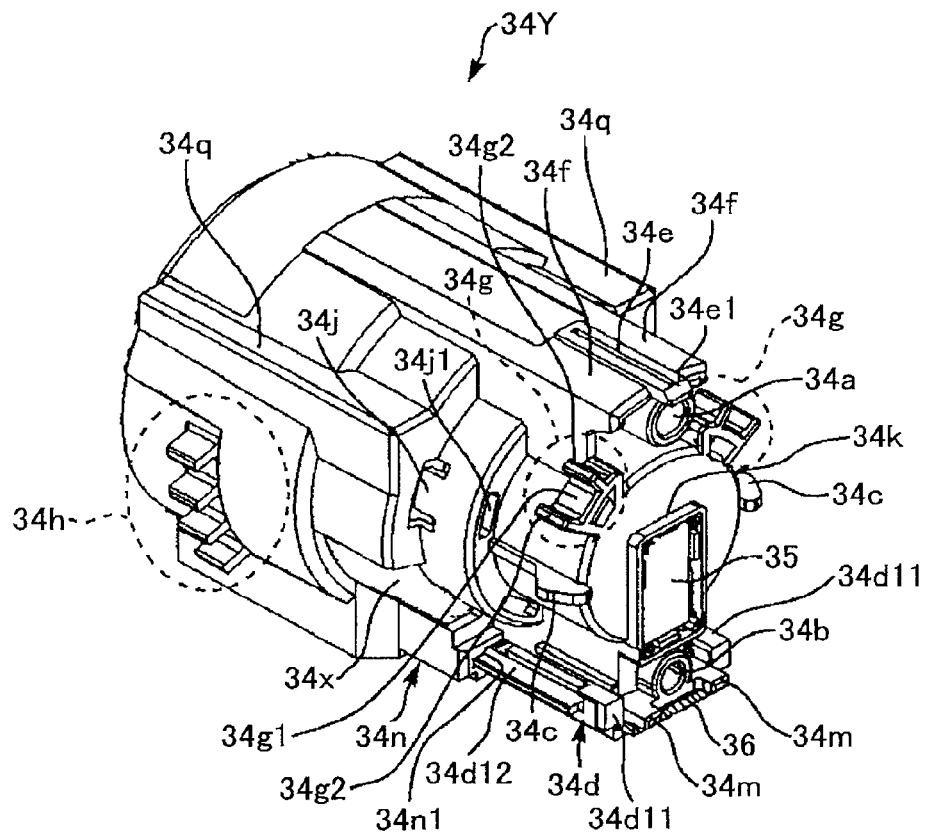
FIG. 12 is a diagram showing the cap part of the toner container.

As shown in FIG. 11 and FIG. 12, the first hole 34a (the main reference hole) installed in the longitudinal direction from the end face of the cap part 34Y which intersects vertically in the longitudinal direction is formed in the upper part (ceiling part) of the cap part 34Y.

The first hole 34a serves as a positioning main standard of the cap part 34Y in image forming device body 100. The attaching operation of the longitudinal direction of the toner container 32Y to the toner container accommodating part 70 is interlocked with, and the first hole 34a of the cap part 34Y engages with the main reference pin 73a (see FIG. 32 and FIG. 46) of the cap receiving part 73.

The second hole 34b (sub-reference hole) installed in the longitudinal direction from the end face of the cap part 34Y which intersects vertically in the longitudinal direction is formed in the lower part (bottom) of the cap part 34Y so that the position of the toner outlet W may not be arrived at.

The second hole 34b serves as positioning sub-reference of the cap part 34Y in image forming device body 100. The attaching operation of the longitudinal direction of the toner container 32Y to the toner container accommodating part 70 is interlocked with, and the second hole 34b of the cap part 34Y engages with sub-reference pin 73b (see FIG. 32 and FIG. 46) of the cap receiving part 73.

The second hole 34b is a long hole which makes the vertical direction the longitudinal direction (this the "direction of a stretcher" differs from the meaning of the "direction of a stretcher" of the toner container 32Y indicated in other parts), as shown in FIG. 8.

Positioning of the cap part 34Y in the toner container accommodating part 70 is performed by two holes 34a and 34b constituted in this way.

As shown in FIG. 8, at the flat surface which intersects vertically in the longitudinal direction, while being a virtual altitude passing through the center of the first hole 34a, a virtual altitude passing through the center of the second hole 34b, and the same straight line, it is formed so that it may pass along the circle center of the cap part 34Y.

As shown in FIG. 14, the depth (or the longitudinal length of the main reference pin 73a) of the hole of the first hole 34a is set up for a long time than the depth (or longitudinal length of sub-reference pin 73b) of the hole of the second hole 34b.

This sets in the attaching operation of the longitudinal direction of the toner container 32Y to the toner container accommodating part 70 (the cap receiving part 73). After the engagement of the main reference pin 73a to the first hole 34a used as a positioning main standard is started, the engagement of sub-reference pin 73b to the second hole 34b used as positioning sub-reference will be started, and smooth the attaching of the toner container 32Y to the toner container accommodating part 70 (the cap receiving part 73) is allowed.

While the opening of the first hole 34a and the opening of the second hole 34b are formed in the embodiment 1 on the same virtual plane (which is a virtual plane which intersects vertically with a mounting direction), although the root part of the main reference pin 73a and the root part of sub-reference pin 73b are formed on the same virtual plane (it is a virtual plane which intersects vertically with a mounting direction). In a case where these openings or root parts are not formed on the same virtual plane, the distance difference of the mounting direction of the position of the point of the main reference pin 73a, and the position of the point of sub-reference pin 73b are formed to be longer than the distance difference of the mounting direction of the position of the opening of the first hole 34a, and the position of the opening of the second hole 34b.

After the engagement of the main reference pin 73a to the first hole 34a used as a positioning main standard is started like the embodiment 1, the engagement of sub-reference pin 73*b* to the second hole 34*b* used as positioning sub-reference will be started.

The first hole 34*a* long in the longitudinal direction in this way is formed in the ceiling part (portion which is not buried in toner) of the cap part 34Y. The influence which it has on the conveyance characteristic (mobility) of the toner in cap part 34Y will not arise. The second hole 34*b* short in the longitudinal direction is formed in the bottom of the cap part 34Y.

However, it can install using the short space from the end face of the cap part 34Y to the position of the toner outlet W, and the function as positioning sub-reference is fully exhibited.

As shown in FIG. 11 and FIG. 12, the first engagement part 34*e* and 34*f* of the second engagement part as a specification part which regulate the horizontal posture which intersects vertically in the longitudinal direction of the cap part 34Y in image forming device body 100 (the cap receiving part 73) are formed in the ceiling part of the cap part 34Y.

The first engagement part 34*e* and 34*f* of the second engagement part all, while projecting in the vertical direction upper part from the outer circumference surface of the cap part 34Y so that it may become a line symmetry form to the virtual altitude passing through the hole center of the first hole 34*a* when it sees in the part (which is a part which is parallel to the front view of FIG. 8) which intersects vertically in the longitudinal direction, it is installed in the longitudinal direction (it is a space vertical direction of FIG. 8).

Figure 29:
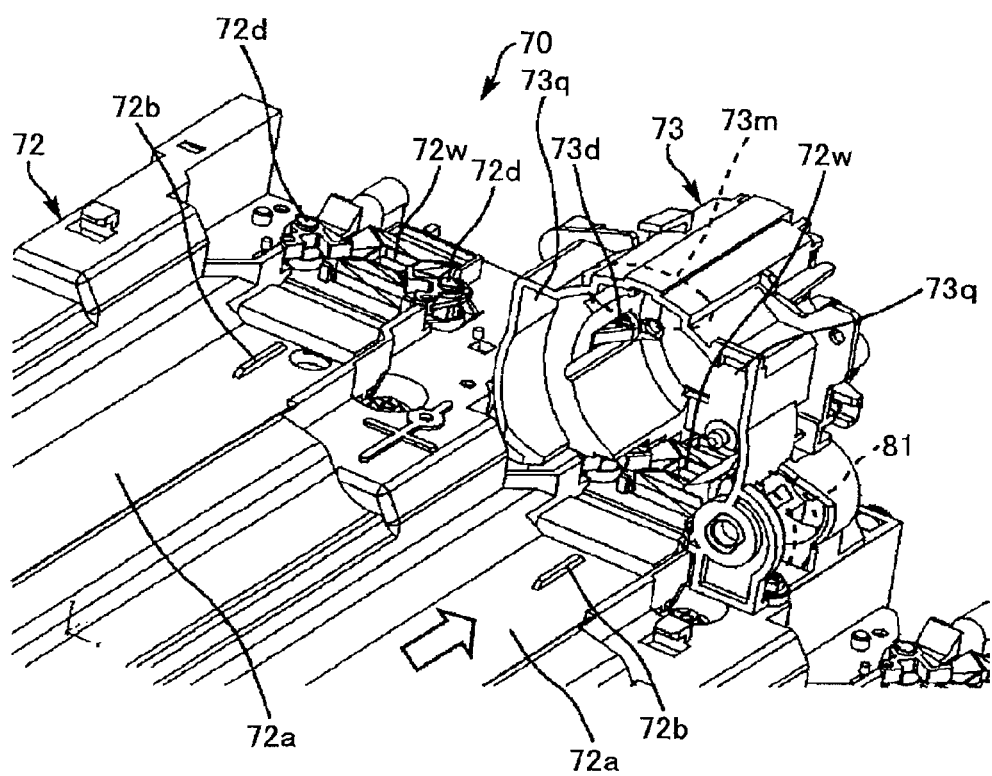
FIG. 29 is a diagram showing a portion of the toner container accommodating part in the neighborhood of the container receiving part.

The first engagement part 34*e* and 34*f* of the second engagement part engage with the engagement part 73*m* of the cap receiving part 73 shown in FIG. 29. While the horizontal posture of the cap part 34Y is regulated and cap part 34Y is detached and attached to the cap receiving part 73, the horizontal posture of the cap part 34Y in the state in which the cap receiving part 73 is equipped with cap part 34Y is regulated. The first engagement part 34*e* (specification part) is formed right above the first hole 34*a*, and when it sees in the part which intersects vertically in the longitudinal direction, it has a rectangular part. The lobe 34*e*1 to which the first engagement part 34*e* projects in the longitudinal direction (mounting direction) to the end face of the first hole 34*a* is formed. The head of the lobe 34*e*1 is formed in tapered shape as shown in FIG. 11.

On the other hand, the second engagement part 34*f* is formed in the both sides of the first engagement part 34*e* so that the first engagement part 34*e* may be pinched. It engages with the engagement part 73*m* formed in the cap receiving part 73 so that the first engagement part 34*e* and 34*f* of the second engagement part may enter. Since the tapered shape lobe 34*e*1 in the first hole 34*a* engages with the engagement part 73*m* ahead of the second engagement part 34*f* when the cap part 34Y is attached to the cap receiving part 73, and the attaching operation of the cap part 34Y to the cap receiving part 73 can be performed smoothly.

As shown in FIGS. 11 and 12, shoulder parts 34*q* are formed at the outer circumference parts of the portion of the cap part 34Y which forms the accommodating part 34*z*. The upper surface and the side comprise a flat surface, and this shoulder 34*q* is constituted so that those flat surfaces may perform rectangular cross.

When the shoulder 34*q* equips the toner container accommodating part 70 with toner container 32Y, it is interlocked with the attaching operation and contacts positioning part 73*q* (see FIG. 29) provided in the cap receiving part 73 of the toner container accommodating part 70.

Therefore, the deflection of the cap part 34Y in the cap receiving part 73 will be controlled, and the attaching of the cap part 34Y to the cap receiving part 73 will be performed smoothly.

As shown in FIG. 11 and FIG. 12, pressing part 34*c* which projects on the outer circumference surface of the cap part 34Y is formed in the method part of both sides of the cap part 34Y, respectively.

The cap part 34Y is attached to the cap receiving part 73 of the toner container accommodating part 70 (the image forming device body 100) with the pressing part 34*c*. Or when breaking away, it is pressed in the direction which resists the force of the mounting direction (or the detaching operation direction) by the pressing part 73*d* of the cap receiving part 73 (see FIG. 29 and FIGS. 37-39).

Therefore, the user can perform the attaching operation of the toner container 32Y to the cap receiving part 73. Or in the detaching operation, after feeling the reaction force which resists the control force of a mounting direction (or the detaching operation direction) in the position where pressing part 34*c* and the pressing part 73*d* are engaged, the control force of a mounting direction (or the detaching operation direction) will be heightened, and the attaching operation (or detaching operation) will be completed at a stretch.

Therefore, the user can get a high click feeling in the attaching operation (or detaching operation) of the toner container 32Y to the cap receiving part 73.

As shown in FIG. 8, the pressing part 34*c* formed in the method part of both sides of the cap part 34Y is on the virtual horizontal surface passing through the center of the point (which is the small-diameter portion where the pressing part 34*c* and the non-compatible shape part 34*g* are formed) of the cap part 34Y, and is provided on the outer circumference surface, respectively.

The pressing part 34*c* projects on the horizontal sides from the outer circumference surface of the cap part 34Y so that it may be disposed on the virtual horizontal line passing through the middle point for the imaginary line which connects the hole center of the first hole 34*a*, and the hole center of the second hole 34*b* when it sees in the part which intersects vertically in the longitudinal direction, it is installed in the longitudinal direction (it is a space vertical direction of FIG. 8).

The pressing part 34*c* is formed in the longitudinal direction (mounting direction) as shown in FIG. 11 and FIG. 12. The form of the pressing part 34*c* is formed so that the inclination on the side of the head is smaller than the inclination on the side of the container main part. Thereby, the user can perform the attaching/detaching operation smoothly in the attaching/detaching operation of the toner container 32Y to the cap receiving part 73, obtaining a high click feeling.

As shown in FIG. 11 and FIG. 12, on the end face of the cap part 34Y, an RFID chip 35 as an electronic data storage medium in which various electronic data items are stored is disposed in the installation part 34*k* (surrounded by the convex part) formed between the first hole 34*a* and the second hole 34*b*. The RFID chip 35 is disposed so that the RFID chip 35 is positioned at a predetermined distance apart from and faces the antenna 73*e* (the RFID antenna) of the cap receiving part 73 when the cap part 34Y is attached to the toner container accommodating part 70 (the cap receiving part 73). The RFID chip 35 performs non-contact communications (wireless communications) with the antenna 73e in the state in which the cap part 34Y is held by the cap receiving part 73.

In the embodiment 1, the RFID chip 35 is fixed to the position between the first hole 34a (the main reference hole) and the second hole 34b (sub-reference hole). The position of the RFID chip 35 to the antenna 73e of the cap receiving part 73 is defined with high precision. Therefore, it is possible to prevent poor communications from occurring due to the deviation of the RFID chip 35 to the antenna 73e.

The lobe 34e1 and the projections 34m are formed to project to the front side (which is the right-hand side in FIG. 14) from the convex part (rib) formed in the circumference of the installation part 34k, respectively. In a case where the toner container 32Y is placed in an inverted state with the cap part 34Y facing the bottom and the container main part 33Y facing the top, the problem that the RFID chip 35 held in the installation part 34k contacts the standing surface directly and thereby being damaged will be prevented by the lobe 34e1 and the projections 34m.

As shown in FIGS. 11 and 12, the non-compatible shape part 34g for ensuring the incompatibility of the toner container 32Y is provided on the outer circumference surface of the cap part 34Y. The non-compatible shape part 34g is constituted to fit into the fitting part 73c (see FIG. 32) of the cap receiving part 73 only when the attaching operation of the toner container 32Y to the toner container accommodating part 70 is proper (or when the toner container 32Y is attached to the right position of the toner container accommodating part 70).

As shown in FIG. 8 and FIGS. 27A-27C, the non-compatible shape part 34g has a shape that is varied depending on the color of the toner contained in the toner container (the container main part).

Figure 27A:
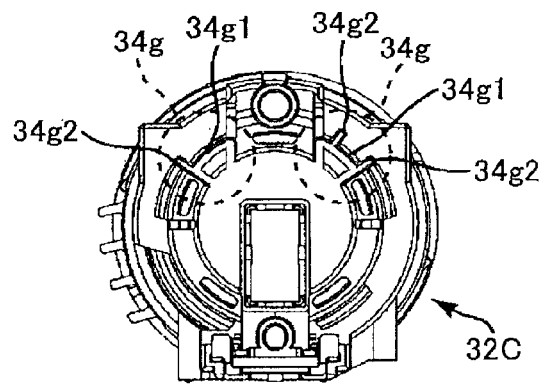
FIGS. 27A-27C are diagrams showing the toner containers of different kinds when viewed from the cap part side.

As shown in FIG. 27A, the non-compatible shape part 34g of the toner container 32C corresponding to cyan is constituted to have a shape that can fit into only the fitting part 73c of the toner container accommodating part 70 for the cyan.

Figure 27B:
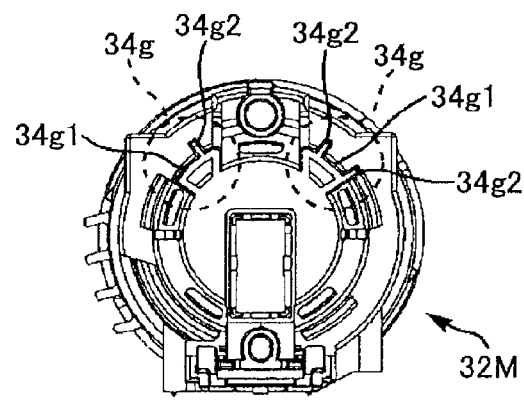

As shown in FIG. 27B, the non-compatible shape part 34g of the toner container 32M corresponding to magenta is constituted to have a shape that can fit into only the fitting part 73c of the toner container accommodating part 70 for the magenta.

As shown in FIG. 8, the non-compatible shape part 34g of the toner container 32Y corresponding to yellow is constituted to have a shape that can fit into only the fitting part 73c of the toner container accommodating part 70 for the yellow.

Figure 27C:
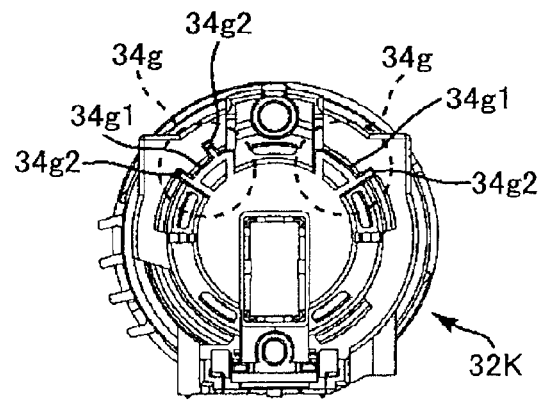
Figure 28A:
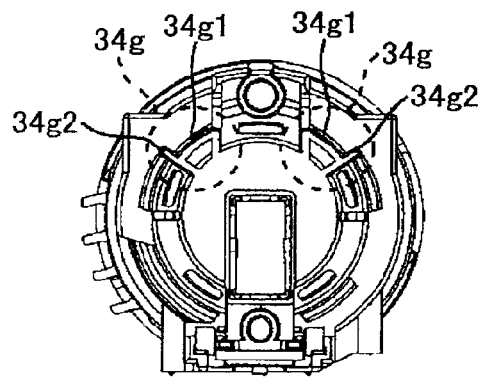
FIGS. 28A-28E are diagrams showing a toner container of another embodiment when viewed from the cap part side.
Figure 28B:
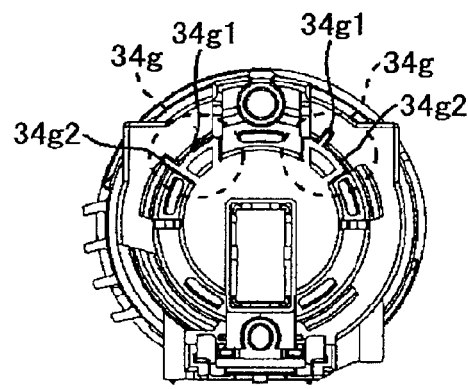
Figure 28C:
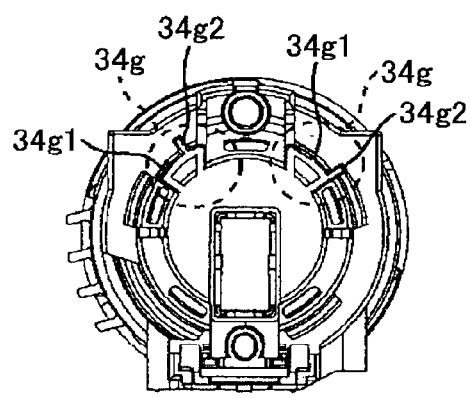
Figure 28D:
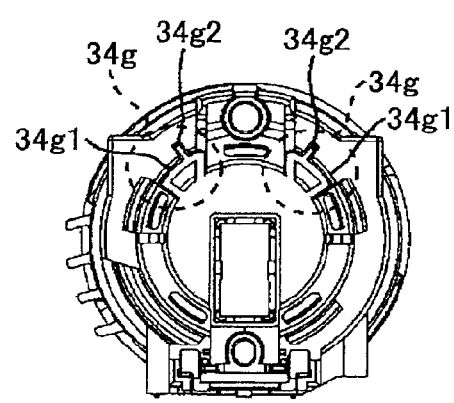
Figure 28E:
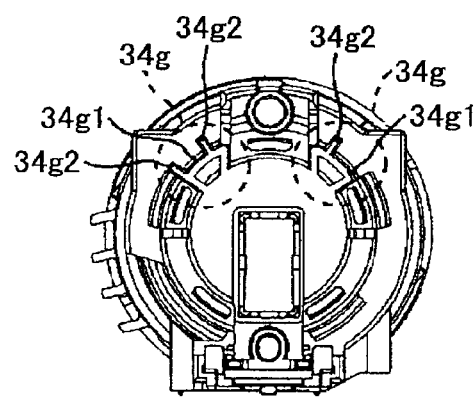

As shown in FIG. 27C, the non-compatible shape part 34g of the toner container 32K corresponding to black is constituted to have a shape that can fit into only the fitting part 73c of the toner container accommodating part 70 for the black.

By this composition, it is possible to prevent the problem that the toner container of a different color (for example, the toner container for the yellow) is set to the toner container accommodating part of a predetermined color (for example, the toner container accommodating part for the cyan) resulting in the non-formation of a desired color image. That is, the wrong setting of the toner container to the toner container accommodating part is prevented.

Alternatively, the shapes of the non-compatible shape parts 34g for different toner containers as shown in FIGS. 28A-28E may be used instead of those shown in FIG. 8 and FIGS. 27A-27C.

The cap part 34Y in the embodiment 1 is formed so that the non-compatible shape part 34g has a convex or concave shape, extends along the longitudinal direction of the container main part 33Y side, and is arranged to confront from the position of the head end of the cap part 34Y in the longitudinal direction toward the container main part 33Y. The non-compatible shape parts 34g are formed so that the point (which is a point on the right-hand side of FIG. 14) may be located in the mounting direction side (it is on the right-hand side of FIG. 14) rather than the toner outlet W.

If it is the color from which the toner container differs when performing the attaching operation of the toner container 32Y as shown in FIG. 4 with constituting in this way, the non-compatible shape part 34g provided at the head of the cap part 34Y will interfere without engaging with the fitting part 73c of the cap receiving part 73, the problem that the toner with which the opening operation of the shutter member 34d with which the toner outlet W of the cap part 34Y is covered is started, and color differs will turn to image forming device body 100, and will be accidentally supplied from the toner outlet W is prevented certainly.

The image forming device 100 in the embodiment 1 is constituted so that slide movement may be performed horizontally (the longitudinal direction) and the attaching operation may be completed, after the toner container 34Y is laid from the upper part to the toner container accommodating part 70, as shown in FIG. 4.

It is necessary to judge the incompatibility of the toner container in the position of the cap receiving part 73 in the toner container accommodating part 70. Therefore, the composition of providing the non-compatible shape part 34g at the head of the cap part 34Y as mentioned above becomes useful. These parts are two projections formed in the head upper part of the cap part 34Y radially the non-compatible shape part 34g with reference to FIGS. 8 and 12.

Next, the non-compatible shape parts 34g of various shapes which can be formed will be described with reference to FIGS. 27A-27C or FIGS. 28A-28E.

It is not necessary to manufacture the kind of the toner container (cap part), and the metallic mold of the same number. By this composition, the cap part which has two or more kinds of incompatibility with one metallic mold can be formed, and the manufacturing cost of the kinds of the whole the toner container can be reduced.

As shown in FIGS. 11 and 12, the non-compatible shape parts 34g are disposed above cap part 34Y. By this even if it is a case where the longitudinal direction received horizontally, and toner container 32Y (cap part 34Y) inclined, and is inserted to the cap receiving part 73, the non-compatible shape part 34g interferes in the position of fitting part 73c of the cap receiving part 73, and judgment of the incompatibility of the toner container mentioned above can be ensured.

Since the kind of the toner container is specified, the non-compatible shape part 34g formed in the point of the cap part 34Y make a different position on the outer circumference surface of the cap part 34Y extend in the shape of a convex along the longitudinal direction for every kind.

Although the non-compatible shape part 34g of the cap part 34Y are formed in the shape of a convex and fitting part 73c of the cap receiving part 73 is formed in the concave part in the embodiment 1, the non-compatible shape part 34g of the cap part 34Y can be formed in a concave part, and fitting part 73c of the cap receiving part 73 can also be formed in the shape of a convex.

Since the destination of the toner container is pinpointed in cap part 34Y in the embodiment 1 with reference to FIG. 12, 34h of convex parts for non-compatibility are formed. The convex part 34h is constituted so that the image forming device body 100 may fit into the fitting member (not illustrated) formed in the container receiving part 72.

As shown in FIG. 12, a notch 34x (insertion opening) at which the part of the gear 33c of the container main part 33Y is exposed is formed in the outer circumference surface of the cap part 34Y.

Figure 40:
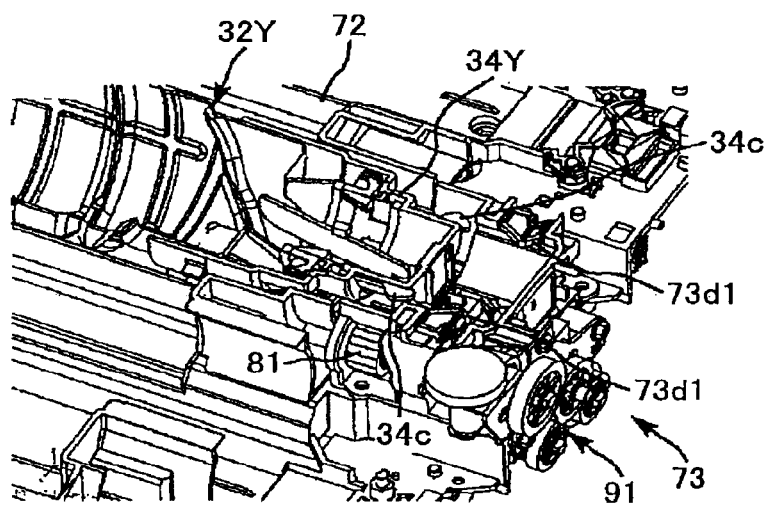
FIG. 40 is a diagram showing the state in which the cap part of the toner container is attached to the cap receiving part of the toner container accommodating part.
Figure 41:
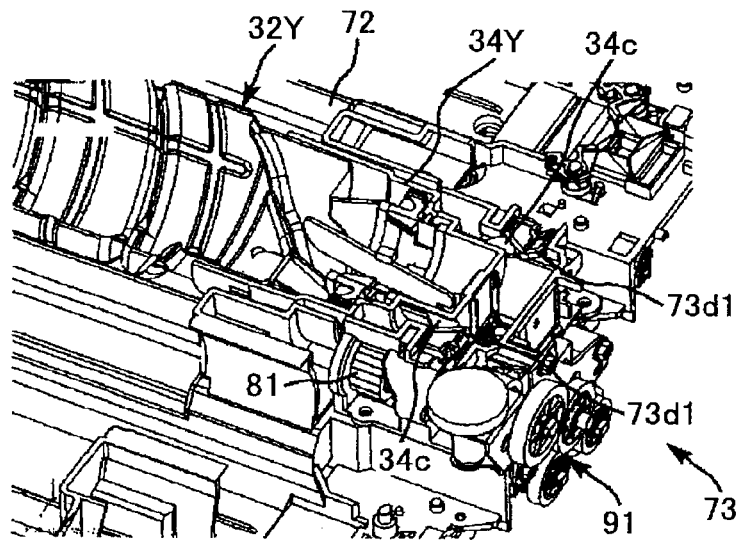
FIG. 41 is a diagram showing the state following the state of FIG. 40.

The drive gear 81 (the portion indicated by the dotted line in FIG. 29) in which the gear 33c exposed from the notch 34x of the cap part 34Y is installed in the cap receiving part 73 where the toner container accommodating part 70 is equipped with toner container 32Y (see FIGS. 40-42). It gears and the container main part 33Y rotates with the gear 33c by the drive gear 81.

As shown in FIG. 13 and FIG. 14, when the shutter member 34d opens the toner outlet W, the shutter accommodating part 34n which store the shutter member 34d inside are formed in the bottom of the cap part 34Y. The shutter accommodating parts 34n are the portions into which the bottom of the accommodating part 34z bulged toward the lower part.

The shutter accommodating part 34n form the space that the rectangular portion projects below. The portion (the accommodating part 34z) in which the container main part 33Y is inserted, and the shutter accommodating part 34n are not divided with the wall, but form a series of space. Therefore, in the state in which the container main part 33Y is inserted in the cap part 34Y, a part will be vacant as for the space of the rectangle in the lower part of the accommodating part 34z.

Figure 20:
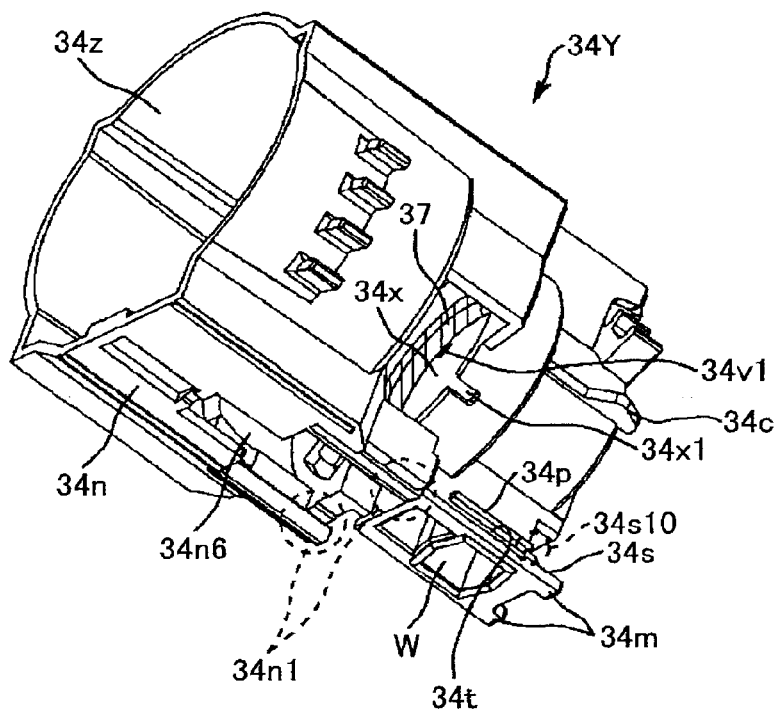
FIG. 20 is a diagram showing the cap part when the shutter member is taken out.

The shutter accommodating parts 34n hold the shutter deforming parts 34d2 after the shutter member 34d opens the toner outlet W. As shown in FIGS. 11 and 12, the slide groove 34n1 (the first rail part) is formed in the internal surface of the shutter accommodating part 34n, which functions as a rail part to which it shows the opening/closing action of the shutter member 34d with the shutter rail 34t (the second rail part as shown in FIG. 20). The slide groove 34n1 is a groove which extends in parallel with the longitudinal direction of the cap part 34Y, and is installed from the front side (it is a method of the right of FIG. 14) of the shutter accommodating part 34n.

The slide groove 34n1 and the shutter rail 34t are formed in parallel with the longitudinal direction by each. The shutter rail 34t does not extend to the shutter accommodating part 34n, but a gap exists between the shutter rail 34t and the shutter accommodating part 34n.

The composition and operation of the shutter member 34d will be described.

The cap part 34Y as described above is open for free passage on the container main part 33Y via the opening A, and discharges the toner discharged from the opening A from the toner outlet W (which is moved in the direction indicated by the dotted line arrow in FIG. 3).

In the embodiment 1, as shown FIG. 14, the pillar-like hollow part B (space) is formed in the inside of the cap part 34Y so that it may extend in the longitudinal direction (which is the longitudinal direction in FIG. 14). The inside diameter of the hollow part B is formed smaller than the inside diameter of the accommodating part 34z (in which the head of the container main part 33Y is inserted) shown in FIG. 17.

The toner drop passage C is formed in the inside of the cap part 34Y and arranged in a pillar-like configuration having a fixed passage area (passage sectional area) to the toner outlet W from the circumference of the lower part of the hollow part B. The toner discharged by the hollow part B of the cap part 34Y from opening A of the container main part 33Y will perform prudence drop of the pillar-like configuration the toner drop passage C, and will be discharged smoothly (toner tank part 61Y) out of a container from the toner outlet W.

Figure 21:
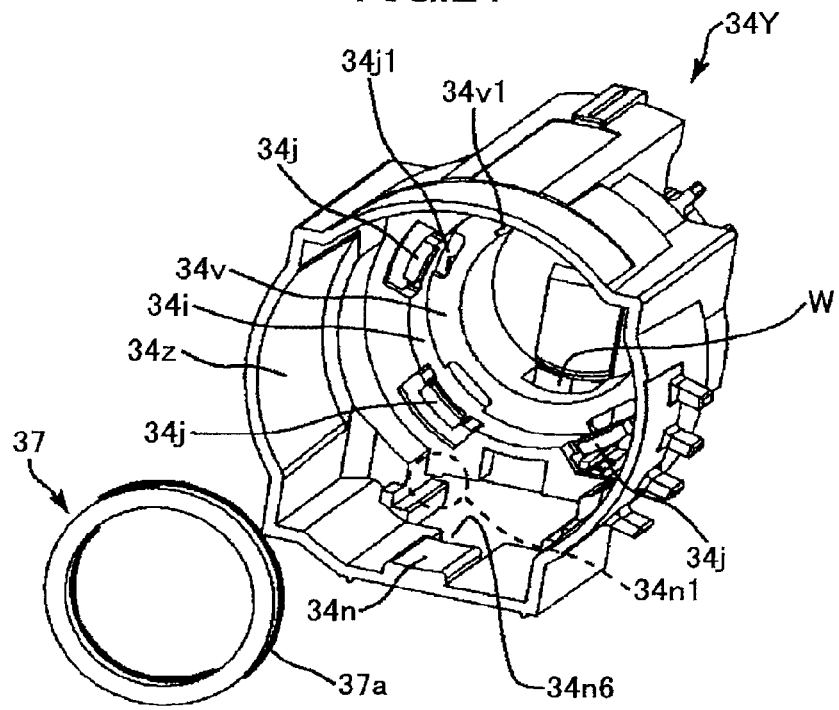
FIG. 21 is a diagram showing the state in which the sealing material is taken out from the cap part of FIG. 19.
Figure 22:
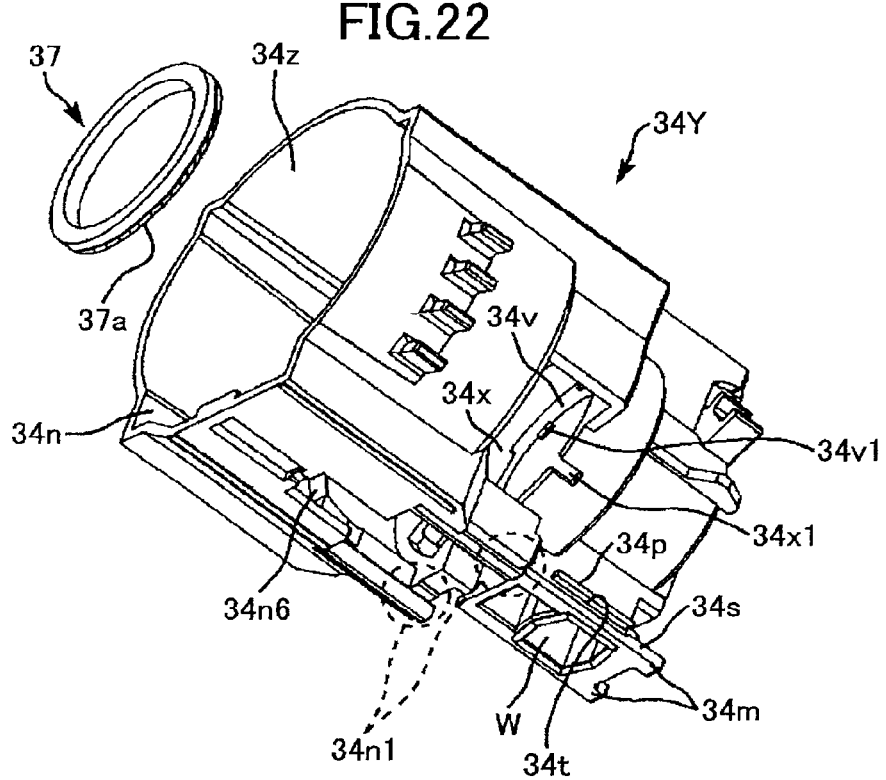
FIG. 22 is a diagram showing the state in which the sealing material is taken out from the cap part of FIG. 20.

As shown in FIG. 21 and FIG. 22, the cap part 34Y (in the state in which the shutter member 34d, the shutter seal 36, the cap seal 37, and the RFID chip 35 are taken out) welds two or more casts, and is not formed, but is formed by integral molding. The cap part 34Y has a complicated structure and includes the claw part 34j, the non-compatible shape part 34g, the pressing part 34c, the toner outlet W, the toner drop passage C, etc.

In order to really form the cap part 34Y of such a complicated structure by molding, without using two or more pairs of metallic molds, as shown in FIG. 23, when the cap part 34Y is seen in the plane of projection which intersects vertically in the longitudinal direction, it is necessary to arrange the claw parts 34j and the holes 34j1 and 34j3 for molding provided in the neighborhood of the claw parts 34j, the non-compatible shape part 34g, the pressing parts 34c, the toner outlet W, and the toner drop passage C, so that these parts do not mutually overlap other parts. Especially, the claw parts 34j and the holes 34j1 and 34j3 for molding must be arranged so that these parts do not overlap with other parts (including the non-compatible shape part 34g, the pressing part 34c, the toner outlet W, the toner drop passage C, etc.).

Interpolation part 34z and claw part formation part 34i by which claw part 34j is formed between the hollow parts B are formed in the cap part 34Y. The claw part formation part 34i is formed so that the diameter of the perimeter is smaller than the diameter of the perimeter of the accommodating part 34z and larger than the diameter of the perimeter of the portion in which the hollow part B is formed.

Similarly, the claw part formation part 34i is formed so that the diameter of the inner circumference is smaller than the diameter of the inner circumference of the accommodating part 34z, and larger than the diameter of the inner circumference of the portion in which the hollow part B is formed.

In order that the claw part 34j may fit into the bottle mouth part 33a (the opening A) of the container main part 33Y, the hooking portion which projects to the inside is formed at the head.

FIGS. 24A and 24B show metallic molds 200 for carrying out the injection molding of the cap part 34Y which includes the claw part 34j. The metallic mold 200 includes the inner die 201 and the die body 202.

As shown in FIG. 24A, when the dies 201 and 202 are set, the resin material which is melted is poured to the space between the dies 201 and 202. After a cooling process is performed, the claw part 34j (the cap part 34Y) is formed.

Subsequently, as shown in FIG. 24B, after the dies 201 and 202 are separated, the claw part 34j (the cap part 34Y) is taken out.

In order to form the hooking portion of the claw part 34j, the rising part 202a is formed in the die body 202. In order to separate the dies 201 and 202, the first hole 34j1 for molding for taking out the rising part 202a of the die body 202 is formed near the claw member 34j in the cap part 34Y.

Specifically, the wall is set up between the perimeter of the claw part formation part 34i and the perimeter of the hollow part B, and the first hole 34j1 is formed in this wall. This hole is equivalent to the first hole 34j1 formed in the inner circumference side of the claw part 34j in FIG. 23.

The first hole 34j1 formed in the inner circumference side of the claw part 34j is formed in the adhesion surface 34v on which the cap seal 37 is stuck as shown in FIG. 21. However, in order to satisfy the function (sealing characteristic of the container main part 33Y and the cap part 34Y) of the cap seal 37, the position of the first hole 34j1 is excluded and most cap seals 37 may be installed on the adhesion surface 34v.

The second hole 34j3 formed in the outer circumference surface side of the claw part 34j as shown in FIG. 23 is provided for forming the back surface of the claw part 34j (the side on which the hooking portion does not project). Specifically, the second hole 34j3 is the opening formed in the surface of the rising wall between the claw part formation part 34i and the accommodating part 34z.

As shown in FIG. 23, the notch 34x in the claw part 34j formed in the lower right position serves as the second hole 34j3. As shown in FIG. 23, the recess 34j2 in the claw part 34j formed in the uppermost position serves as the second hole 34j3.

Thus, in the embodiment 1, the cap part 34Y is formed by integral molding. Compared with the case where adhesion or welding of two or more molding parts is performed, the problem of inaccurate dimensions of the cap part due to the variation in the accuracy of adhesion or welding can be prevented.

Therefore, the gap between the container main part 33Y and the cap part 34Y will be maintained with good accuracy. The problem of degradation of the sealing characteristic between the components 33Y and 34Y with the cap seal 37, and the problem of shifting of the position of the toner outlet W of the cap part 34Y from the toner replenishment mouth 72w of the image forming device body 100 causing toner scattering can be prevented. The cap part 34Y is formed by integral molding, and the mechanical intensity of the cap part 34Y can be increased when compared with the case where adhesion or welding of two or more molding parts is performed. The cost of metallic molds can be reduced.

As shown in FIGS. 19-22, the annular cap seal 37 is stuck on the opposite surface (the surface which faces the bottle mouth part 33a around the opening A of the container main part 33Y and the adhesion surface 34v) of the cap part 34Y. The cap seal 37 is provided for closing the gap between the container main part 33Y and the cap part 34Y around the opening A, and is formed of an elastic material (a foamed resin material, such as a foamed polyurethane).

As shown in FIGS. 21 and 22, the hollow part 34v1 for separating the cap seal 37 from the cap part 34Y is formed in the adhesion surface 34v of the cap part 34Y in the embodiment 1. The notch 34x is an insertion opening in which the cylindrical fixture for separating the cap seal 37 from the cap part 34Y is inserted is formed in the position on the outer circumference surface of the cap part 34Y which faces the position in which the recess 34v1 is formed. A recess 34x1 used as the fulcrum point of the above-mentioned fixture is formed in the part of the notch 34x (the insertion opening). Even if it is a case where it maintains when it recycles toner container 32Y (cap part 34Y), cap seal 37 is easily separable from cap part 34Y with such composition.

Specifically, a cylindrical fixture (for example, a phillips screwdriver) may be inserted from the notch 34x (the insertion opening) and the head of the fixture may be inserted in the recess 34v1. That is, the head of the fixture is inserted in the part of the underside (the adhesion surface side) of the cap seal 37.

The cap seal 37 is separated for the recess 34x1 from adhesion surface 34v as the fulcrum point, carrying out engagement of the center part of the cylindrical fixture to recess 34x1. The film member 37a is stuck on the surface where the cap seal 37 in the embodiment 1 is stuck on the cap part 37Y. The film member 37a is hard compared with the foamed resin material which is formed of a material, such as a polyester film, and constitutes the main part of the cap seal 37. The separation operation characteristic by the fixture mentioned above will improve.

The recess 34v1 for separating the cap seal 37 is formed in the position corresponding to the inner circumference side of the cap seal 37, and formed in the position corresponding to the outside of the region of the region where the cap seal 37 contacts the container main part 33Y. That is, the recess 34v1 is formed so that the portion which separated from the region which actually contributes to sealing characteristic in cap seal 37 may be faced.

The problem that the sealing characteristic of both components 33Y and 34Y falls by this so that cap seal 37 inserted between the container main part 33Y and cap part 34Y may not change into by the recess 34v1 is prevented.

The cap seal 37 is disposed on the container main part 33Y side in the longitudinal direction (it is a left of FIG. 14) to the pressing part 34c in which the cap part 34Y in the embodiment 1 is installed in the longitudinal direction as shown in FIG. 20. The pressing part 34c projects from the outer circumference surface of the cap part 34Y and enlarges the outer diameter of the cap part 34Y. By forming the cap seal 37 with a certain amount of attachment range (or the outer diameter of the cap part 34Y) is needed according to the size of the bottle mouth part 33a (the opening A) of the container main part 33Y in a separate position, enlargement (the large diameter) of the cap part 34Y can be prevented.

The cap part 34Y is formed so that the outer diameter of the point in which pressing part 34c is formed may become smaller than the outer diameter of the portion in which adhesion surface 34v of the cap seal 37 is formed. Therefore, even if the pressing part 34c is formed, the outer diameter does not become so large, but the point of the cap part 34Y can secure the adhesion surface of the cap seal 37 somewhat greatly.

That is, without enlarging the cap part 34Y, the high sealing characteristic of the container main part 33Y and the cap part 34Y will be maintained, and the attaching/detaching operation of the toner container 32Y will be performed smoothly.

As shown in FIG. 11 and FIG. 14, the installation part 34k for installing the RFID chip 35 is formed in the end face of the cap part 34Y. The installation part 34k is a wall part formed so that the circumference thereof projects from the end face of the cap part 34Y. The pedestal part for fixing the four corners of the RFID chip 35 of the rectangle is provided in the four corners of the rectangular wall part inside the installation part 34k. By placing the RFID chip 35 on the pedestal part, the electronic device formed on the back surface (which faces the first member 34Y1) of the RFID chip 35 may not contact the first member 34Y1. After the RFID chip 35 is disposed on the installation part 34k, the RFID chip 35 is laid on the pedestal part, and by applying heat and pressure to the portion of the pedestal part, cooling solidification and joining of the four corners of the RFID chip 35 is performed.

As shown in FIG. 20, the shutter rail 34t (the second rail part) for showing the shutter member 34d to the both sides, and moving them in the longitudinal direction so that the shutter member 34d may open and close the toner outlet W is formed in the bottom of the cap part 34Y. The shutter rail 34t has the direction of the shorter side (which intersects vertically to the longitudinal direction of the toner container 32Y and is the vertical direction in FIG. 14) to the edge of the bottom in which the toner outlet W is formed. The overhang part is installed and formed in the longitudinal direction (a direction parallel to the longitudinal direction of the toner container 32Y). The end of this overhang part functions as the vertical walls 34s explained below.

Figure 45:
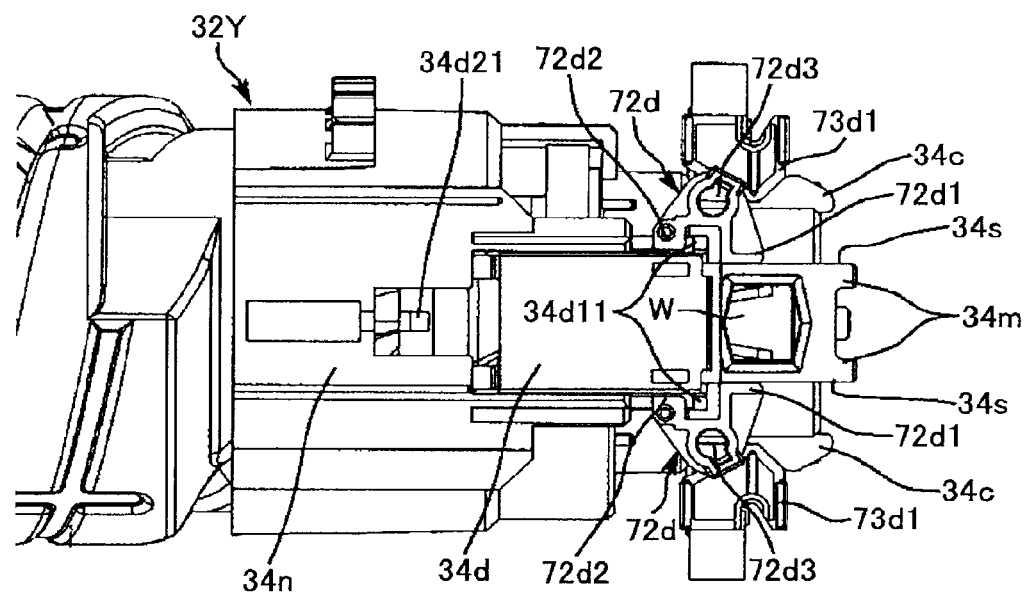
FIG. 45 is a diagram showing the state following the state of FIG. 44.

The two vertical walls 34s formed in the both-sides edge of the cap part 34Y respectively are continuously formed to the position which projects in the longitudinal direction (mounting direction) from the end of the close direction of the shutter member 34d to the position which closes the toner outlet W (see FIG. 45). The lock projection which stops the shutter member 34d to avoid falling out to the front side is provided in the upper end surface of the shutter rail 34t.

In the embodiment 1, the portion which functions as the shutter rail 34t is a portion prolonged in the container main part 33Y side from the lock projection mentioned above. The vertical walls 34s are further prolonged toward the front side from the position of the lock projection mentioned above. The heights 34m which project from the end face which intersects vertically in the longitudinal direction (mounting direction) are formed in the cap part 34Y. The heights 34m are disposed near the lower end of the second hole 34b so that the second hole 34b may be pinched in the direction of the shorter side (it is a space vertical direction of FIG. 14). The two vertical walls 34s are constituted so that the vertical plane of the side edge in the heights 34m may be included respectively. That is, the vertical plane of the side edge of the outside of the heights 34m is formed to be the vertical walls 34s as the ribs formed in the shutter rail 34t and the same surface.

The bottom of the two heights 34m is prolonged to the respectively same height as the rib (the edge of the hole 34b) which forms the second hole 34b.

The head part of the heights 34m in the shape can be connected, one tabular height can be formed, and the both side surfaces of the height can also be used as 34s of vertical wall.

The vertical walls 34s constituted in this way are pinching sides which are pinched by the first sandwiching part 72d1 of the shutter close mechanism 72d (shutter pinching mechanism) in the cap receiving part 73 (the toner container accommodating part 70) (see FIG. 45). That is, the posture of the shutter member 34d in the cap part 34Y set to the cap receiving part 73 is defined by the shutter close mechanism 72d which also functions as a shutter pinching mechanism. Hence, that installed in the mounting direction (which is the right direction in FIG. 45) for a long time as 34s of vertical wall which function as a pinching side are mentioned above.

As opposed to the timing in which the shutter close mechanism 72d closes the shutter member 34d thoroughly when taking out the toner container 32Y from the toner container accommodating part 70, the shutter close mechanism 72d (the second sandwiching part 72d2) can delay the timing which cancels holding of the shutter member 34d on the vertical walls 34s.

Hence, the problem that the toner container 32Y is taken out from the device body part 100 before the shutter member 34d closes the toner outlet W thoroughly will be prevented. Especially, the point of the longitudinal direction of 34m of two heights (mounting direction) in the last timing in case the cap part 34Y separates from the cap receiving part 73 since it is in the position projected in the longitudinal direction (mounting direction) from the end face of the first hole 34a, release of holding of the shutter member 34d by 72d (72d2 of the second sandwiching part) of shutter close mechanisms is performed, and the effect of preventing poor closing of the shutter member 34d mentioned above will become positive. The composition and operation of 72d (shutter pinching mechanism) of shutter close mechanisms will be described later with reference to FIG. 43-FIG. 45.

Figure 17:
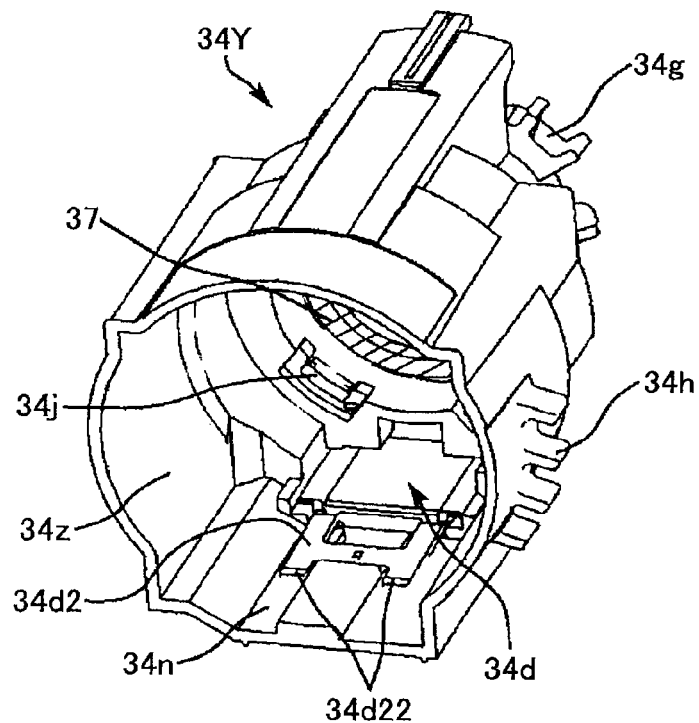
FIG. 17 is a diagram showing the inside of the cap part in the state of FIG. 16.

The shutter member 34d to which the shutter seal 36 is stuck on the opposite surface with the toner outlet W is installed in the bottom of the cap part 34Y. The shutter member 34d is for opening and closing the toner outlet B, which is interlocked with the attaching/detaching operation of the toner container 32Y to the toner container accommodating part 70, as shown in FIGS. 15-17.

Figure 25:
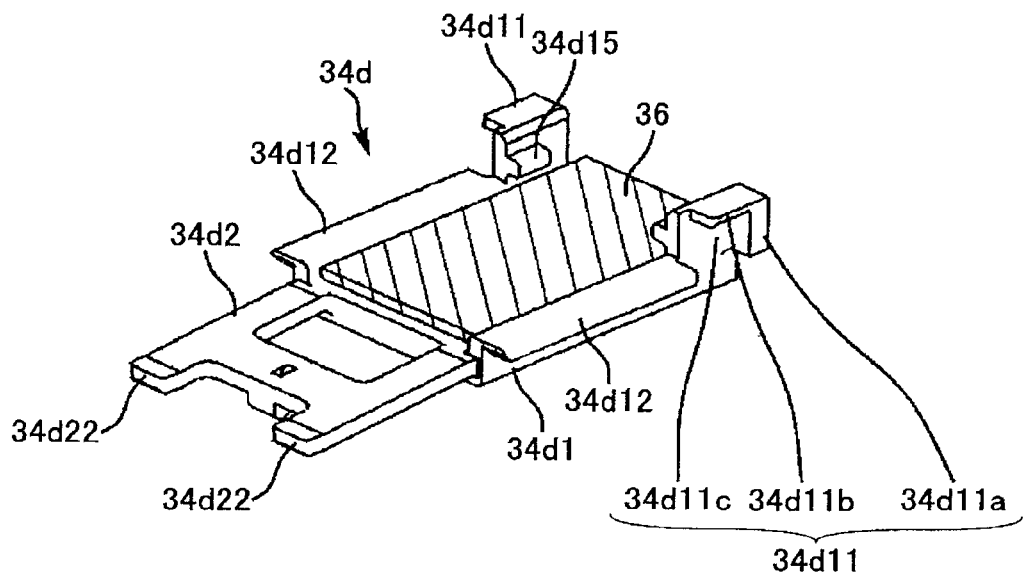
FIG. 25 is a diagram showing a shutter member.
Figure 26:
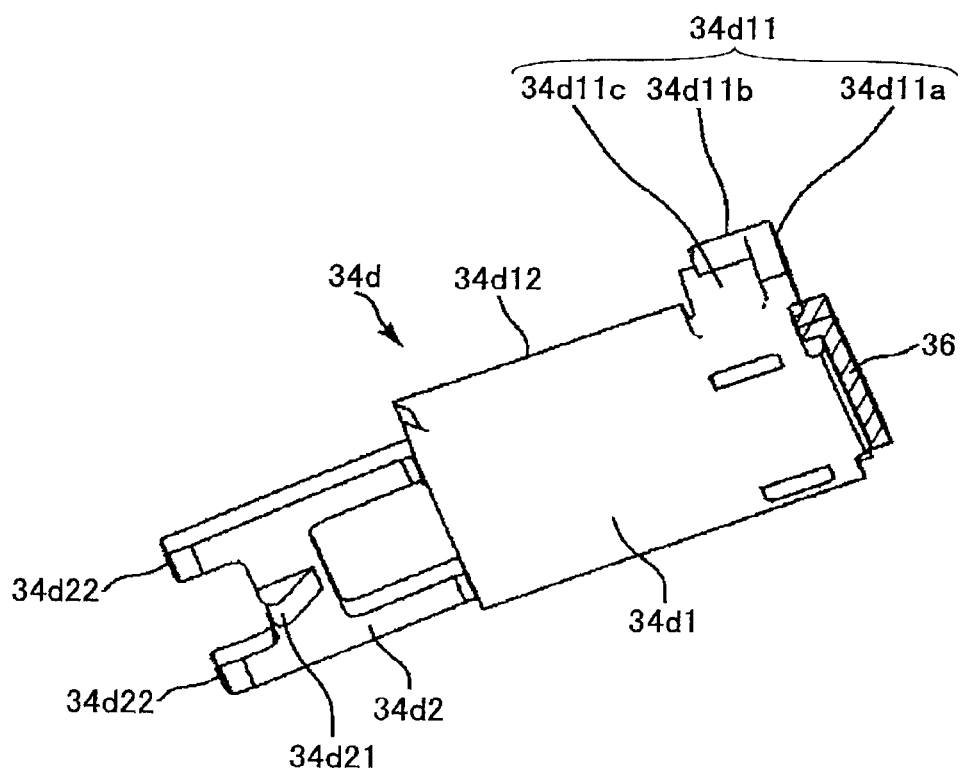
FIG. 26 is a diagram showing a shutter member.

As shown in FIGS. 25 and 26, the shutter member 34d is constituted to include the shutter main part 34d1 and the shutter deforming part 34d2. The shutter deforming part 34d2 projects to the side of the container main part 33Y from the shutter main part 34d1, and has a thickness smaller than the thickness of the shutter main part 34d1. One pair of shutter sliders 34d12 are formed on the outer sides of the shutter main part 34d1, and one pair of shutter rail engagement parts 34d15 are formed on the inner sides of the shutter main part 34d1. The shutter sliders 34d12 are projections formed in the side part of the shutter main part 34d1 in parallel to the insertion direction of the toner container 32Y. The shutter rail engagement parts 34d15 are projections formed inside the shutter main part 34d1 at a predetermined distance from the shutter seal 36.

The shutter sliders 34d12 of the shutter main part 34d1 are engaged with the slide grooves 34n1 of the cap part 34Y (the first rail part), and engaged so that the shutter rail 34t (the second rail part) of the cap part 34Y is inserted between the shutter seal 36 and the shutter rail engagement parts 34d15 of the shutter main part 34d1. The shutter main part 34d1 opens and closes the toner outlet W because the shutter member 34d moves along with these rail parts 34n1 and 34t.

In the embodiment 1, the longitudinal length (the length of the toner container 32Y in the insertion direction) of the slide groove 34n1 (the first rail part), formed in the shutter accommodating part 34n as shown in FIG. 20, is smaller than the longitudinal length of the shutter rail 34t (the second rail part).

The shutter seal 36 as a seal member is stuck on the upper surface (which faces the toner outlet W) of the shutter main part 34d1. The shutter seal 36 is for preventing leakage of toner from the space between the toner outlet W and the shutter main part 34d1 in the state in which the shutter main part 34d1 (the shutter member 34d) closes the toner outlet W. The shutter seal 36 may be formed of a foamed resin material, etc.

As shown in FIGS. 25 and 26, the shutter seal 36 in the embodiment 1 is disposed to project in the longitudinal direction (mounting direction) from the end of the shutter member 34d in the close direction. As shown in FIGS. 25 and 26, the shutter main part 34d2 is formed integrally with the shutter deforming part 34d2 of the shutter member 34d, and the part 34d21 of the shutter main part 34d2 is formed to make elastic deformation possible in a sliding direction on the connecting location (the portion indicated by the dotted line in FIG. 18B).

The shutter deforming part 34d2 of the shutter main part 34d1 is disposed in the container main part 33Y side in the longitudinal direction (see FIG. 15). The stopper part 34d22 and the stopper release part 34d21 are formed in the shutter deforming part 34d2. The shutter deforming part 34d2 is installed to have an inclination toward the lower part (the lower part of FIG. 14) from the shutter main part 34d1.

The stopper part 34*d*22 of the shutter deforming part 34*d*2 is the wall part formed in the end part of the shutter deforming part 34*d*2 in the opening direction (the left direction in FIG. 18A). This regulates movement of the shutter member 34*d* in the direction which opens the toner outlet W from the state which closes the toner outlet W when the stopper part 34*d*22 contacts the contact part 34*n*5 formed in the container part 34*n*22 of the cap part 34Y.

The stopper release part 34*d*21 of the shutter deforming part 34*d*2 is formed to project to the lower part in the vertical direction. By receiving an external force from the lower part, the stopper release part 34*d*21 moves up the stopper part 34*d*22 in connection with elastic deformation of the shutter deforming part 34*d*2, canceling the contact state of the contact part 34*n*5. The stopper release part 34*d*21 is the projection with slopes formed on both sides in the longitudinal direction, which is formed between the stopper part 34*d*22 and the connecting location (which is a connecting location of the shutter main part 34*d*1 and the shutter deforming parts 34*d*2).

The stopper release part 34*d*21 is interlocked with the attaching operation of the toner container 32Y to the toner container accommodating part 70, and contacts the stopper release energizing part 72*b* (see FIG. 29) formed in the container receiving part 72. When it is pushed up by the stopper release energizing part 72*b*, elastic deformation of the shutter deforming part 34*d*2 is performed upward, and the stopper part 34*d*22 is moved up. In this way, the contact state of the stopper part 34*d*22 and the contact part 34*n*5 is canceled, and movement of the shutter member 34*d* in the opening direction is allowed.

In the embodiment 1, the shutter deforming part 34*d*2 inclines toward the lower part and is pushed up by the stopper release energizing part 72*b*. By elastic deformation of the shutter deforming part 34*d*2, the inclination is canceled and it is linear to the shutter main part 34*d*1. Therefore, the amount in which two bend backward up to the shutter deforming part 34*d*1 within the shutter accommodating part 34*n* in the shutter main part 34*d* decreases (or the amount bending backward becomes zero). Therefore, the problem of two contacting the container main part 33Y in 34*d* of shutter deforming parts contained in shutter accommodating part 34*n* will be prevented, and the space which is the shutter accommodating part 34*n* will be utilized effectively.

Next, operation of the shutter member 34*d* interlocked with the attaching operation of the toner container 32Y to the toner container accommodating part 70 will be described with reference to FIGS. 18A-18C.

The positions of the shutter member 34*d* in FIG. 18A and FIG. 18C are equivalent to the positions of the shutter member 34*d* in FIG. 15 and FIG. 16, respectively. As shown in FIG. 18A, the attaching operation (which is a movement to the right part in FIG. 18A) of the toner container 32Y to the toner container accommodating part 70 is started.

When the stopper release part 34*d*21 of the shutter member 34*d* has not arrived at the position of stopper release energizing part 72*b* (FIG. 29) formed in the container receiving part 72, the stopper part 34*d*22 of the shutter member 34*d* is in contact with the stopper part 34*n*5, and movement of the shutter member 34*d* in the opening direction is regulated.

Subsequently, if the attaching operation of the toner container 32Y progresses, as shown in FIG. 18B, the stopper release part 34*d*21 is pushed up by the stopper release energizing part 72*b* and the shutter deforming part 34*d*2 is elastically deformed on the basis of the connecting location (the portion indicated by the dotted line). Thereby, the contact state of the stopper part 34*d*22 and the contact part 34*n* is canceled, and relative movement of the shutter member 34*d* in the opening direction is allowed.

Subsequently, the shutter member 34*d* contacts the wall part (see FIG. 29) formed in the circumference of the toner replenishment mouth 72*w* of the cap receiving part 73. The movement in the toner container accommodating part 70 (the cap receiving part 73) is regulated (the shutter member 34*d* will not move in the longitudinal direction absolutely).

However, movement of the toner container 32Y in the mounting direction is advanced, relative movement of the shutter member 34*d* in the opening direction is performed.

As shown in FIG. 18C, the shutter member 34*d* moves relatively to the side of the container main part 33Y, and the shutter deforming part 34*d*2 is stored in the shutter accommodating part 34*n*. In this way, opening of the toner outlet W is completed by the movement of the shutter member 34*d* in the opening direction. At this time, the stopper release part 34*d*21 of the shutter member 34*d* is stored in the opening 34*n*6 (see FIG. 17) of the shutter accommodating part 34*n*.

The toner container 32Y in the embodiment 1 has the shutter deforming part 34*d*2 which performs elastic deformation of the shutter member 34*d* on the basis of the connecting location with the shutter main part 34*d*1. The stopper part 34*d*22 which regulates movement of the shutter member 34*d* in the opening direction, and the stopper release part 34*d*21 which cancels regulation of the movement are provided in the shutter deforming part 34*d*2. When the toner container 32Y is in the isolated state, the toner outlet W is not freely opened by the shutter member 34*d*. Only when the toner container 32Y is attached to the image forming device body 100, the opening operation which causes the shutter member 34*d* to open the toner outlet W is interlocked with the attaching operation of the toner container 32Y.

As shown in FIG. 20, at the upper part of the shutter rail 34*t*, the rib 34*p* which has a vertical surface (or a vertical surface parallel to a virtual horizontal plane) on a virtual horizontal plane containing the vertical surface 34*s* of the shutter rail 34*t* is formed across the groove to extend in the longitudinal direction. The rib 34*p* is provided to keep the 1st pinching component 72*d*1 from entering the groove above the shutter rail 34*t* when the vertical surface 34*s* of the shutter rail 34*t* is pinched by the 1st sandwiching member 72*d*1 of the shutter close mechanism 72*d* (shutter pinching mechanism) shown in FIG. 43-FIG. 45. Namely, the distance between the rib 34*p* and the shutter rail 34*t* is set up to be smaller than the height (in the vertical direction in FIG. 43) of the first sandwiching member 72*d*1.

If the rib 34*p* is formed to extend in the longitudinal direction (the longitudinal direction in FIG. 14) and to project sidewise (in the vertical direction in FIG. 14), the above function of the rib 34*p* is performed. It is not necessary that the rib 34*p* has the vertical surface mentioned above.

Figure 43:
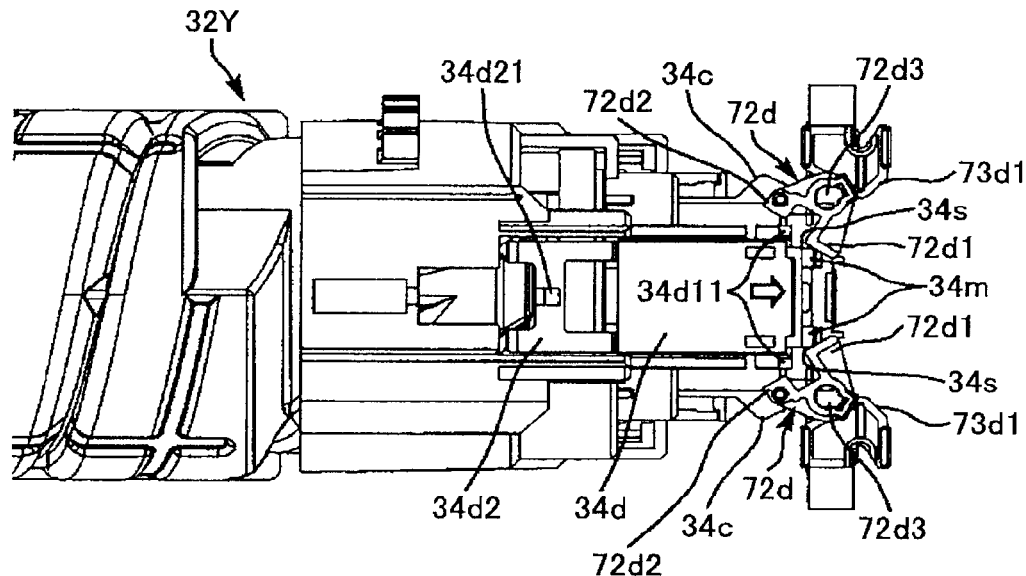
FIG. 43 is a diagram showing the state in which the shutter member of the toner container is engaged with the shutter pinching mechanism of the toner container accommodating part and opens the toner outlet.
Figure 44:
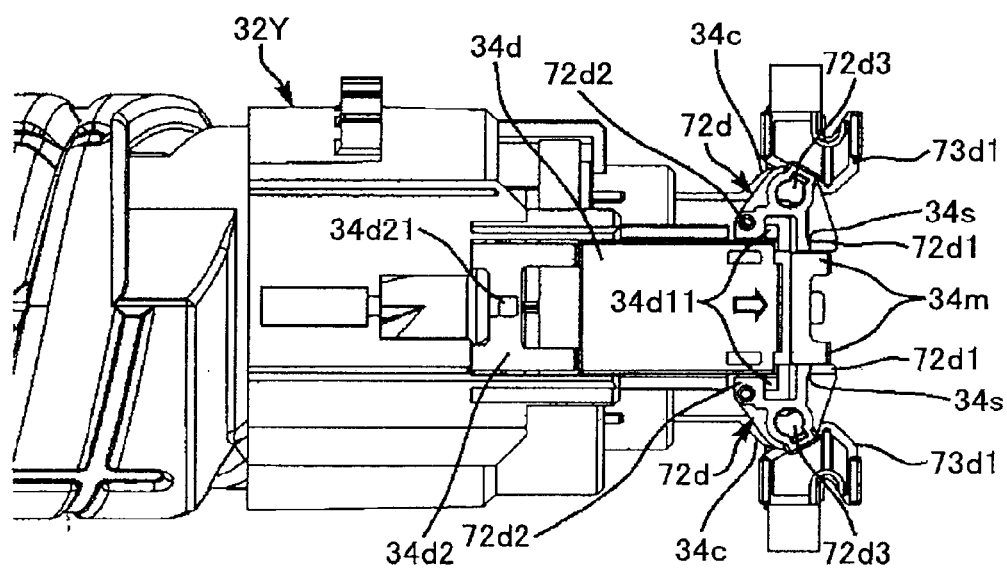
FIG. 44 is a diagram showing the state following the state of FIG. 43.

As shown in FIG. 25 and FIG. 26, one pair of sandwiching parts 34*d*11 are formed at the head end in the mounting direction and the side edge of the shutter main part 34*d*1 of the shutter member 34*d*. As shown in FIG. 43-FIG. 45, the sandwiching parts 34*d*11 are pinched by the second sandwiching member 72*d*2 (shutter pinching mechanism) of the shutter close mechanism 72*d* at the time of the opening/closing action of the shutter member 34*d*.

The sandwiching parts 34*d*11 include the engagement wall, also referred to as a front end wall, 34*d*11*a* raised at the head end of the shutter main part 34*d*1 in the mounting direction, the prevention wall, also referred to as an upper wall, 34*d*11*b* formed above the sandwiching parts 34*d*11 to extend in parallel with the mounting direction, and the side wall 34*d*11*c*.

At the time of the opening/closing action of the shutter member 34*d*, the sandwiching parts 34*d*11 of the shutter member 34*d* are pinched by the second sandwiching member 72*d*2 of shutter close mechanism 72*d* (shutter pinching mechanism) and the vertical surface 34*s* of the cap part 34Y is pinched by the first sandwiching member 72*d*1 of the shutter close mechanism 72*d* (shutter pinching mechanism). In this way, the posture of the cap part 34Y and the shutter member 34*d* in the cap receiving part 73 at the time of the opening/closing action of the shutter member 34*d* will be defined.

In the toner container 32Y in the embodiment 1, the stopper release part 34*d*21 of the shutter member 34*d*, as shown in FIG. 15, is disposed in the main part 33Y side of a container of the longitudinal direction (on the left-hand side of FIG. 14) to the non-compatible shape part 34*g* of the cap part 34Y. That is, the stopper release part 34*d*21 is formed in the left-hand side of FIG. 14 to the position in which the non-compatible shape part 34*g* is formed. If the color of the toner container differs when performing the attaching operation of the toner container 32Y as shown in FIG. 4, the non-compatible shape part 34*g* provided at the head of the cap part 34Y will contact without engaging with the fitting part 73*c* of the cap receiving part 73.

The problem that the toner with which the opening operation (release operation of stopper part 34*d*22 by the stopper release part 34*d*21) of the shutter member 34*d* with which it is covered is started, and color differs will turn to image forming device body 100, and will be accidentally supplied from the toner outlet W is prevented certainly. The image forming device 100 in the embodiment 1 is constituted so that slide movement may be performed horizontally (the longitudinal direction) and the attaching operation may be completed, after the toner container 34Y is laid from the upper part to the toner container accommodating part 70, as shown in FIG. 4.

It is necessary to judge the incompatibility of the toner container in the position of the cap receiving part 73 in the toner container accommodating part 70. Therefore, the composition of providing the non-compatible shape part 34*g* at the head of the cap part 34Y as mentioned above will be useful. In the slide groove 34*n*, the toner container 32Y in the embodiment 1 has the shutter main part 34*d*1 in the shutter member 34*d* (the first rail part) and the shutter rail 34*t* (the second rail part) as the rail parts for guiding the operation that opens and closes the toner outlet W.

As shown in FIG. 20, the slide groove 34*n*1 (the first rail part) is formed to extend in the longitudinal direction so that the side of the shutter deforming part 34*d*2 in the shutter main part 34*d*1 may be supported. On the other hand, the side in which, the shutter rail 34*t* (the second rail part) is formed to extend in the longitudinal direction so that the side of the shutter main part 34*d*1 apart from the shutter deforming part 34*d*2 may be supported. That is, both sides of the shutter main part 34*d*1 in the longitudinal direction are supported by the slide groove 34*n*1 (the first rail part) and the shutter rail 34*t* (the second rail part).

As shown in FIG. 20, the longitudinal length (which is the length of the toner container 32Y in the insertion direction) of the slide groove 34*n*1 (the first rail part) formed in the shutter accommodating part 34*n* is smaller than the longitudinal length of the shutter rail 34*t* (the second rail part) in the longitudinal direction. The slide groove 34*d*1 is formed so that the longitudinal length of the slide groove 34*d*1 is smaller than the length of the shutter slider 34*d*12 of the shutter member 34*d*.

Figure 19:
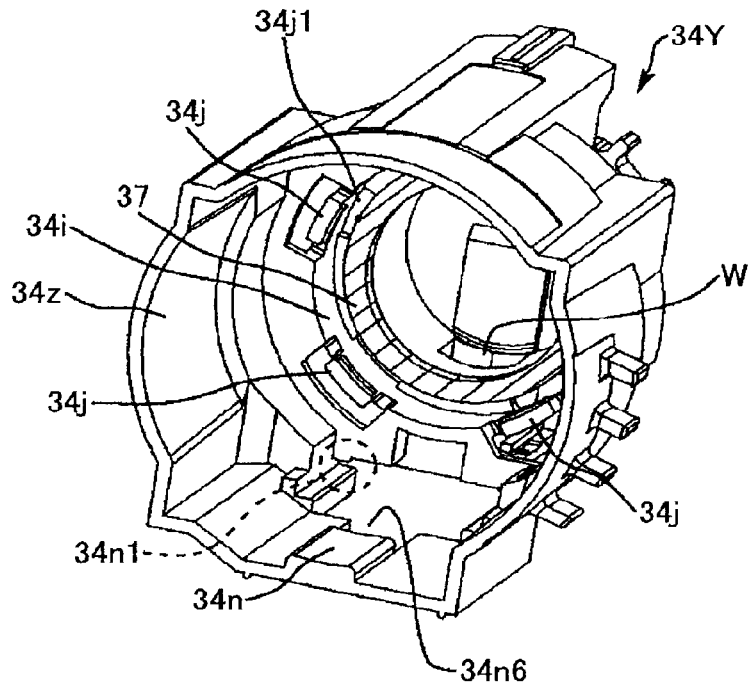
FIG. 19 is a diagram showing the cap part when the shutter member is taken out.

Specifically, as shown in FIG. 20, the shutter rail 34*t* (the groove interposed between the vertical wall 34*s* and the rib 34*p*) is formed and the longitudinal length thereof is comparatively long and about 15-20 mm. On the other hand, as shown in FIG. 19 and FIG. 20, the slide groove 34*n*1 is formed so that the longitudinal length thereof is about 1-2 mm. This groove is the groove surrounded by the upper wall, the side wall, and the lower wall as indicated the dotted line in FIG. 19 and FIG. 20). In the end of 1, 34*n* of slide groove 34*n*1 become the surface same inside cap part 34Y as other surface of the wall. That is, the longitudinal length of the slide grooves 34*n*1 is the same as the wall thickness of the cap part 34Y.

Alternatively, the cap part 34Y in the embodiment 1 may be constituted so that the distance of the portion in which the shutter member 34*d* are supported the shutter main part 34*d*1 with operation which opens the toner outlet W in 34*n* of slide grooves, and the portion supported with shutter rail 34*t* may become short.

As shown in FIG. 20, 34*n* of slide grooves the position of 1 (it is a position where 1 and shutter slider 34*d*12 contact in 34*n* of slide grooves), the distance (the distance in the longitudinal direction) of the position where the shutter rail 34*t* and the shutter slider 34*d*12 contact and becomes short gradually in connection with the opening operation of the shutter member 34*d*. Therefore, the state in which the shutter member 34*d* opens the toner outlet W (in the state of FIG. 16 and FIG. 17) is in the state in which the shutter deforming part 34*d*2 is stored by the shutter accommodating part 34*n*. The slide groove 34*n*1 is supported the shutter main part 34*d*1 in the short span and shutter rail 34*t*.

Therefore, when 1 is supported in the long span as for 34*d*1 of shutter main parts (it is in the state of FIG. 15), it compares.

The shutter main part 34*d*1 in the sliding direction the degree of the shutter deforming part 34*d*2 (elastic deformation is performed by the contact to the shutter accommodating part 34*n*) elastic deformation which are connected to the end (end on the side of the container main part 33Y) as for the shutter main part 34*d*1 becomes small.

When this is continuously seen to compensate for the opening operation of the shutter member 34*d*, the shutter deforming part 34*d*2 of shutter variant-parts/two/amount of elastic deformation It becomes the maximum when releasing of the stopper part 34*d*22 is performed by the stopper release part 34*d*21 (it is a time of 21 being pushed up by stopper release energizing part 72*b* of the device body part 100 as for the stopper release part 34*d*21).

In the shutter main part 34*d*1 also dwindles the amount of elastic deformation with gradual decrease of the span which is supported with 1 and shutter rail 34*t* in 34*n* of slide grooves after that.

Even if the state (the state of FIG. 16 and FIG. 17, and two are stored by the shutter accommodating part 34*n* in 34*d* of shutter deforming parts) in which the shutter member 34*d* have opened the toner outlet W continues by such composition for a long time, the problem of plastic deformation in the shutter member 34*d* is prevented like the state (state of FIG. 15) where the shutter member 34*d* have closed the toner outlet W. Therefore, even after the opening/closing action of the shutter member 34*d* is performed, the problem of leakage of toner from the circumference of the shutter member 34*d* can be prevented.

Since the shutter deforming part 34*d*2 amount of elastic deformation gradually decreases in connection with the opening operation of the shutter member 34*d*, the attaching operation (opening operation of the shutter member 34*d*) of the toner container 32Y will also be performed smoothly. When the shutter member 34*d* opens the toner outlet W wide thoroughly in the composition mentioned above (it is in the state of FIG. 16 and FIG. 17), the portion which is supported with shutter rail 34*t* (the second rail part) the shutter main part 34*d*1 can secede from shutter rail 34*t*, supported the shutter main part 34*d*1 (the first rail part) in 34*n* of slide grooves, it can also constitute.

In that case, since is supported the shutter main part 34*d*1 in 34*n* of slide grooves and the shutter member 34*d* can enlarge the amount of loosening further in the state in which the toner outlet W is opened wide thoroughly, the shutter deforming part 34*d*2 amount of elastic deformation also becomes still smaller and can make the effect mentioned above more effective.

In the embodiment 1, with reference to FIG. 15, 34*n* (container part) of shutter accommodating parts, the 34*n* of notches as a hole as for which the stopper release part 34*d*21 to the shutter accommodating part 34*n* reduce the contact force of 21 in the position through which 21 passes in connection with the opening operation of the shutter member 34*d* in 34*d* of the shutter deforming part 34*d*2 stopper release parts, 6 is formed. Thus, that for which 34*n* of notches provide 6 (hole) in the shutter accommodating part 34*n*, when two are stored by the shutter accommodating part 34*n* in 34*d* of shutter deforming parts in connection with the opening operation of the shutter member 34*d*, in the stopper release part 34*d*21, 21 will not contact the upper surface of the shutter accommodating part 34*n* at all (not pressed). Therefore, the shutter deforming part 34*d*2 which is subjected to elastic deformation accompanying the opening operation of the shutter member 34*d* can be made small.

In the embodiment 1, in order for the stopper release part 34*d*21 to the shutter accommodating part 34*n* to reduce the contact force of 21, the notch 34*n*6 (hole), but 34*n* of notches can also establish a slot in the same range instead of 6 (hole).

Although the notch 34*n*6 (hole) formed in the position (range) through which 21 passes in connection with the opening operation of the shutter member 34*d* in 34*d* of the shutter deforming part 34*d*2 stopper release parts in the embodiment 1, a hole or a slot can also be formed in the position which 21 stops with termination of the opening operation of the shutter member 34*d* in the stopper release part 34*d*21.

In this case, the shutter deforming part 34*d*2 is in the state of elastic deformation (the state of FIG. 16 and FIG. 17) where two are stored by the shutter accommodating part 34*n* in the shutter deforming part 34*d*2 can be made small.

The shutter accommodating part 34*n* in the embodiment 1 is for performing smoothly the opening/closing action of the shutter member 34*d*. Namely, that for which the shutter accommodating part 34*n* are provided in cap part 34Y, the state in which the shutter member 34*d* have opened the toner outlet W wide as well as the state in which the toner outlet W is closed by the shutter member 34*d*, in order to unite with the cap part 34Y, without the shutter member 34*d* projecting in the lower part from the cap part 34Y, the opening/closing action of the shutter member 34*d* is performed smoothly.

In the cap part 34Y in the embodiment 1, the five claw parts 34*j* are disposed inside in the peripheral direction side by side in order to hold the container main part 33Y rotatably, as shown in FIG. 23. The claw parts 34*j* are constituted so that one claw part 34*j* is disposed in the upper part which faces the shutter accommodating part 34*n* and all the claw parts 34*j* are not disposed in the position of the shutter accommodating part 34*n*.

As mentioned above, the shutter accommodating part 34*n* is the portion in which the shutter deforming part 34*d*2 is formed and the claw part 34*j* is not formed, and the space to the container main part 33Y becomes large. Therefore, at the bottom (where the shutter accommodating part 34*n* is provided) of the cap part 34Y, the force (restraining force) of holding the container main part 33Y becomes small.

On the other hand, in the embodiment 1, the claw part 34*j* is disposed in the upper part which faces the shutter accommodating part 34*n*. Even if the restraining force of the cap part 34Y to the lower part of the container main part 33Y tends to be weak and the container main part 33Y tends to fall on in the sliding direction, the claw part 34*j* disposed in the upper part which faces the shutter accommodating part 34*n* to be canceled will hold the container main part 33Y. Therefore, the container main part 33Y will be held with good balance by the cap part 34Y covering the peripheral direction. As shown in FIG. 14, the lobe H for making small the gap between the container main part 33Y is formed in the position near the shutter accommodating part 34*n* at the cap part 34Y in the embodiment 1.

As mentioned above, even if the restraining force of the cap part 34Y to the lower part of the container main part 33Y tends to be weak and the container main part 33Y tends to fall on in the sliding direction, the operation will be restricted because the lobe H of the cap part 34Y contacts the container main part 33Y. Therefore, the container main part 33Y will be held with good balance by the cap part 34Y.

As shown in FIGS. 16 and 45, the toner outlet W of the cap part 34Y which is opened and closed by the shutter member 34*d* is formed in the shape of a hexagon, when viewed from the vertical direction lower part.

The edge 34*r* which projects to the lower part around the toner outlet W is formed in cap part 34Y. This edge 34*r* is formed in the longitudinal direction in the pointed shaped toward the direction where the point 34*r*1 of the both sides of the longitudinal direction (the longitudinal direction in FIG. 45) separates from the center of the toner outlet W, respectively. The edge 34*r* is an edge of the shape of a hexagon which has parallel portion 34*r*2 which faces mutually along the longitudinal direction, and two vertical-angled parts 34*r*1 located in the point which faces in the longitudinal direction. The toner outlet W is formed in the shape of a hexagon so that it may meet the hexagonal shape of the edge 34*r*.

The point 34*r*1 of the longitudinal direction (which is also a direction in which the shutter member 34*d* are opened and closed) of the edge 34*r* around the toner outlet W is formed in the pointed shaped, and the shutter seal 36 stuck on the shutter member 34*d* and the slide contact at the edge 34*r*1 is started by the pointed-shape point 34*r*1 in a small area and the sliding contact surface product spreads gradually when closing the shutter member 34*d*. Thus, it is difficult to produce peeling and breakage on shutter seal 36 by contact with edge 34*r*. Since the sliding contact surface product with edge 34*r* narrows gradually also when opening the shutter member 34*d*, the damage to shutter seal 36 by contact with edge 34*r* decreases.

Figure 46:
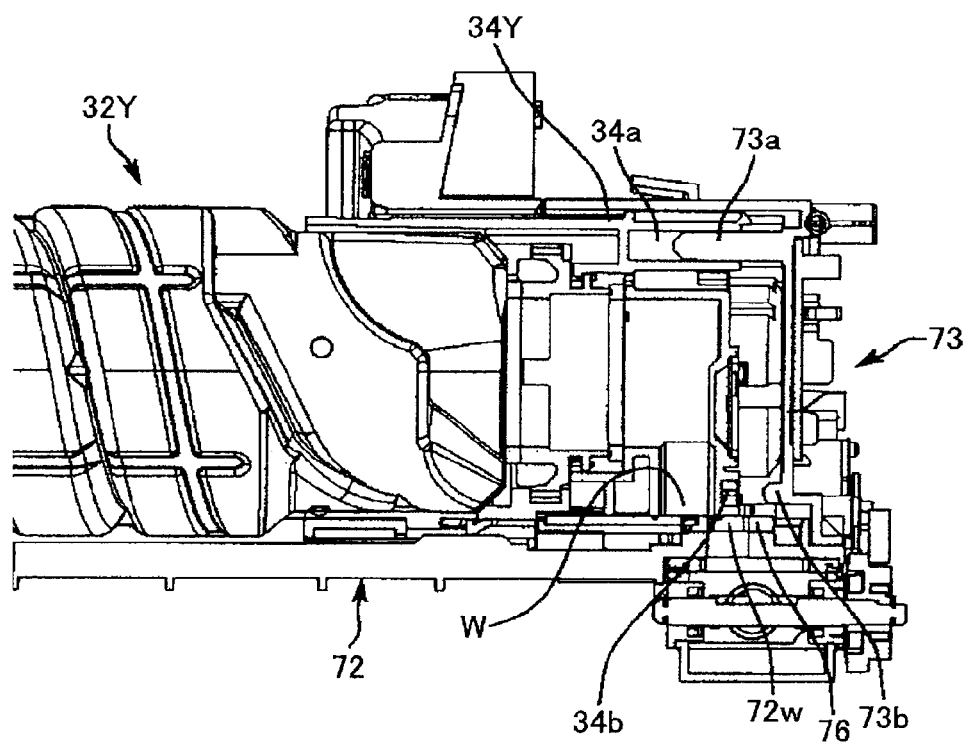
FIG. 46 is a diagram showing the state in which the cap part of the toner container is attached to the cap receiving part of the toner container accommodating part.

As shown in FIG. 46, the seal member 76 which also becomes the circumference of the toner replenishment mouth 72*w* of the cap receiving part 73 from foamed resin material is stuck, and toner scattering from toner replenishment mouth 72*w* which is open for free passage to the toner outlet W of the toner container 32Y is prevented. Even if the edge 34r of the cap part 34Y slides with the attaching operation of the toner container 32Y in the longitudinal direction to the seal member 76 installed in the circumference of the toner replenishment mouth 72w, the slide contact to the edge 34r1 and seal member 76 is started by the point 34r1 in a small area and the sliding contact surface product spreads gradually, and it becomes difficult to produce peeling and breakage in seal member 76 of the toner replenishment mouth 72w by contact with edge 34r.

Since the sliding contact surface product of seal member 76 of the toner replenishment mouth 72w and edge 34r narrows gradually also when performing detaching operation of the longitudinal direction of the toner container 32Y, the damage to seal member 76 of the toner replenishment mouth 72w by contact with edge 34r decreases.

Therefore, the problem that the toner stored in the toner container 32Y disperses outside with the attaching/detaching operation of the toner container 32Y to the device body part 100 is prevented.

As shown in FIG. 16, in the embodiment 1, the edge 34r of the cap part 34Y is formed in tapered shape so that the amount which projects to a lower part may gradually decrease, as the surface (which is a surface adjacent to the point 34r1) turned to in the longitudinal direction (which is the longitudinal direction in FIG. 45) is separated from the center of the toner outlet W.

If the shutter seal 36 stuck on the shutter member 34d with the attaching/detaching operation of the longitudinal direction of the toner container 32Y is worn with the edge 34r, it is possible to prevent the damage on the shutter seal 36. If the seal member 76 (see FIG. 46) provided in the circumference of the toner replenishment mouth 72w of the cap receiving part 73 is worn with the edge 34r with the attaching/detaching operation of the longitudinal direction of the toner container 32Y, it is possible to prevent the damage in the seal member 76.

In the embodiment 1, the toner which satisfies the following requirements is used in the toner containers 32Y, 32M, 32C and 32K. Assuming that Dn (micrometer) denotes the number average particle diameter and Dv (micrometer) denotes the volume average particle diameter, the requirements for the toner are represented by the following.

$$3 <= Dv <= 8 \quad (1)$$

$$1.00 <= Dv/Dn <= 1.40 \quad (2)$$

By using the toner satisfying the requirements of the above formulas, selection of the toner particles according to an image pattern is performed at the time of a developing process and good image quality is maintained, even if the toner is agitated in the developing device for a long time, good development characteristic is maintained. The toner will be delivered efficiently and certainly, without blocking the toner replenishment passage of the tube 71.

Typically, measurement of the volume average particle diameter and the number average particle diameter of the toner can be performed using the "Coulter counter TA-2" (made by Coulter company) or the "Coulter multisizer 2" (made by Coulter company).

In the embodiment 1, the spherical shape particle toner which is formed so that the shape factor SF-1 is in a range of 100-180 and the shape factor SF-2 is in a range of 100-180 is used as the toner contained in the toner containers 32Y, 32M, 32C and 32K. Lowering of cleaning performance can be prevented this maintaining high transfer efficiency. The toner will be delivered efficiently and certainly, without blocking the toner replenishment passage of the tube 71.

The shape factor SF-1 represents the spheroidicity of the toner particles, and can be determined in accordance with the following formula.

$$SF\text{-}1 = (M^2/S) \times (100\pi/4)$$

In the above formula, M is a maximum grain size in the plane of projection of the toner particles, and S is the area of the plane of projection of the toner particles. Therefore, the toner particles whose shape factor SF-1 is 100 are true spheres, and the spheroidicity is reduced as the shape factor is increased from 100.

The shape factor SF-2 represents the degree of unevenness of the toner particles, and it can be determined in accordance with the following formula.

$$SF\text{-}2 = (N^2/S) \times (100/4\pi)$$

In the above formula, N is a circumference in the plane of projection of the toner particles, and S is the area of the plane of projection of the toner particles. Therefore, the toner particles whose shape factor SF-2 is equal to 100 do not have unevenness, and the unevenness is increased as the shape factor is increased from 100.

The shape factor SF-1 and the shape factor SF-2 are determined by the analysis and search of the photographic image of the toner particles captured with the scanning electron microscope "S-800" (made by Hitachi, Ltd.) with the image analyzing device "LUSEX3" (made by Nireco Corp).

Next, the toner container accommodating part 70 (the container receiving part 72, the cap receiving part 73) will be described with reference to FIGS. 29-46. As shown in FIG. 4, the container receiving part 72 and the cap receiving part 73 are formed in the toner container accommodating part 70.

As shown in FIG. 29 and FIG. 30, the bottle abutment 72a is formed in the container receiving part 72 for every color. The container receiving part 73 is formed also in the cap receiving part 73 for every color, the toner containers 32Y, 32M, 32C, and 32K corresponding to each are inserted (it is insertion of a white arrow direction), and each cap part is held by non rotation by each the container receiving part 72.

In FIGS. 29, 30, 34-36, and 40-42, in order to illustrate the composition of the container receiving part 72, the illustration of some cap parts is omitted among the four cap receiving parts 72.

As shown in FIGS. 29-31, the bottle abutment 72a, the stopper release energizing part 72b, the shutter close mechanism 72d as a shutter pinching mechanism, the toner replenishment mouth 72w, the seal member 76, etc. are formed in the container receiving part 72 of the toner container accommodating part 70.

The bottle abutment 72a functions as a sliding surface of the toner container 32Y at the time of the attaching/detaching operation of the toner container 32Y, and after the set of the toner container 32Y is completed, it functions as the maintenance part of the container main part 33Y to rotate.

The stopper release energizing part 72b is a rib of the trapezoidal shape formed in the cap receiving part 73 side (it is a mounting direction lower stream side of the toner container 32Y) in the bottle abutment 72a.

The stopper release energizing part 72b is for being interlocked with the attaching operation of the toner container 32Y, the stopper release part 34d21 of shutter member 34Y pushing up 21, and 34d of stopper part 22 and 34n of contact parts canceling the contact state of 5 (it is for making possible opening operation of the shutter member 34d).

As shown in FIGS. 29-31, 43-45, 72d (shutter pinching mechanism) of shutter close mechanisms are the positions on the container receiving part 72 covered with the cap receiving part 73, and are disposed in the mounting direction upstream side of the toner container 32Y to toner replenishment mouth 72w.

The shutter close mechanism 72d are one pair of components of the horseshoe shape disposed so that the sliding direction of FIG. 43 might be faced, and the pivot parts 72d3 are disposed to be rotatable around the torsion coil spring.

The first sandwiching part 72d1 is formed in the one end side, and 72d (shutter pinching mechanism) of shutter close mechanisms are formed in the other end side in 72d2 of the second sandwiching part.

At the time of the opening/closing action of the shutter member 34d in the toner container 32Y as explained previously, the two second pinching components 72d11 are pinched to the sandwiching parts 34d1 of the shutter member 34d, and the vertical surfaces 34s of the cap part 34Y are pinched to the first pinching components 72d1. The shutter member 34d in the cap receiving part 73 at the time of the opening/closing action of the shutter member 34d and the posture of the cap part 34Y are defined, and a smooth opening/closing action becomes possible.

Operation of the shutter close mechanism 72d (shutter pinching mechanism) accompanying the opening/closing action of the shutter member 34d will be described later with reference to FIGS. 43-45.

As shown in FIGS. 29-33, the cap receiving part 73 of the toner container accommodating part 70 is provided with the main reference pin 73a, sub-reference pin 73b, fitting part 73c, the pressing part 73d, the engagement part 73m, antenna 73e (the RFID antenna), drive gear 81, bearing 73k, etc.

As explained using FIG. 11, the main reference pin 73a and the sub-reference pin 73b are engaged with the first hole 34a and the second hole 34b of the cap part 34Y, respectively. Positioning of the cap part 34Y in the cap receiving part 73 is performed.

Figure 32:
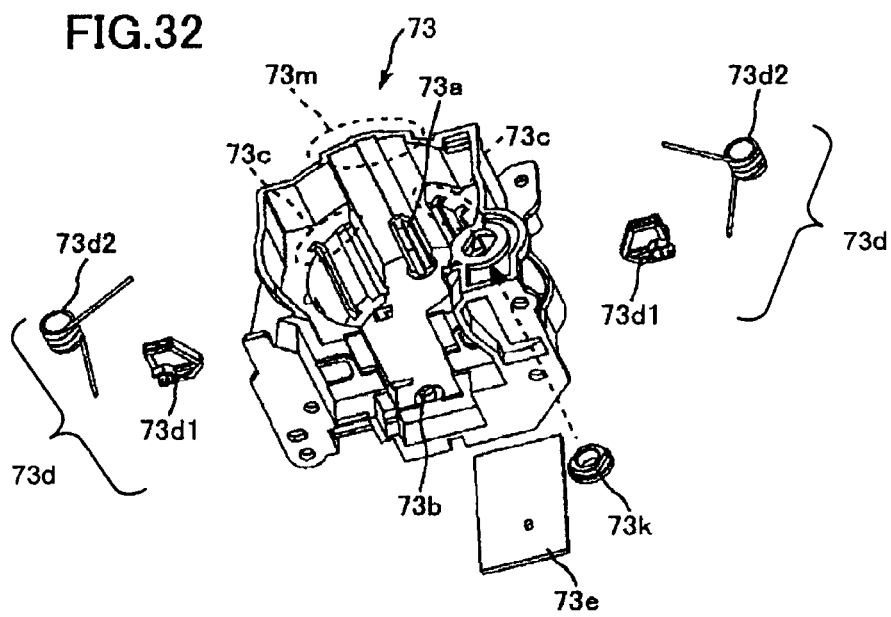
FIG. 32 is an exploded diagram showing a container receiving part of the toner container accommodating part.

Here, with reference to FIG. 32 and FIG. 46, the main reference pin 73a is formed in the longitudinal direction for a long time rather than sub-reference pin 73b (the position of the datum level used as a root part is formed on the same flat surface).

The main reference pin 73a and sub-reference pin 73b are installed in the longitudinal direction (it is a path of insertion of the toner container 32Y) by each. The point tapers off and the main reference pin 73a has form.

When performing the attaching operation of the toner container 32Y to the cap receiving part 73 in the longitudinal direction, a smooth attaching operation of the toner container 32Y to the cap receiving part 73 is allowed. The engagement parts 73m are engaged with the first engagement part 34e and 34f (specification part) of the second engagement part which are formed in cap part 34Y of the toner container 32Y.

While the posture of the cap part 34Y is regulated and cap part 34Y is detached and attached to the cap receiving part 73 by this, the posture of the cap part 34Y in the state in which the cap receiving part 73 is equipped with cap part 34Y is regulated. The fitting part 73c is engaged with the non-compatible shape part 34g formed in the point of the cap part 34Y of the toner container 32Y. Thus, that for which the fitting part 73c corresponding to the non-compatible shape part 34g of the toner container 32Y is formed in the cap receiving part 73

The nonconformity by which wrong setting of the toner container (for example, it is the toner container of yellow) of different color is performed to the toner container accommodating part (for example, it is the toner container accommodating part of cyan) of predetermined color is prevented.

Here, the fitting part 73c is formed in the side near the container receiving part 72 of the longitudinal direction in the cap receiving part 73 with reference to FIG. 32. Since the non-compatible shape part 34g provided at the head of the cap part 34Y will interfere by this, without engaging with fitting part 73c of the cap receiving part 73 first of all, the problem that the toner with which the opening operation of the shutter member 34d with which the toner outlet W of the cap part 34Y is covered is started, and color differs will turn to image forming device body 100, and will be accidentally supplied from the toner outlet W is prevented certainly. The image forming device 100 in the embodiment 1 is constituted so that slide movement may be performed horizontally (the longitudinal direction) and the attaching operation may be completed, after the toner container 34Y is laid from the upper part to the toner container accommodating part 70, as shown in FIG. 4. It is necessary to judge the incompatibility of the toner container in the cap receiving part 73 in the position near the container receiving part 73. Therefore, the composition of forming fitting part 73c in the side near the container receiving part 72 as mentioned above becomes useful.

In the attaching operation of the toner container 32Y so that stopper release energizing part 72b may engage with 21 in the stopper release part 34d21 of the cap part 34Y after the non-compatible shape part 34g of the cap part 34Y fit into fitting part 73c, the positional relationship of stopper release energizing part 72b and fitting part 73c is set up.

Since the opening operation of 45d of shutter members will be performed by this after a judgment of incompatibility is made, the effect which deters the problem to which the toner which prevents the wrong setting of the toner container mentioned above, and with which color differs is supplied will become still more positive.

It is for bearing 73k supporting the driving shaft of drive gear 81 in actuator 91 free rotation to the cap receiving part 73 with reference to FIGS. 31-33 and FIG. 40.

The antenna 73e is installed in the end face on the side of the back in the cap receiving part 73.

This antenna 73e is for performing non-contact wireless communications which are installed in the end face of the cap part 34Y of the toner container 32Y, and the RFID chip 35 (see FIG. 5 and FIG. 9).

Figure 33:
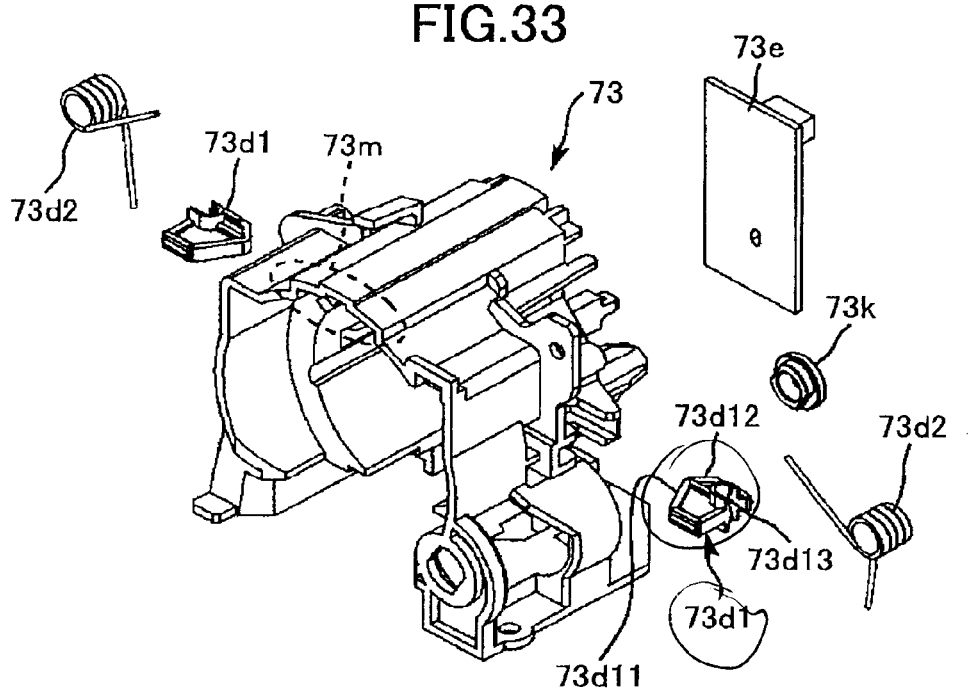
FIG. 33 is an exploded diagram showing the container receiving part of the toner container accommodating part.

As shown in FIGS. 31-33, the pressing parts 73d of the cap receiving part 73 are the mounting direction lower stream sides of the toner container 32Y, and are installed in both side walls of the container receiving part 73. As shown in FIG. 31-FIG. 33, the pressing part 73d includes the slide block 73d1 and the torsion spring 73d2.

With reference to FIG. 33, the slide block 73d1 is formed so that the inclination 73d12 on the side of the back is smaller than the inclination 73d11 on the side of the container receiving part 72. The slide block 73d1 is preferably a one-piece component which is molded, formed, or machined out of plastic, resin, Teflon, or other desirable material, for example, although multi-piece slide blocks can be used, if desired. Thereby, the user can perform the attaching/detaching operation smoothly during the attaching/detaching operation of the toner container 32Y to the cap receiving part 73, obtaining a high click feeling, which indicates the container is securely mounted.

Slide block 73*d*1 includes a recess (hollow part) 73*d*13 which holds or receives the end of torsion spring 73*d*2. The slide block 73*d*1 is inserted in the insertion opening 73*d*6 of the cap receiving part 73 as shown in FIG. 31, and the coil part of torsion spring 73*d*2 is inserted in the shank 73*d*5 of the cap receiving part 73. The other end of the torsion spring 73*d*2 is held against the block or protrusion 73*d*7 of the cap receiving part 73.

The torsion spring 73*d*2 is an elastic body which urges the slide block 73*d*1 towards the pressing part. Alternative elastic bodies may be used such as other types of springs or elastic elements such as a coil spring, a leaf spring, or a compression spring. Further, the elastic body can be made out of metal, plastic, or resin, or any other suitable material.

Figure 37:
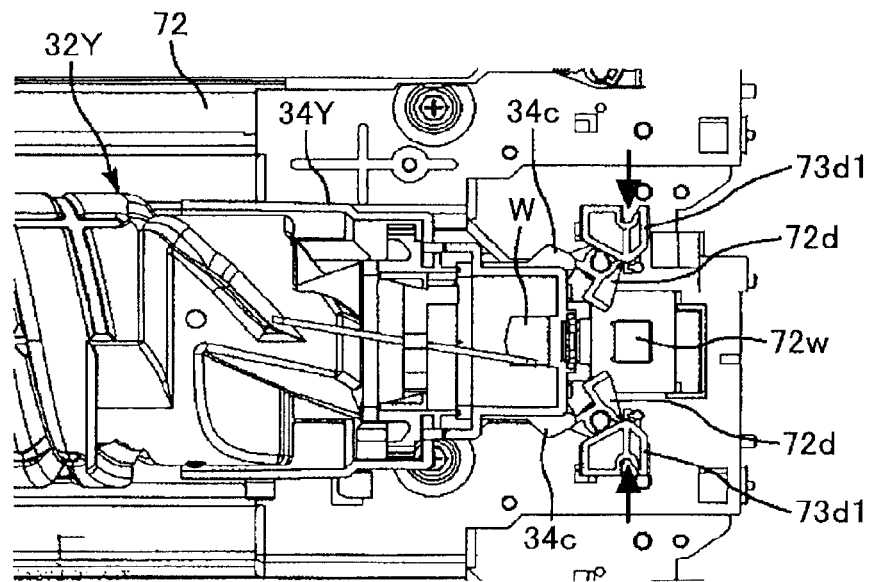
FIG. 37 is a diagram showing the state in which the pressing part of the toner container is engaged with the pressing part of the toner container accommodating part and attached to the cap receiving part.

By this composition, energization or urging of each slide block 73*d* will be in the arrow direction (which faces the toner container 32Y) of FIG. 37 due to the spring force of torsion spring 73*d*2. Therefore, the user can get a high click feeling in the attaching operation (or detaching operation) of the toner container 32Y to the cap receiving part 73. Moreover, the toner container is secured in position by the surface 73*d*12 of the slide block 73*d*1.

Figure 34:
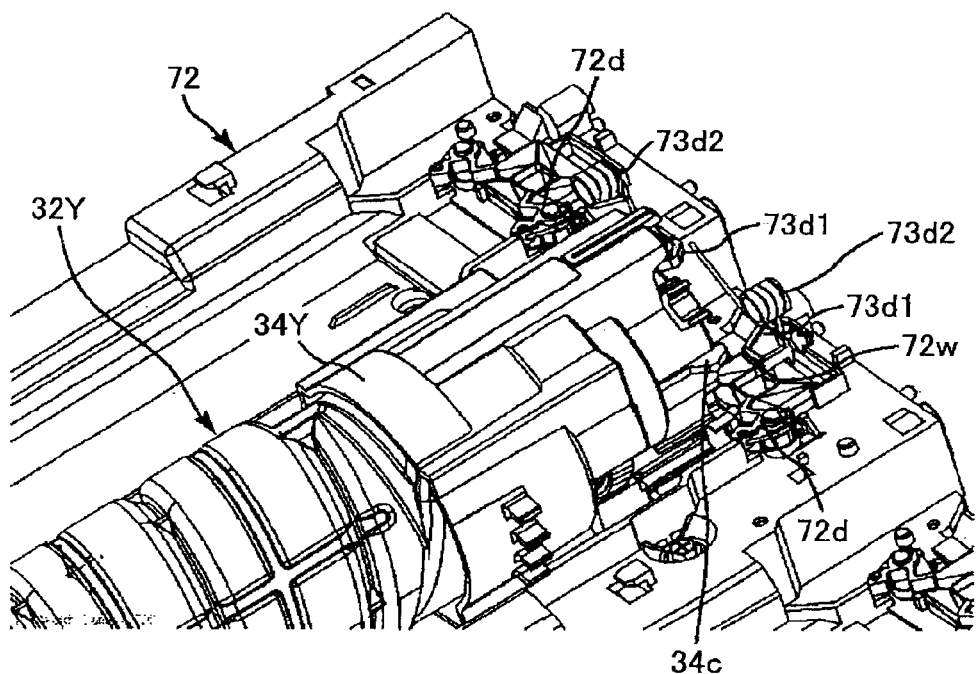
FIG. 34 is a diagram showing the state in which the cap part of the toner container is attached to the cap receiving part of the toner container accommodating part.
Figure 35:
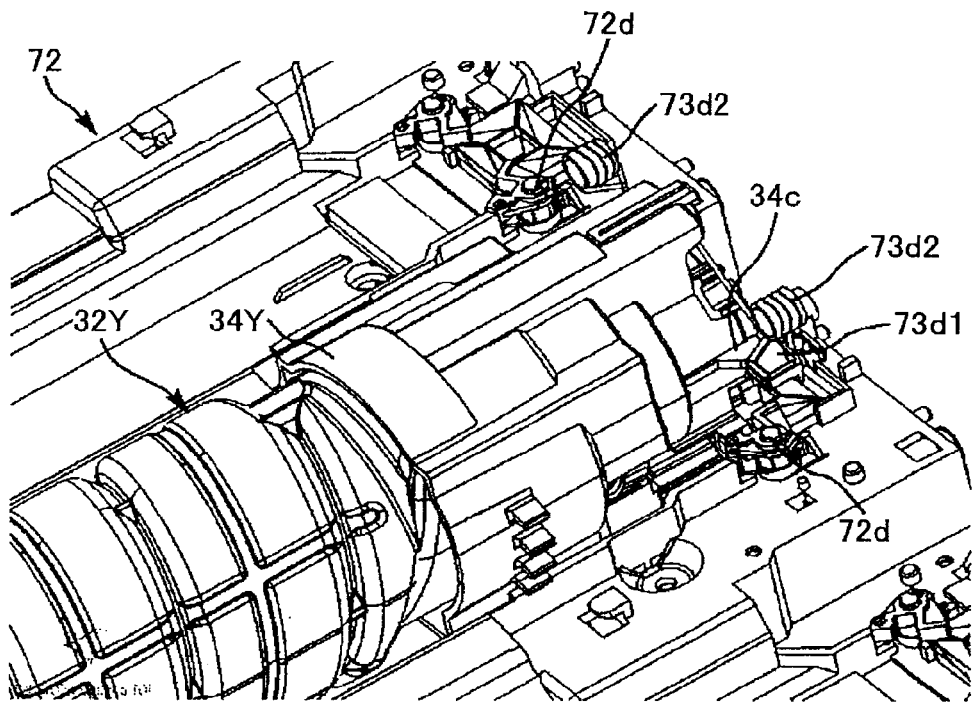
FIG. 35 is a diagram showing the state following the state of FIG. 34.
Figure 38:
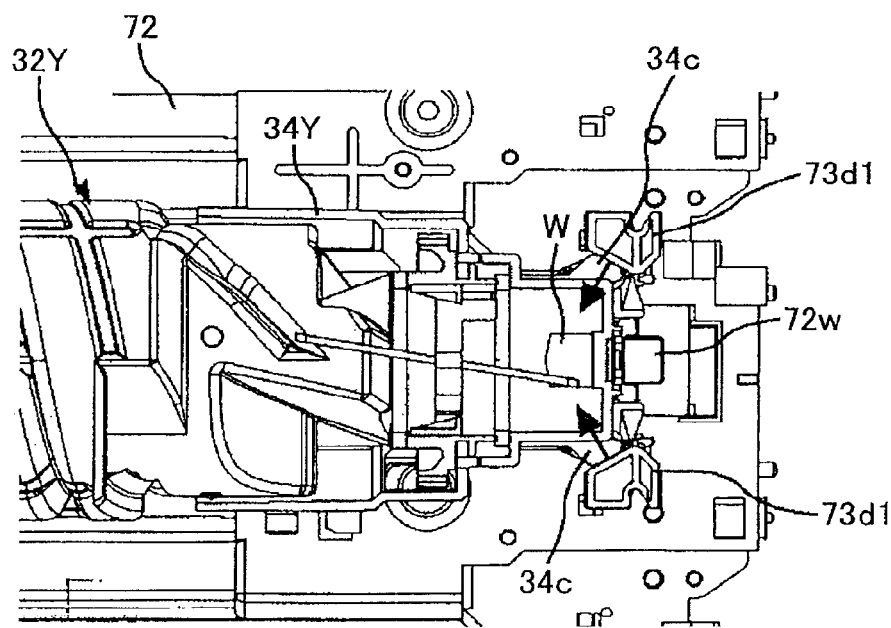
FIG. 38 is a diagram showing the state following the state of FIG. 37.
Figure 39:
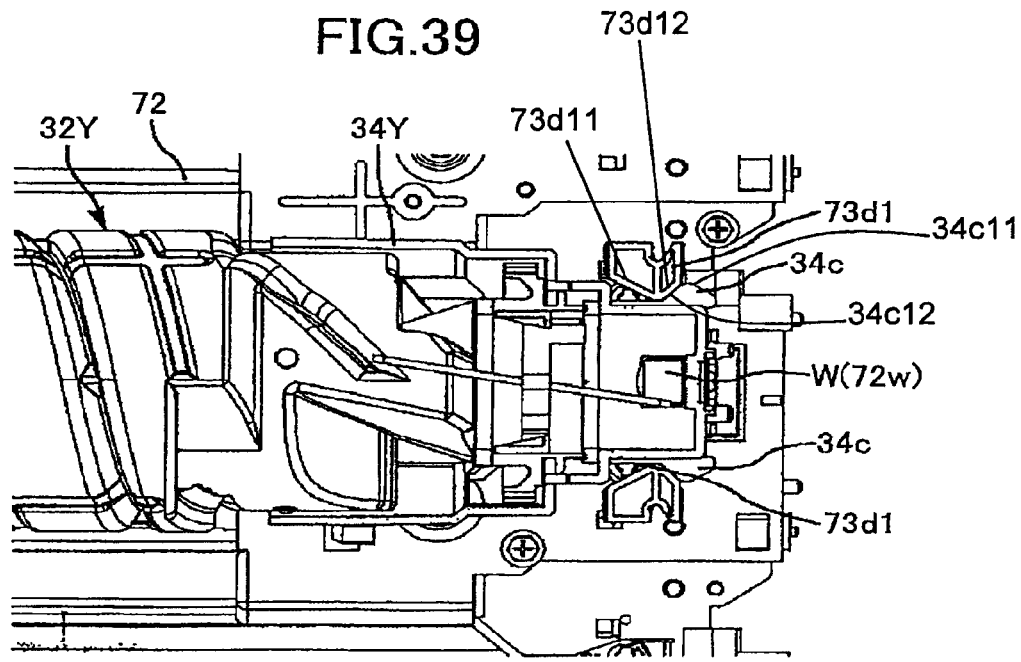
FIG. 39 is a diagram showing the state following the state of FIG. 38.

FIGS. 34-36 are diagrams showing the state in which the cap part 34Y of the toner container 32Y is attached to the cap receiving part 73 of the toner container accommodating part 70. FIGS. 37-39 are diagrams showing the state in which the pressing part 34*c* of the toner container 32Y engages with the pressing part 73*d* of the cap receiving part 73 and attached to the cap receiving part 73. FIGS. 40-42 are diagrams showing the state in which the cap part 34Y of the toner container 32Y is attached to the cap receiving part 73.

As shown in FIG. 34, FIG. 37, and FIG. 40, after being set on the container receiving part 72, a sliding movement of the toner container 32Y results from the container being pushed in toward the cap receiving part 73.

As shown in FIG. 35, FIG. 38, and FIG. 41, the pressing part 34*c* of the toner container 32Y will initially contact the slope 73*d*11 of the slide block 73*d*1. During insertion of the toner container 32Y, the pressing part 34*c* initially slides on the slope of 73*d*11 of the slide block 73*d*1, and moves the slide block 73*d*1 in the direction which is opposite to the arrow direction of FIG. 37. Thus, the spring force of the torsion spring 34*d*2 is initially used to resist the insertion of the toner container to the mounted position by the pressing part 34*c* pressing against the slope 73*d*11.

Once the pressing part 34*c* crosses the peak of the slide block 73*d*1 as shown in FIG. 36, FIG. 39, and FIG. 42, the pressing part 34*c* will contact the slope 73*d*12 of the slide block 73*d*1. At this time, the slide block 73*d*1 moves in the direction of the arrows in FIG. 37 by the torsion spring 34*d*2, and the cap part 34Y will move to the back side of the cap receiving part 73.

In this way, the cap part 34Y arrives at the position (regular fixing point) where the toner outlet W corresponds to toner replenishment mouth 72*w*.

When the slide block 73*d*1 contacts the peak of the slope of pressing part 34*c*, the slide block 73*d*1 presses pressing part 34*c* in the direction which intersects vertically in the longitudinal direction.

Thus, when the pressing part 34*c* contacts the slope 73*d*11, the torsion spring 73*d*2 resists the insertion of the toner container 32Y. Once the pressing part 34*c* transitions to the slope 73*d*12, the torsion spring assists or helps pull the toner container 32Y to the mounted position and assists in holding the toner container at the mounted position.

During the attaching operation of the toner container 32Y, the user inserts the toner container 32Y in the cap receiving part 73, feeling a small resistance immediately after the operation starts. A stronger resistance is felt when the slide block 34*d*1 is pressed by pressing part 34*c*. Subsequently, when the slide block 34*d*1 crosses the peak of the pressing part 34*c*, there is a feeling of less resistance and a feeling that the toner container 32Y is pulled to its final position and firmly fitted in at the back side. Thus, in the attaching operation of the toner container 32Y, cap part 34Y of the toner container 32Y, improper installation can be avoided as compared to conventional systems which do not provide a clear click feeling.

As shown in FIG. 39, the slope or angle of 73*d*11 of the slide block 73*d*1 is less than or not as steep as the slope or angle of 73*d*12 of the slide block 73*d*1. This steeper slope 73*d*12 which is deeper or further in the cap receiving part 73 than the more gradual slope 73*d*11 provides a firm clicking action, helps pull the toner container 32Y into the cap receiving part 73, and securely holds the toner container 32Y in the cap receiving part 73. This means that during insertion less force is required, but it is applied over a longer distance, as compared to when the toner container 32Y starts to be removed from the receiver. Moreover, the slopes of the contact surfaces of the pressing part 34*c* may be different from each other and correspond to the slopes or angles of the slide block 73*d*1. For example, as shown in FIG. 39, the slope or angle of 73*d*12 corresponds to the slope or angle of 34*c*12, and the slope or angle of 73*d*11 correspond to the slope or angle of 34*c*11. Such corresponding angles or slopes may reduce wear on 73*d*11, 73*d*12, 34*c*11, and 34*c*12 by increasing the surface area of the contact region between 34*c* and 73*d*1.

When one pair of pressing parts 73*d* contacts a corresponding pair of pressing parts 34*c* as shown in FIG. 38, the vector (which is a vector of the force shown by the arrow in FIG. 38) of the force of the pair of pressing parts 73*d* acting on the pair of corresponding pressing parts 34*c* is symmetric about the rotation axis of the container main part 33Y. Therefore, when one pair of pressing parts 34*c* are pressed by a corresponding pair of pressing parts 73*d* at the time of attachment and detachment of the toner container 32Y, the cap part 34Y will be uniformly pressed in directions corresponding to the arrows of FIG. 38. According to an embodiment, a pressing part 34*c* and corresponding slide block 73*d*1 are considered a pair of contact parts. Therefore, the problem that the cap part 34Y is pressed unequally, torsion arises on the cap seal 37 installed between the cap part 34Y and the container main part 33Y, and the sealing characteristic between the components 33Y and 34Y falls is prevented. Alternatively, the system can be implemented such that there is only one slide block 73*d*1 which interacts with one pressing part 34*c*, and such an implementation would have a mechanism to prevent the toner container from shifting or rotating during insertion. Thus, the embodiment achieves a good balance, and a smooth detaching operation of the toner container 32Y becomes possible.

The pressing parts 34*c* are illustrated as having two surfaces which contact the slide blocks 73*d*1. However, according to an alternative embodiment, different shapes of the pressing parts 34*c* may be utilized. For example, the pressing part 34*c* may have one contacted surface which is flat, pointed, or rounded. Further, the pressing part 34*c* may have three or more contact surfaces.

Additionally, the pressing parts 34*c* are protrusions which are mounted on the cap, and the cap is part of the toner container. Thus, the pressing parts are also considered to be mounted on the toner container. In embodiment 1, the attaching operation of the toner container 32Y proceeds as shown in FIG. 46. The timing at which the pressing part 73*d* of the cap receiving part 73 starts engagement with the pressing part 34*c* of the cap part 34Y is after the main reference pin 73*a* of the cap receiving part 73 starts engagement with the main reference hole 34*a* of the cap part 34Y.

While the opening of the main reference hole 34*a* is formed in the head part rather than the peak of pressing part 34*c* in cap part 34Y, specifically, the main reference pin 73*a* is installed in the container receiving part 72 side rather than the position in which slide block 34*d*1 is installed in the cap receiving part 73.

Since the pressing of the pressing part 34*c* by the pressing parts 73*d* is started after the position of the cap part 34Y in the cap receiving part 73 is settled or started, when one pair of pressing parts 34*c* are pressed by the corresponding pair of pressing parts 73*d* at the time of attachment and detachment of the toner container 32Y, the cap part 34Y will be uniformly pressed in the sliding direction of FIG. 38.

FIGS. 43-45 are diagrams showing operation of the shutter close mechanism 72*d* (shutter pinching mechanism) accompanying the opening/closing action of the shutter member 34*d*, and operation of the pressing parts 73*d*.

As shown in FIG. 43, after the attaching operation of the toner container 32Y in the white arrow direction is performed, at the time of the opening operation of the shutter member 34*d*, the first sandwiching member 72*d*1 contacts the height 34*m* and the second sandwiching member 72*d*2 contacts the part 34*d*11 of the shutter member 34*d*.

Subsequently, as shown in FIG. 44, if the attaching operation of the toner container 32Y progress in the white arrow direction, the shutter close mechanism 72*d* (shutter pinching mechanism) is rotated around the pivot part 72*d*3. The first pinching component 72*d*1 pinches the vertical wall 34*s* of the height 34*m* of the cap part 34Y. The second sandwiching member 72*d*2 is engaged with the sandwiching part engagement wall 34*d*11*a* of the shutter member 34*d*, and pinches the side wall 34*d*11*c* of the shutter main part 34*d*1 (the sandwiching part 34*d*11). Then, the shutter member 34*d* contacts the wall part (see FIG. 29) formed in the circumference of the toner replenishment mouth 72*w* of the cap receiving part 73.

The movement of the shutter member 34*d* in the cap receiving part 73 is regulated (the shutter member 34*d* will not move in the longitudinal direction absolutely). However, the movement of the mounting direction of the toner container 32Y is advanced, and relative movement of the opening direction of the shutter member 34*d* is performed.

That is, as shown in FIG. 45, the shutter member 34*d* is moved relatively to the side of the container main part 33Y, and opening of the toner outlet W is performed. At this time, as shown in FIG. 45, the first pinching component 72*d*1 pinches the vertical wall 34*s* of the cap part 34Y. Since the posture of the cap part 34Y the shutter member 34*d* is defined, smooth opening operation of the shutter member 34*d* is possible.

On the other hand, operation is performed by the procedure contrary to the procedure at the time of the attaching operation when carrying out extraction (the detaching operation) of the toner container 32Y from the toner container accommodating part 70 (the cap receiving part 73). That is, operation of 72*d* (shutter pinching mechanism) of shutter close mechanisms accompanying closing operation of the shutter member 34*d* is performed in the order of FIG. 45, FIG. 44, and FIG. 43. Here, since 34*s* of vertical wall which function by the embodiment 1 with reference to FIG. 45 as a pinching side which is pinched by 1 as for 72*d* of the first sandwiching part have 34*m* of heights, they are installed in a mounting direction (method of the right of FIG. 45) for a long time.

As opposed to the timing to which the shutter close mechanism 72*d* close the shutter member 34*d* thoroughly when taking out toner container 32Y from the toner container accommodating part 70, 72*d* (72*d*2 of the second sandwiching part) of shutter close mechanisms can delay the timing which cancels maintenance of 34*d* (34*d* of sandwiching parts 11) of shutter members on the basis of 34*s* of vertical wall.

That is, when closing operation of the shutter member 34*d* is performed (it is relative movement of the shutter member 34*d* from a state to the state of FIG. 44 of FIG. 45), it is formed for a long time so that 34*s* (34*m* of heights) of vertical wall may project in the method of the right of FIG. 44. In the state in which pinch 34*s* of vertical wall whose 1 is 34*m* of heights, and 34*d* of sandwiching parts whose two are the shutter member 34*d* in 72*d* of the second sandwiching part hold 11, 72*d* of the first sandwiching part can end thoroughly closing operation of the shutter member 34*d*, without the shutter close mechanism 72*d* rotating, as shown in FIG. 43.

In the embodiment 1, the cap part 34Y has the height 34*m*, and the problem that the toner container 32Y is taken out from the device body part 100 before the shutter member 34*d* close the toner outlet W thoroughly is prevented.

As shown in FIGS. 43-45, it is constituted the embodiment 1 so that the timing the force of the pressing part 73*d* pressing the cap part 34Y is the maximum in the attaching/detaching operation of the toner container 32Y may not be in agreement with the timing the stopper release energizing part 72*b* is engaged with the stopper release part 34*d*21. Hence, the click feeling at the time of the detaching operation by the pressing part 34*c* mentioned above can be obtained.

As shown in FIGS. 43-45, it is constituted in the embodiment 1 so that, at the time of the attaching of the toner container 32Y (cap part 34Y) to the toner container accommodating part 70, after the opening operation of the shutter member 34*d* is started with the pinching operation of the shutter member 34*d* by the shutter close mechanism 72*d* (shutter pinching mechanism), operation of the pressing part 73*d* pressing the pressing part 34*c* may be started. At the time of the detaching operation of the toner container 32Y (cap part 34Y) from the toner container accommodating part 70, after operation 73*d* of whose pressing parts press pressing part 34*c* is completed and the pressing part 73*d* estrange from pressing part 34*c*, it is constituted so that pinching of the shutter member 34*d* by 72*d* (shutter pinching mechanism) of shutter close mechanisms in closing operation of the shutter member 34*d* may be opened wide. In the time of the attaching of the toner container 32Y when pinching operation of the shutter member 34*d* by 72*d* (shutter pinching mechanism) of shutter close mechanisms is started, the cap part 34Y will not receive the thrust from the pressing part 73*d*, and opening operation of the shutter member 34*d* accompanying pinching operation of 72*d* (shutter pinching mechanism) of shutter close mechanisms mentioned above will be performed smoothly (the open defect of the shutter member 34*d* will not arise). When pinching operation of the shutter member 34*d* by the shutter close mechanism 72*d* is completed in the time of detachment of the toner container 32Y, the cap part 34Y will not receive the thrust from the pressing part 73*d*, and closing operation of the shutter member 34*d* accompanying pinching operation of the shutter close mechanism 72*d* mentioned above will be performed smoothly (poor closing of the shutter member 34*d* will not arise).

Accordingly, the attaching/detaching operation of the toner container 34Y can be performed smoothly, and the sealing characteristic of the container main part 33Y and the cap part 34Y can be maintained at high level, without enlarging the cap part 34Y.

Figure 47:
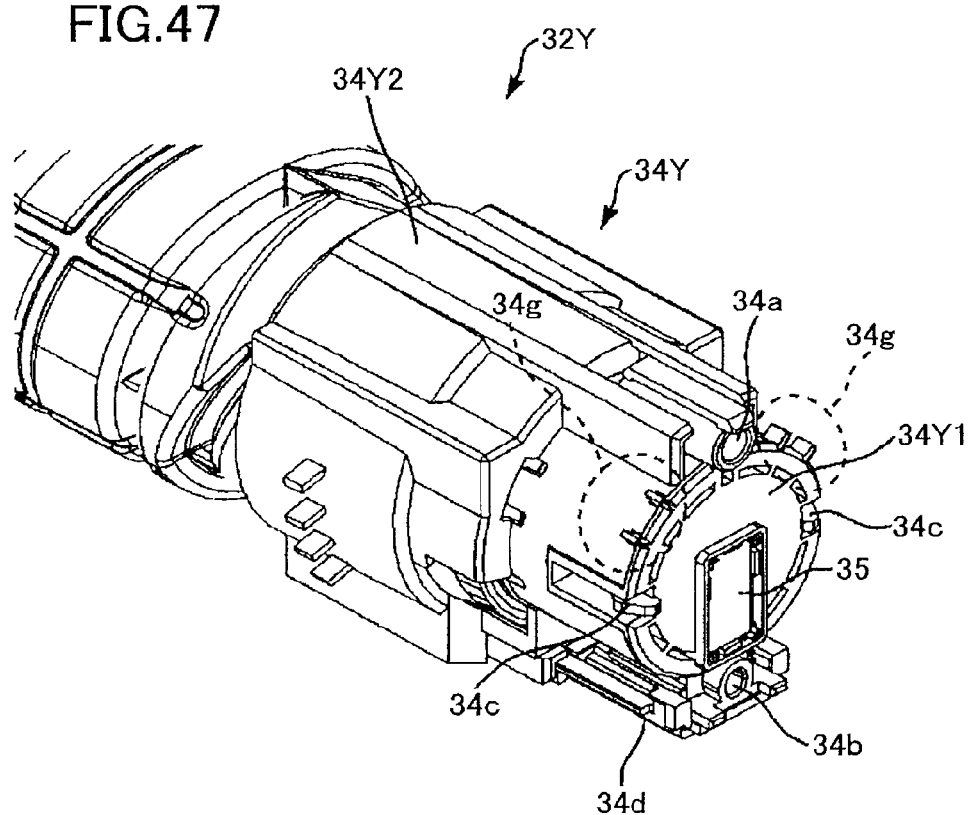
FIG. 47 is a diagram showing a part of a toner container in the embodiment 2 of the present disclosure.
Figure 48:
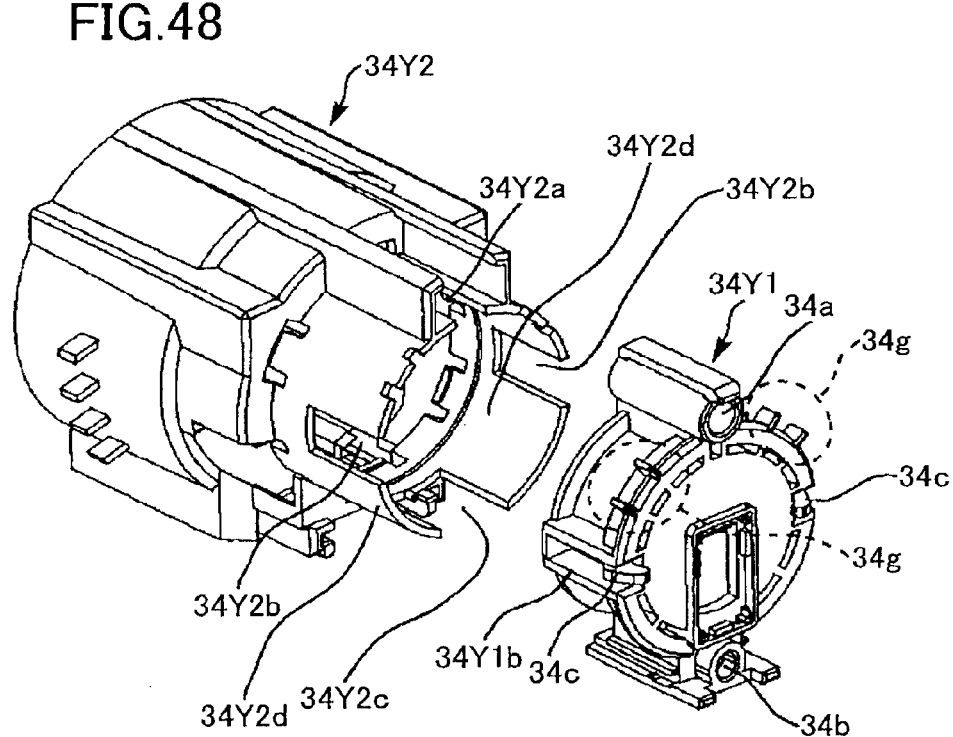
FIG. 48 is an exploded diagram showing the cap part in the toner container of FIG. 47.
Figure 49:
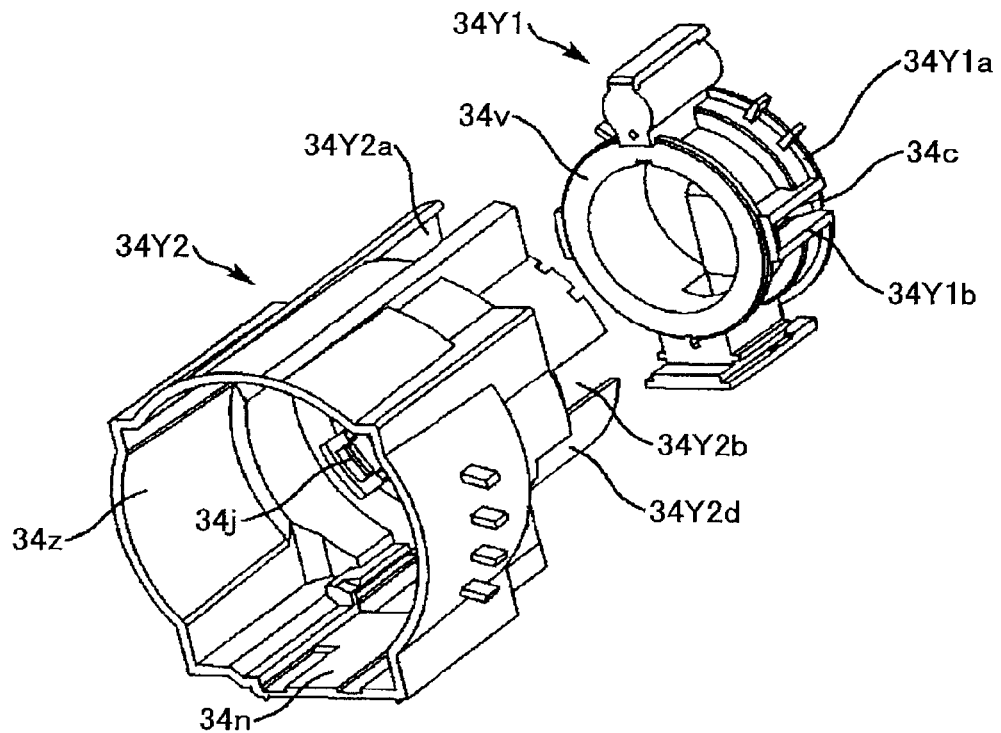
FIG. 49 is an exploded diagram showing the cap part in the toner container of FIG. 47.
Figure 50:
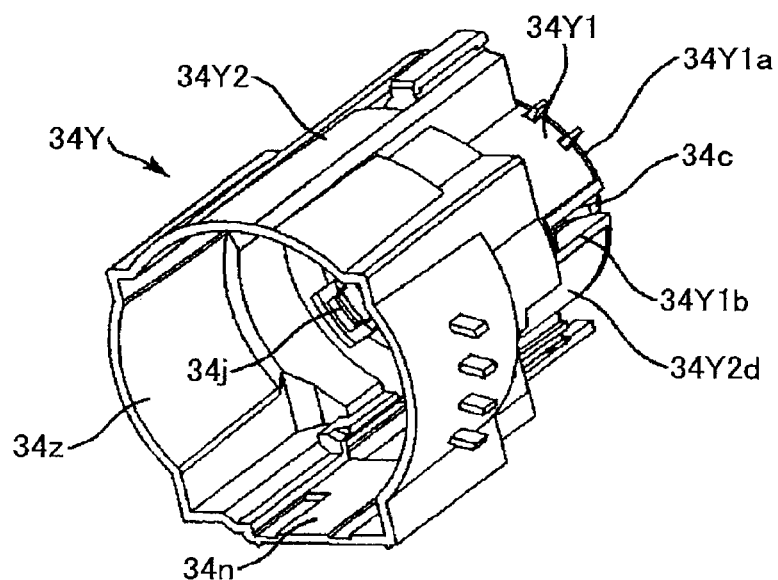
FIG. 50 is a diagram showing the cap part after welding of the first member and the second member is performed.
Figure 51:
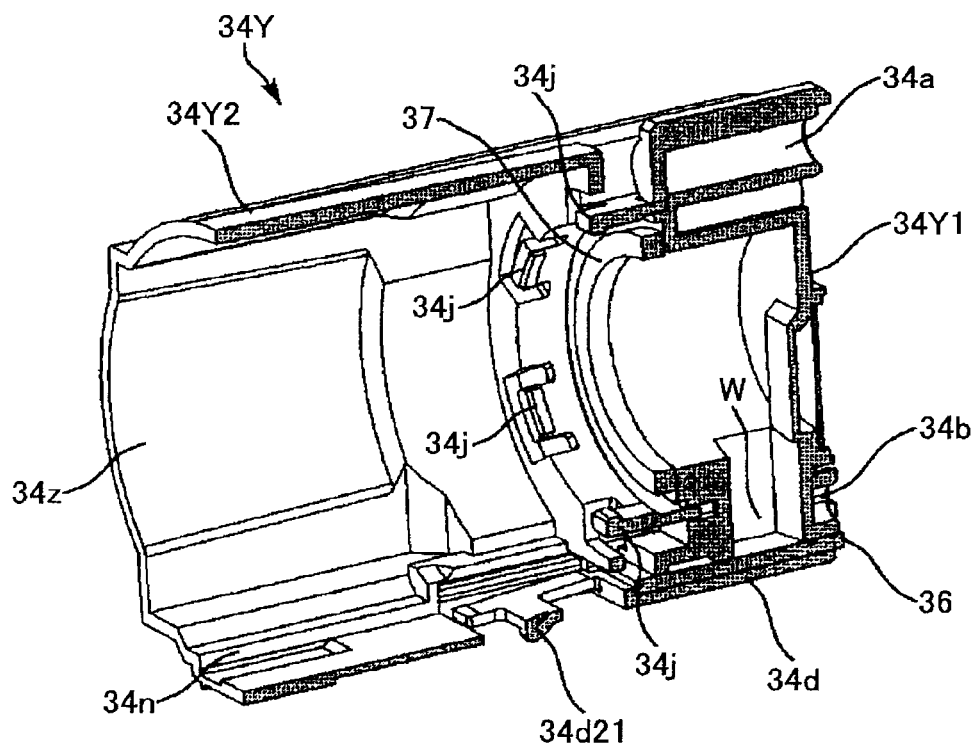
FIG. 51 is a diagram showing the inside of the cap part in the toner container of FIG. 47.
Figure 52:
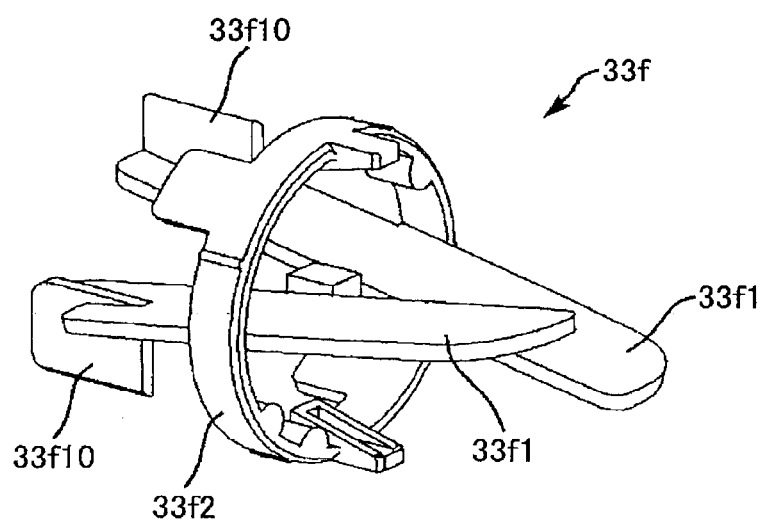
FIG. 52 is a diagram showing the stirring member of the toner container in the embodiment 3 of the present disclosure.
Figure 53:
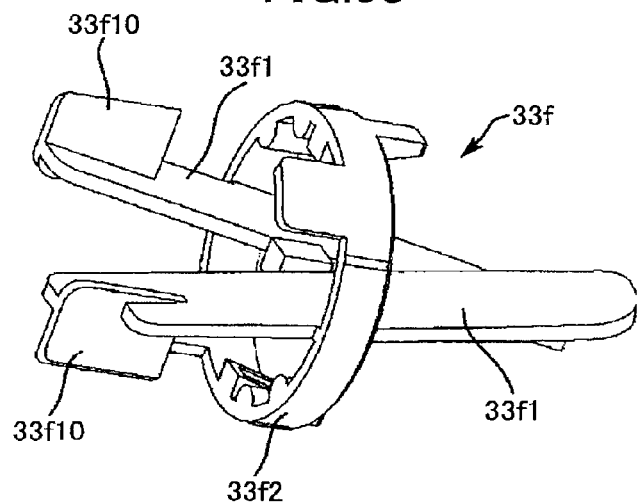
FIG. 53 is a diagram showing the stirring member of FIG. 52.
Figure 54A:
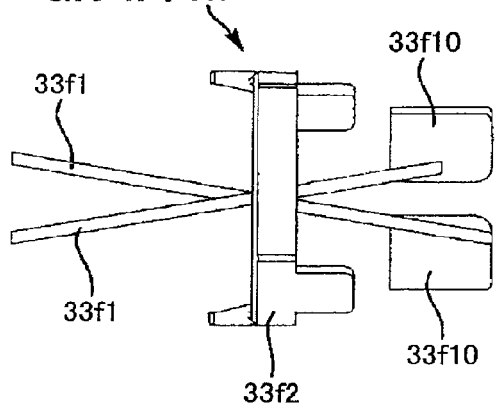
FIGS. 54A-54C are diagrams showing the stirring member of FIG. 52.
Figure 54B:
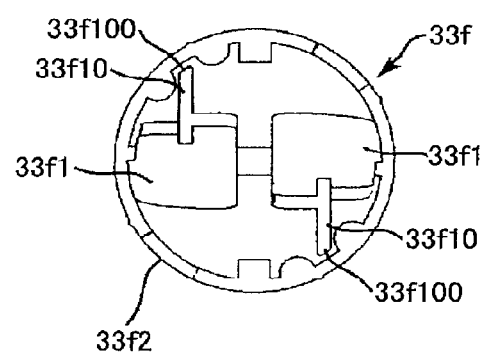
Figure 54C:
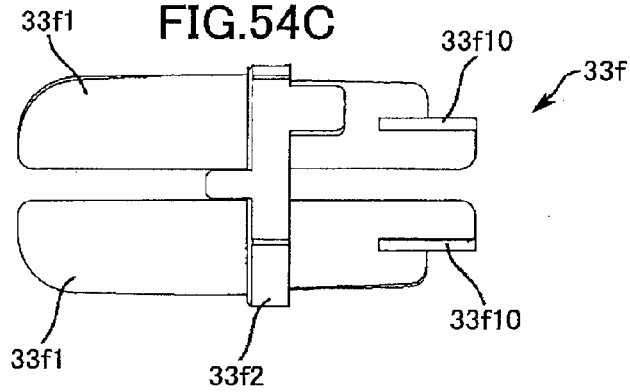

Embodiment 2:

FIGS. 47-51 are diagrams for explaining the embodiment 2 of the present disclosure. FIG. 47 is a diagram showing a part of the toner container 32Y in the embodiment 2. FIGS. 48 and 49 are exploded diagrams showing the cap part 34Y of FIG. 47, respectively. FIG. 50 is a diagram showing the cap part 34Y after welding of the first member 34Y1 and the second member 34Y2 is performed. FIG. 51 is a diagram showing the inside of the cap part 34Y in toner container 32Y.

The toner container in the embodiment 2 differs from that of the embodiment 1 (in which the cap part is formed by integral molding) in that the cap part is formed by welding of two molding members.

The toner container 32Y in the embodiment 2 is constituted similar to that of the embodiment 1 to include the container main part 33Y (bottle body) and the cap part 34Y provided in the head of the container main part. The toner container 32Y further includes the stirring member 33*f*, the cap seal 37, the shutter member 34*d*, the shutter seal 36, and the RFID 35, in addition to the container main part 33Y, and the cap part 34Y.

Unlike that of the embodiment 1, the cap part 34Y (from which the cap seal 37, the shutter member 34*d*, the shutter seal 36, and the RFID 35 are taken out) in the second embodiment 2 is formed by welding (or adhesion) of the two molding members 34Y1 and 34Y2.

The cap part 34Y includes the first member 34Y1 and the second member 34Y2. The toner outlet W, the pressing part 34*c*, and the adhesion surface 34*v* to stick the cap seal 37 are formed in the first member 34Y1. In the second member 34Y2, a small-diameter portion 34Y2*d* which covers a part of the first member 34Y1, and a large-diameter portion (which is the portion in which the accommodating part 34*z* is formed) which has an outer diameter larger than that of the small-diameter portion 34Y2*d*, are formed. The upper part (the portion in which the main reference hole 34*a* is formed) of the first member 34Y1, the side part 34Y1*b* (the portion in which the pressing part 34*c* is formed) of the first member 34Y1, and the bottom (the portion in which the toner outlet W is formed) of the first member 34Y1 are respectively inserted in the notches 34Y2*a*, 34Y2*b*, and 34Y2*c* of the second member 34Y2, and the small-diameter portion 34Y2*d* of the second member 34Y2 is bonded to the junction 34Y1*a* of the first member 34Y1 (welding).

As shown in FIG. 47 and FIG. 50, the pressing part 34*c* of the first member 34Y1 is formed so that it may fall within the range of the outer diameter of the small-diameter portion 34Y2*d* of the second member 34Y2. That is, when the cap part 34Y is viewed in the plane of projection which intersects vertically in the longitudinal direction, the pressing part 34*c* of the first member 34Y1 is constituted so that it may not project from the perimeter of the small-diameter portion 34Y2*d* of the second member 34Y2. The adhesion surface 34*v* of the first member 34Y1 is formed so that it may be settled within the range of the inside diameter of the small-diameter portion 34Y2*d* of the second member 34Y2. Thus, enlargement (the large diameter part) of the cap part 34Y by the pressing part 34*c* which projects from the outer circumference surface of the cap part 34Y can be prevented by making the outer diameter of the cap part 34Y fall into the range of the perimeter of the small-diameter portion 34Y2*d* of the second member 34Y2.

The cap part 34Y in the embodiment 2 includes the two molding members 34Y1 and 34Y2. When compared with that of the embodiment 1 (in which the cap part is formed by one molding member), the arrangement of the respective parts, such as the claw part 34*j*, the non-compatible shape part 34*g*, the pressing part 34*c*, the toner outlet W, and the toner drop passage C, becomes more flexible.

In the toner container in the embodiment 2, the positional relationship in the longitudinal direction between the cap seal 37 (which is installed between the container main part 33Y and the cap part 34Y) and the pressing part 34*c* which projects on the outer circumference surface of the cap part 34Y and is pressed in the direction which resists the force of the mounting direction when the cap part 34Y is attached to the image forming device body 100, is optimized. Thereby, the attaching/detaching operation of the toner container 34Y can be performed smoothly, maintaining the high sealing characteristic of the container main part 33Y and the cap part 34Y, without enlarging the cap part 34Y.

Embodiment 3:

FIGS. 52-55 are diagrams for explaining the embodiment 3 of the present disclosure. The composition of the stirring member 33*f* in the toner container in the embodiment 3 is different from that of the embodiment 1.

The toner container 32Y in the embodiment 3 as well as that of the embodiment 1 comes out mainly with main part 33Y (bottle body) of a container, and cap part 34Y (bottle cap) provided in the head, and is constituted. The toner container 32Y in the embodiment 3 besides the container main part 33Y and the cap part 34Y, is decomposed into the RFID chip 35 as shutter seal 36 as the stirring part 33*f*, cap seal 37, the shutter member 34*d*, and a seal member, and electronic data storage medium (see FIG. 9).

The fit of the stirring member 33*f* which rotate the toner container 32Y in the embodiment 3 as well as that of the embodiment 1 with the container main part 33Y is performed to bottle mouth part 33*a* (opening A). It is pressed fit in the bottle mouth part 33*a* (opening A) which two show in FIG. 9 in 33*f* of fitting parts of the stirring part 33*f* with reference to FIGS. 52-54C.

As for one pair of tabular members 33*f* of installed to the inside of the container main part 33Y by the stirring part 33*f* in the embodiment 3 from the hollow part B in cap part 34Y, 1 is provided as shown in FIGS. 52-54C. The tabular member 33*f*1 of the stirring member 33*f* is inclined like the embodiment 1, respectively. The stirring members 33*f* are constituted so that the head (it is the side in which 10 is formed as for the extrusion plate 33*f*10) may arrive above the toner outlet W in cap part 34Y when cap part 34Y and the container main part 33Y are attached, and the back end (end of the opposite side) may pump up and the part (the portion indicated by the dotted line in FIG. 9 and FIG. 10) may be reached.

The toner ejection characteristic from the opening A improves because the stirring part 33*f* is rotated with the opening A of the container main part 33Y.

As shown in FIGS. 52-54C, the stirring member 33*f* in the embodiment 3 includes the extrusion plate 33*f*10 at the head of the tabular member 33*f*1 (on the side toward the cap part 34Y) unlike to the embodiment 1. The extrusion plate 33*f*10 is a plate member which is raised in a vertical direction from the body part of the tabular member 33f1 and has the taper part 34f100 formed in the outer circumference part of the extrusion board 33f10.

Thus, because of the extrusion plate 33f10 provided at the head of the tabular member 33f1 in the stirring part 33f, the toner is pushed to the toner outlet W in the cap part 34Y with rotation of the stirring part 33f in the extrusion plate 33f10 to prevent the toner from being blocked near the toner outlet W (the toner drop passage C), and smooth toner ejection from the toner outlet W is allowed.

Figure 55A:
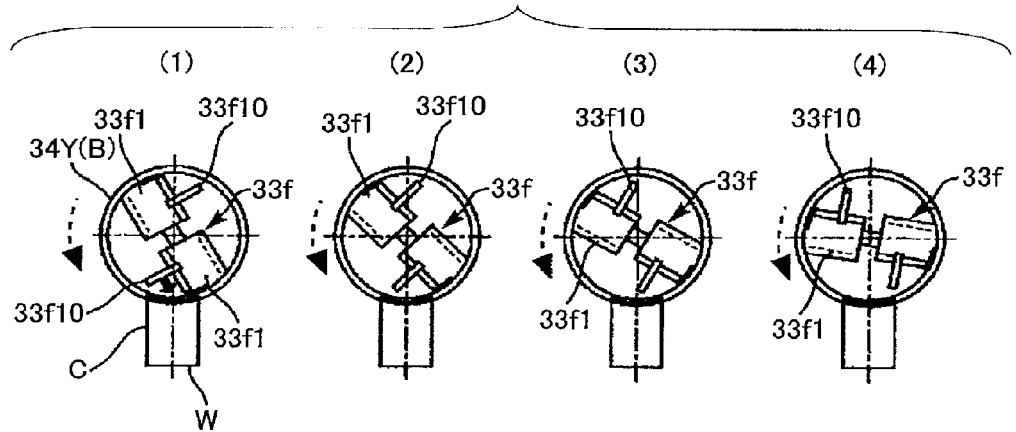
FIG. 55A is a diagram for explaining the state in which the stirring member of FIG. 52 is rotated.
Figure 55B:
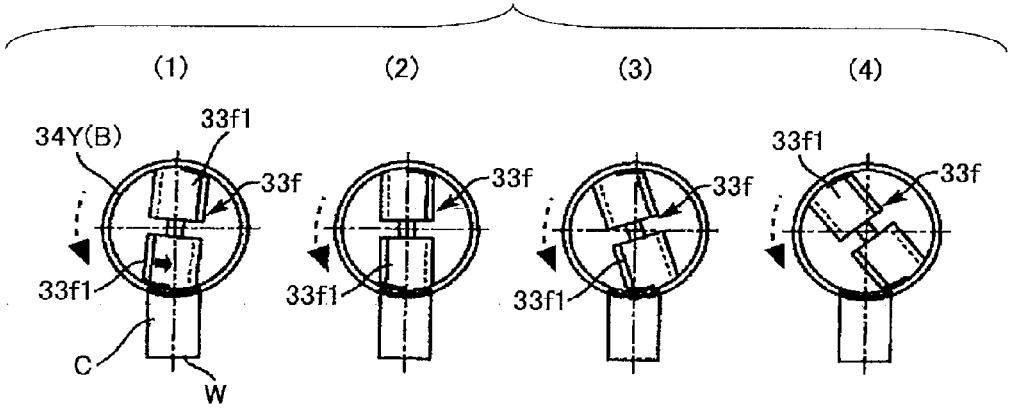
FIG. 55B is a diagram for explaining the state in which the stirring member in the toner container of the embodiment 1 is rotated.

FIG. 55A is a diagram for explaining the state in which the stirring member 33f in which in which the pushing plate 33f10 is disposed (the embodiment 3) is rotated in the toner container 32Y. Changes of the state of the stirring member 33f of the embodiment 3 during the rotation are indicated by (1)-(4) in FIG. 55A. On the other hand, FIG. 55B is a diagram for explaining the state in which the stirring member 33f in which the pushing plate 33f10 is not disposed (the embodiment 1) is rotated in the toner container 32Y. Changes of the state of the stirring member 33f of the embodiment 1 during the rotation are indicated by (1)-(4) in FIG. 55B.

In (1) in FIG. 55A and (1) in FIG. 55B, the toner transporting direction in which the toner is delivered to the toner outlet W (the toner replenishment mouth 73w) by the stirring member 33f is indicated by the small black arrow. As shown in (1) in FIG. 55B, when the pushing plate 33f10 is not disposed to the tabular member 33f1 of the stirring member 33f, the toner is delivered along with the inner periphery of the cap part 34Y with the rotation of the stirring member 33f. On the other hand, as shown (1) in FIG. 55A, when the pushing plate 33f10 is disposed to the head end of the tabular member 33f1 of the stirring member 33f, the toner is delivered to the toner outlet W by the pushing plate 33f10 with the rotation of the stirring member 33f.

Similar to the embodiment 1, in the toner container 32Y of the embodiment 3, the positional relationship in the longitudinal direction between the cap seal 37 (which is disposed between the container main part 33Y and the cap part 34Y) and the pressing part 34c which projects on the outer circumference surface of the cap part 34Y (which projection is pressed in the direction opposite to the direction of the mounting force when the cap part 34Y is attached to the image forming device body 100) is optimized. Thereby, in the embodiment 3, the attaching/detaching operation of the toner container 34Y can be smoothly performed similar to the embodiment 1, and the sealing characteristic of the container main part 33Y and the cap part 34Y can be maintained at a high level without enlarging the cap part 34Y in size.

Figure 56:
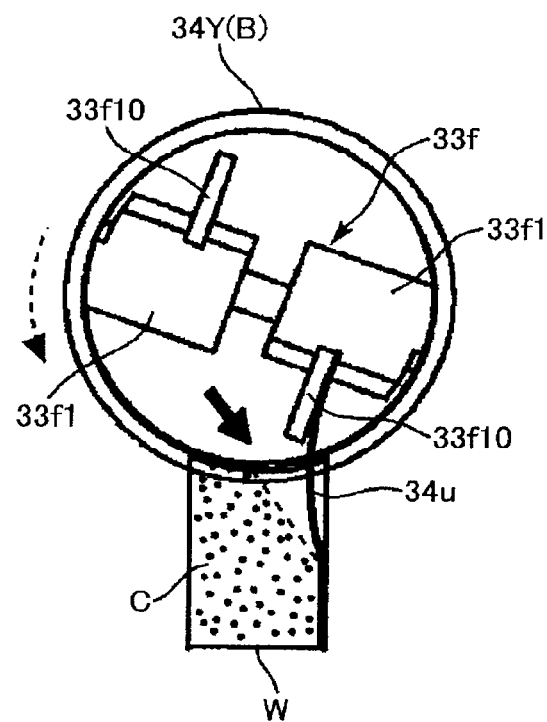
FIG. 56 is a cross-sectional view showing the cap part of the toner container in the embodiment 4 of the present disclosure.
Figure 57:
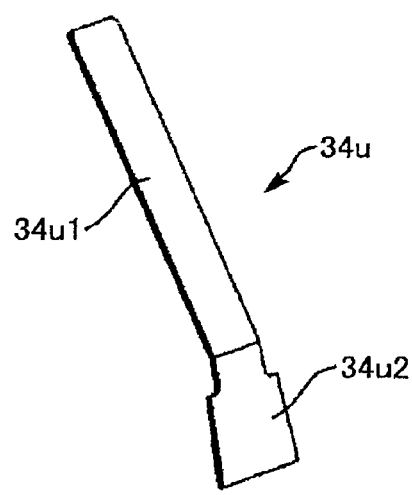
FIG. 57 is a diagram showing the flexible member installed near the toner outlet of the toner container of FIG. 56.

Embodiment 4:

FIGS. 56-58 are diagrams for explaining the embodiment of the present disclosure. The toner container in the embodiment 4 differs from that of the embodiment 3 in that the flexible member 34u is installed near the toner outlet W in the cap part 34Y.

The toner container 32Y in the embodiment 4 is constituted similar to that of the embodiment 3 to include the container main part 33Y (bottle body) and the cap part 34Y (bottle cap) provided in the head end of the container main part. Besides the container main part 33Y and the cap part 34Y, the toner container 32Y in the embodiment 4 is decomposed into the stirring part 33f, the cap seal 37, the shutter member 34d, the shutter seal 36 as the seal member, and the RFID chip 35 as the electronic data storage medium (see FIG. 9). Similar to that of the embodiment 3, the stirring member 33f which is rotated with the container main part 33Y in the toner container 32Y in the embodiment 4 is fitted to the bottle mouth part 33a (the opening A).

As shown in FIG. 56, one pair of tabular members 33f1 (which are inclined in a staggered manner) extending to the inside of the container main part 33Y from the hollow part B of the cap part 34Y is provided in the stirring part 33f in the embodiment 4. The extrusion plates 33f10 are provided at the head ends of the tabular members 33f1 (on the side toward the inside of the cap part 34Y) in the stirring part 33f in the embodiment 4 similar to that of the embodiment 3.

Unlike the embodiment 3, with reference to FIGS. 56 and 58, a flexible member 34u made of a flexible material, such as a miler about 0.188-0.5 mm thick, is installed in the hollow part B from the toner drop passage C of the cap part 34Y in the embodiment 4.

As shown in FIG. 57, the flexible member 34u is formed in the form in which one portion is bent, and includes the fixed part 34u2 (the width of which is larger than the width of the flexible part 34u1) which forms an adhesion surface of the flexible member 34u. The flexible member 34u is stuck on the wall (it is a wall of the side near the toner outlet W, and is a wall on the side of the direction-of-rotation lower stream of the stirring part 33f) of the toner drop passage C (anchoring). The fixed part 34u2 is stuck on the wall of the toner drop passage C so that the curved part of flexible member 34u may be located in the toner drop passage C. The flexible part 34u1 of the flexible member 34u extends to the inside of the hollow part B as a free end from the toner drop passage C. Even if the toner is clogged with the head of the flexible part 34u1 contacting with rotation of the stirring part 33f in the extrusion plate 33f10 near the toner outlet W (the toner drop passage C), and smooth toner ejection from the toner outlet W is allowed.

As shown in FIGS. 58A to 58D, with rotation of the stirring part 33f, as for the extrusion plate 33f10, it is pressed by 10, and flexible member 34u (the flexible part 34u1) bends in the shape of a bow gradually. The flexible member 34u is greatly bent by the state of FIG. 58D in the shape of a bow even if toner is choked up with the state of FIG. 58A between the wall of the toner drop passage C, and flexible member 34u at this time, the space of the wall of the toner drop passage C and flexible member 34u becomes large. Bending of the flexible member 34u serves to break down the toner got blocked in the toner drop passage C.

Figure 58G:
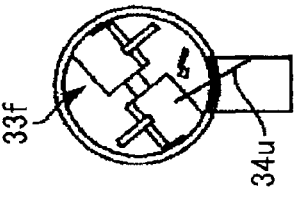
FIGS. 58A-58G are diagrams for showing the state in which the stirring member is rotated in the toner container of FIG. 56.
Figure 58F:
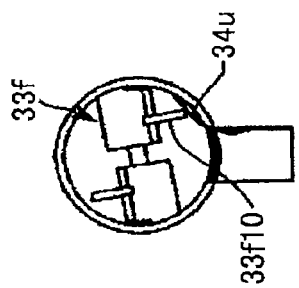
Figure 58E:
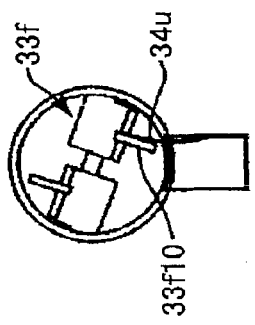
Figure 58D:
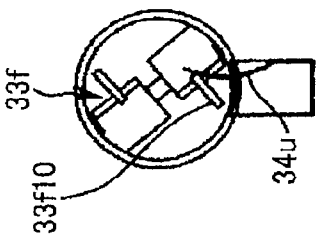
Figure 58C:
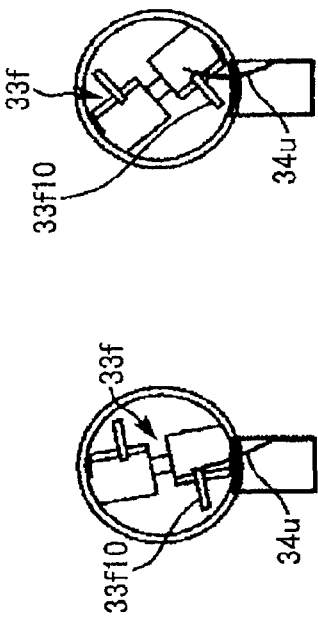
Figure 58B:
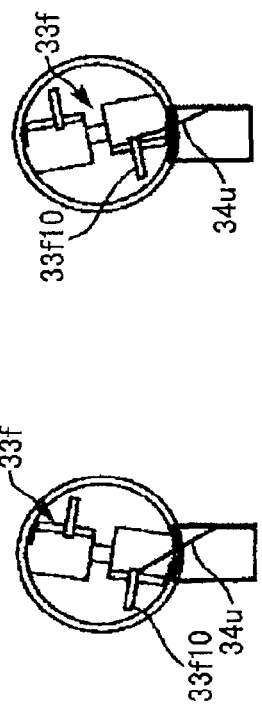
Figure 58A:
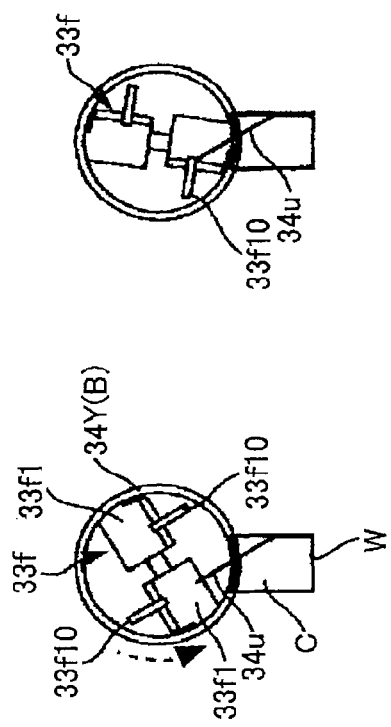

Subsequently, as shown in FIG. 58E, in the extrusion plate 33f10, the flat-surface part of 10 and the flat-surface part of flexible member 34u overlap mutually, and it changes into a plane, applying flexible member 34u to the flexible part 34u1 from the fixed part 34u2. At this time, the space of the flexible member 34u and the toner spreads rapidly, collapse of the toner advances, and the toner is stuffed into the space by the extrusion plate 33f10 and supplied (which is in the state of FIG. 56). Thereby, the toner ejection characteristic and the toner collapse in the toner outlet W (the toner drop passage C) are increased.

Subsequently, as shown in FIG. 58F, the flexible member 34u will be bent backward thoroughly, and thereafter the contact with the extrusion plate 33f10 will be canceled. As shown in FIG. 58G, the elastic force of the flexible member 34u recovers the flexible member 34u in the early state.

At this time, the returning force of the elasticity of the flexible member 34u acts on the toner, and the toner collapsing and smooth toner ejection in the toner drop passage C is allowed.

The shape of the flexible member 34u is not limited to that of the embodiment 4, and a flexible member with another shape which does not have a curved part and a flexible member with a fixed part 34*u*2 having a different shape may be used instead.

The cap seal 37 in the embodiment 4 is installed between the container main part 33Y and the cap part 34Y, and pressed in the direction which resists the force of the mounting direction when the cap part 34Y is attached to the image forming device body 100, and the positional relationship of the longitudinal direction of the pressing part 34*c* which projects on the outer circumference surface of the cap part 34Y is optimized. Thereby, also in the embodiment 4, the attaching/detaching operation of the toner container 34Y can be smoothly performed like each embodiment, maintaining the high sealing characteristic of the container main part 33Y, and cap part 34Y, without enlarging cap part 34Y.

Figure 59:
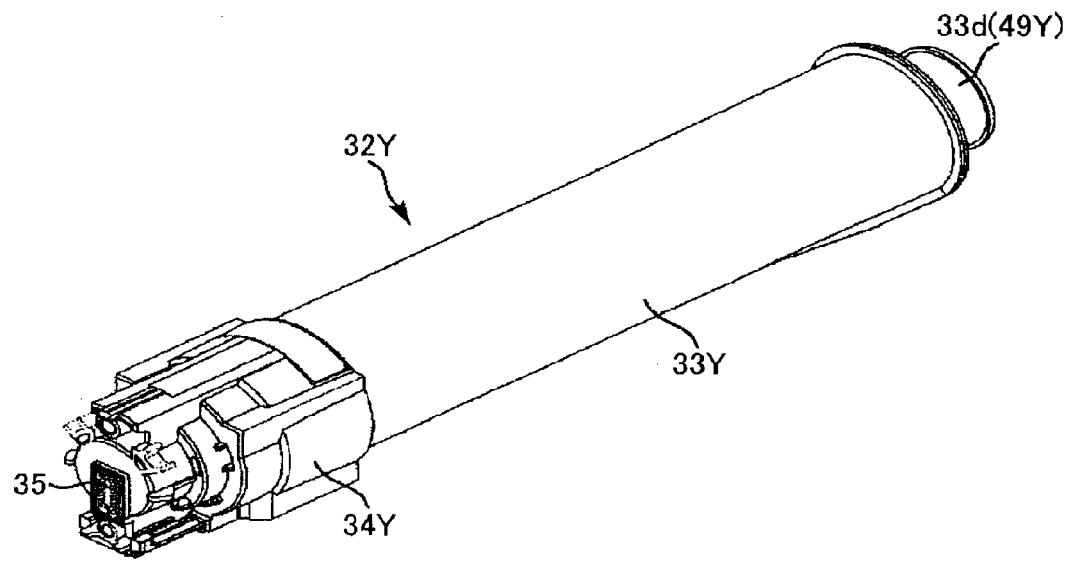
FIG. 59 is a diagram showing the toner container in the embodiment 5 of the present disclosure.
Figure 60:
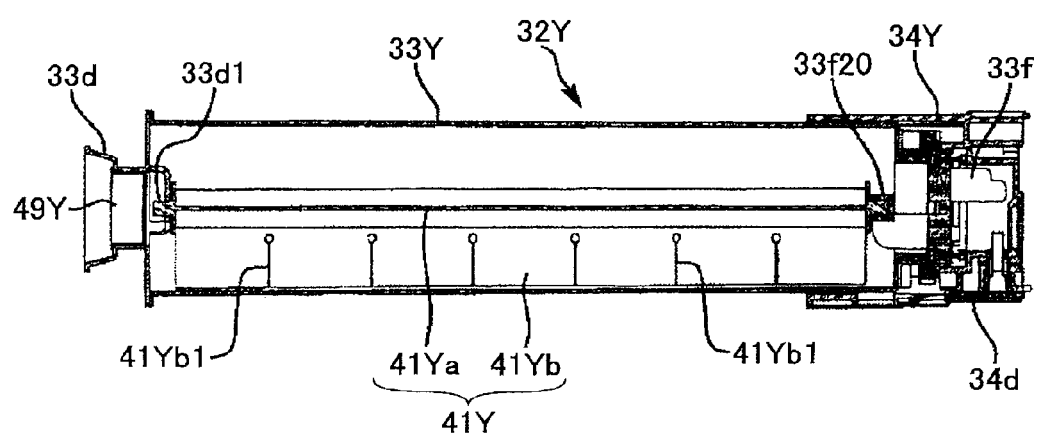
FIG. 60 is a cross-sectional view showing the toner container of FIG. 59.
Figure 61:
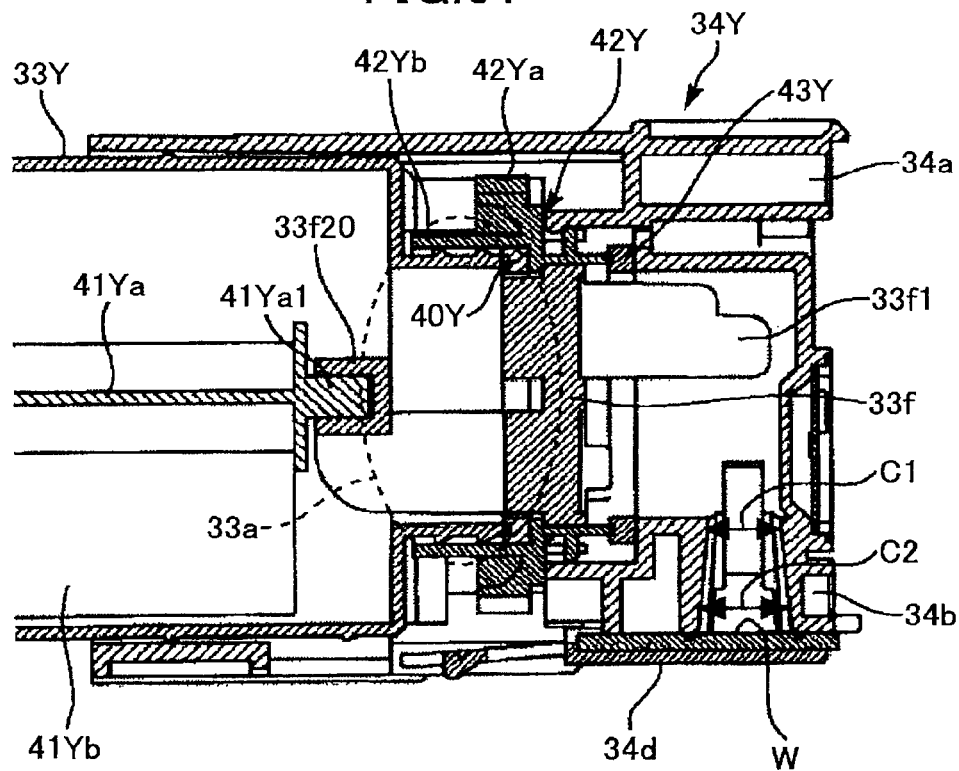
FIG. 61 is a cross-sectional view showing the portion of the toner container of FIG. 59 in the neighborhood of the cap part.

Embodiment 5:

FIGS. 59-61 are diagrams for explaining the embodiment 5 of the present disclosure.

The toner container in the embodiment 5 is arranged so that the container main part 33Y and the cap part 34Y are held to the toner container accommodating part 70 without rotation is different from that of the foregoing embodiments in which the container main part 33Y is held rotatably at the toner container accommodating part 70.

As shown in FIG. 59, the toner container 32Y in the embodiment 5 as well as that of each embodiment comes out mainly with main part 33Y (bottle body) of a container, and cap part 34Y (bottle cap) provided in the head, and is constituted. Here, as for the toner container 32Y in the embodiment 5, unlike that of each embodiment, main part 33Y (bottle body) of a container is fixed by fixing methods, such as adhesion, fusion joining, and a stop, to cap part 34Y (bottle cap).

That is, without being connected to the cap part 34Y rotatably, the container main part 33Y is fixed so that it is not rotate relative to the cap part 34Y.

As for the container main part 33Y in the embodiment 5, unlike that of each embodiment, the spiral projection is not formed in the circumference.

The gear 33*c* as in the foregoing embodiment is not formed in the container main part 33Y, but the gear member 42Y (see FIG. 61) is rotatably held to the container main part 33Y, and the cap part 34Y with the stirring member 33*f*. The conveyance member 41Y (see FIG. 60), turning to the opening the toner contained in the inside of the container main part 33Y, and conveying it is installed in the inside of the container main part 33Y.

The cap part 34Y can be constituted almost like that of each embodiment except for the point that the container main part 33Y is stuck. The stirring member 33*f* can be constituted almost like that of each embodiment except for the point which is not being fixed to the container main part 33Y.

As shown in FIG. 60, it is the direction other end side of a stretcher of the container main part 33Y (it is the opposite side on the side of the one direction end of a stretcher in which cap part 34Y is installed, and) also in the embodiment 5. When performing detaching operation of the toner container 32Y, the grip part 33*d* to be gripped by the user is provided at the end behind the mounting direction to the device body part 100.

The through hole which leads within and without the container main part 33Y is formed in 33*d* of this grip part, and the lid member 49Y is detachably installed therein by the through hole. The lid member 49Y fills up the inside of the toner container 32Y (the container main part 33Y) with toner in the time of manufacture or recycling.

As shown in FIG. 60, the thin flexible stirring member 41Yb in which the conveyance member 41Y installed in the container main part 33Y is formed in shank 41Ya with materials, such as a miler, is stuck. As for the connection part 33*f* installed in the position of the center of rotation whose end 41Ya1 at the end side in the longitudinal direction (see FIG. 61) is the stirring part 33*f*, the shank 41Ya20 of the conveyance member 41Y is stopped.

As for 33*d* of bearings, the end on the side of the direction other end of a stretcher is supported by 1 (it is a root portion which is the grip part 33*d*, and rotatably formed in the portion within the container main part 33Y). Where the container main part 33Y and cap part 34Y are held by non rotation at the toner container accommodating part 70, the conveyance member 41Y which is connected with the stirring part 33*f* in the position of 20 as for the connection part 33*f* will also rotate because the stirring part 33*f* rotate with gear member 42Y in response to driving force from actuator 91.

In this way, the toner contained in the container main part 33Y will be delivered to the cap part 34Y side by the carrying force of the flexible stirring member 41Yb installed in the conveyance member 41Y.

The flexible stirring member 41Yb of the conveyance member 41Y includes plural cut-out portions 41Yb1 which are formed by cutting at plural places (in the embodiment 5, six places) in the longitudinal direction. The head end of the flexible stirring member 41Yb (which is the free end thereof not supported by the shank 41Ya) slides onto the inner circumference side of the container main part 33Y with the rotation of the conveyance member 41Y. The flexible stirring member 41Yb is rotated and moderately twisted so that the toner contained in the container main part 33Y is stirred and delivered to the right side in FIG. 60.

In this way, in the toner container 32Y in the embodiment 5, the toner can be discharged from the toner outlet W of the cap part 34Y, similar to that of the above embodiment.

As shown in FIG. 61, the gear member 42Y is pivotably attached to the container main part 33Y. The gear suspending portion 42Yb formed in the gear member 42Y is engaged with the projection formed in the outer circumference surface of the bottle mouth part 33*a* of the container main part 33Y, and the gear member 42Y is held pivotably to the container main part 33Y. When the geared part 42Ya (spur gear) is formed in the outer circumference surface of the gear member 42Y and the toner container 32Y is set to the device body part 100. The geared part 42Ya is engaged with the drive gear 81 of the device body part 100.

The sealing material 40Y is formed between the gear member 42Y and the end face of the bottle mouth part 33*a* in order to prevent leakage of the toner to the outside of the toner container 32Y. The sealing material 40Y is formed of a foamed elastic material, such as foamed polyurethane, and has an annular configuration that matches with the end face of the bottle mouth part 33*a*, and the sealing material is stuck on the gear member 42Y.

When the gear member 42Y is set to the container main part 32Y, the sealing material 40Y is forced on the end face of the bottle mouth part 33*a*, and the sealing characteristic between the components 33Y and 42Y is increased. It is not fixed to the cap part 34Y, but the gear member 42Y is held pivotably to the claw part 34*j* of the cap part 34Y.

The holding method of the gear member 42Y to the cap part 34Y is the same as the holding method of the cap part 34Y to the bottle mouth part 33*a* of the container main part 33Y described above.

The cap seal 43Y which becomes a portion on which the end face (the container main part 33Y side is the end face of the opposite side) of the gear member 42Y is forced by the foamed elastic material is stuck on the cap part 34Y. Thereby, the leakage of the toner from the space between the gear member 42Y and the cap parts 34Y can be prevented.

The stirring member 33f is attached to the inner diameter part of the gear member 42Y. The connection part 33f/20 of the stirring member 33f is connected with the shank 41Ya20 (end 41Ya1 on the side of an end) of the conveyance member 41Y 20.

In the embodiment 5, it is formed so that the toner drop passage C1 and C2 which are formed in cap part 34Y may be missing from the lower stream side (the toner outlet W) from the upstream side (the lower part of the cylindrical hollow part B) and passage area (passage sectional area) may increase gradually.

That is, compared with the passage area of the toner drop passage C1 of the vertical direction upper part, as shown in FIG. 61, it is set up so that the passage area of the toner drop passage C2 of the vertical direction lower part may become large (C1<C2).

The problem that the toner drop passage is clogged with the toner can be reduced, and smooth toner ejection from the toner outlet W is allowed.

The cap seal 37 is installed between the container main part 33Y and the cap part 34Y, pressed in the direction which resists the force of the mounting direction when the cap part 34Y is attached to the image forming device body 100, the positional relationship of the longitudinal direction of pressing part 34c which projects on the outer circumference surface of the cap part 34Y is optimized. Thereby, in the embodiment 5, the attaching/detaching operation of the toner container 34Y can be smoothly performed, and the sealing characteristic of the container main part 33Y and the cap part 34Y can be maintained at high level without enlarging the cap part 34Y.

Figure 62:
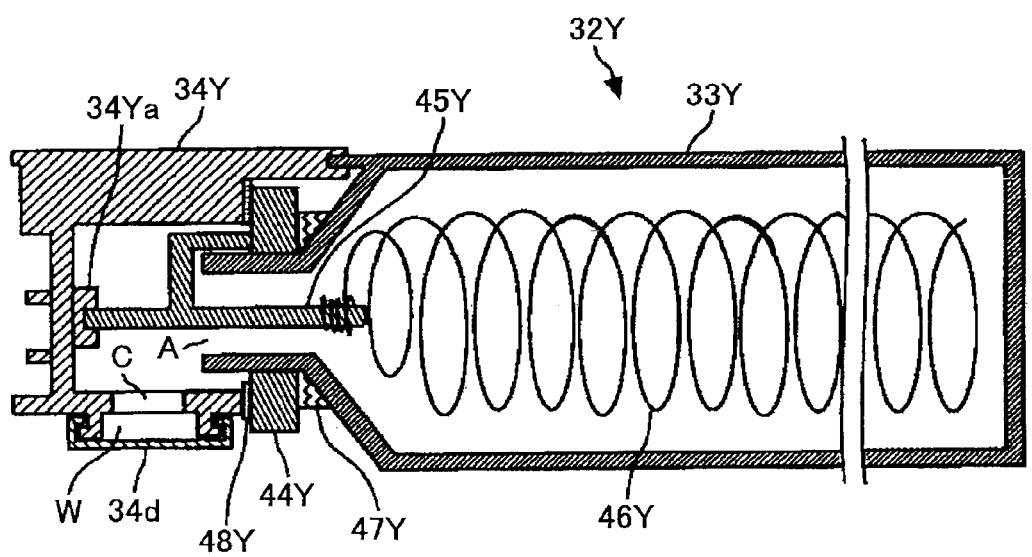
FIG. 62 is a block diagram showing a toner container of another embodiment of the present disclosure.

As shown in FIG. 62, the toner container 32Y is constituted to include the container main part 33Y, the gear 44Y, and the cap part 34Y. The opening A is formed in the head of the container main part 33Y, and the gear 44Y is rotatably installed in the outer circumference part of the opening A. The gear 44Y is provided for engagement with the drive gear of the device body part 100 to rotate the coil 46Y around the rotation axis. The opening A is formed for discharging the toner contained in the container main part 33Y to the space in the cap part 34Y. The rotating shaft 45Y is formed integrally with the gear 44Y and the spiral coil 46Y (conveyance coil) is connected with the rotating shaft 45Y. One end of the rotating shaft 45Y is supported by the bearing 34Ya of the cap part 34Y. The coil 46Y is disposed to extend from the opening A in the container main part 33Y to the bottom.

When the gear 44Y is rotated around the container main part 33Y, the rotating shaft 45Y and the coil 46Y are also rotated. Hence, the toner contained in the container main part 33Y is delivered to the side of the opening A by the toner delivering force of the coil 46Y.

The gear 44Y is inserted in the outer circumference part of the opening A so that the gear is sandwiched between the container main part 33Y and the cap part 34Y. The rubber member 47Y is disposed between the container main part 33Y and the gear 44Y at the end surface side, and the seal member 48Y is disposed between the cap part 34Y and the gear 44Y at the other end surface side.

By the composition, the sealing characteristic of the whole toner container 32Y is maintained. That is, the problem that toner leaks from the space between the gear 44Y, the container main part 33Y, and the cap part 34Y is prevented.

Alternatively, the toner drop passage C in the embodiments 1-4 may be formed similar to the toner drop passages C1 and C2 (see FIG. 61) in the embodiment 5. In such a case, the problem that the toner drop passage C is clogged with the toner can be reduced, and smooth toner ejection from the toner outlet W is allowed.

According to the present disclosure, it is possible to provide a toner container and an image forming device wherein, even if another toner container of a different color or kind is erroneously set to dispose the other toner container in the body of the image forming device, the problem that toner of a different color or kind from the other toner container is supplied accidentally to the image forming device body is prevented.

According to the present disclosure, it is possible to provide a toner container and an image forming device wherein the shutter member that opens or closes the toner outlet is arranged so that the shutter member does not easily move when the toner container is isolated from the image forming device, and plastic deformation of the shutter member does not arise even when the state of the shutter member that opens the toner outlet is continued for a long time.

According to the present disclosure, it is possible to provide a toner container and an image forming device wherein the attaching and detaching operation of the toner container is smoothly performed and the sealing characteristic of the container main part and the cap part is maintained at high level without enlarging the cap part. The present disclosure is not limited to the specifically disclosed embodiments, and variations and modifications may be made without departing from the scope of the present disclosure.

The invention claimed is:

1. A toner container, comprising:
   a toner outlet for discharging toner accommodated in the toner container, the toner container having a longitudinal direction; and
   a shutter configured to open and close the toner outlet, the shutter moving in a direction parallel to the longitudinal direction of the toner container, the shutter including:
      a side wall which projects upwardly from a side of the shutter,
      a front end wall disposed at a front end portion of the shutter which is located at a downstream portion of the shutter along a closing direction of the shutter,
      an upper wall which covers the side wall and the front end wall, and
      an extension extending in a direction opposite to the front end portion of the shutter where the front end wall is disposed.

2. The toner container according to claim 1, wherein:
   the front end wall projects away from a center line of the shutter which is parallel to the longitudinal direction of the toner container,
   wherein the shutter further comprises:
   a projection disposed at the side wall which projects towards the center line of the shutter which is opposite to a direction in which the front end wall projects.

3. The toner container according to claim 2, further comprising:
   a rail,
   wherein the projection is engaged with the rail and the projection moves along the rail.

4. The toner container according to claim 1, further comprising:
   an elastic member disposed on a surface of the shutter which faces the toner outlet.

5. The toner container according to claim 1, wherein the shutter further comprises:
   a second side wall which projects upwardly from the a second side of the shutter;
   a second front end wall disposed at the front end portion of the shutter, and
   a second upper wall which covers the second side wall and the second front end wall.

6. The toner container according to claim 5, wherein:
   the second front end wall projects away from a center line of the shutter which is parallel to the longitudinal direction of the toner container in a direction which is opposite to a direction in which said front end wall projects from the center line,
   wherein the shutter further comprises:
   a first projection disposed at the side wall which projects towards the center line of the shutter which is opposite to a direction in which the front end wall projects
   a second projection disposed at the side second wall which projects in the direction towards the center line of the shutter which is opposite to the direction in which the second front end wall projects.

7. The toner container according to claim 1, wherein the shutter further comprises:
   a second extension extending in the direction opposite to the front end portion of the shutter where the front end wall is disposed,
   wherein the first extension and the second extension are on opposite sides of a center line of the shutter extending in the longitudinal direction away from the front end portion.

8. The toner container according to claim 1, wherein:
   a closing surface of the shutter which covers the toner outlet when the shutter is closed is substantially flat.

9. The toner container according to claim 1, further comprising:
   toner within the toner container.

10. An image forming apparatus comprising the toner container according to claim 1.

11. A toner container, comprising:
   a toner outlet for discharging toner accommodated in the toner container, the toner container having a longitudinal direction; and
   a shutter configured to open and close the toner outlet, the shutter moving in a direction parallel to the longitudinal direction of the toner container, the shutter including:
   a side wall which projects upwardly from a side of the shutter,
   a front end wall disposed at a front end portion of the shutter which is located at a downstream portion of the shutter along a closing direction of the shutter,
   an upper wall which covers the side wall and the front end wall, and
   an extension extending in the longitudinal direction away from the front end portion.

12. A toner container comprising:
   a container body;
   a front portion connected to the container body, the front portion including a toner outlet for discharging toner and a shutter, the toner outlet facing in a downward direction when the toner container is discharging toner,
   the shutter including:
   a center line which is parallel to a length of the toner container;
   a front extending towards a front of the toner container;
   a rear extending towards a rear of the toner container;
   the rear including two extensions each extending towards the rear of the toner container and being on opposite sides of the center line;
   two front projections at the front of the shutter,
      each of the front projections extending upwardly when the toner container is discharging toner,
      the two front projections being on opposite sides of the center line,
      each of the front projections including:
      a side wall projecting upwardly when the toner container is discharging toner,
      a front end wall, connected to a corresponding one of the side walls, facing frontwardly;
      an upper wall, connected to a corresponding one of the side walls and a corresponding one of the front walls, facing upwardly when the toner container is discharging toner; and
      an inward wall extending towards the center line and facing upwardly when the toner container is discharging toner.

13. A toner container according to claim 12, wherein the shutter further comprises:
   a shutter slider at each side of the center line and extending parallel to a direction of the center line, the shutter sliders being rearward on the shutter as compared to a position of the front projections.

14. The toner container according to claim 12, wherein:
   a closing surface of the shutter which covers the toner outlet when the shutter is closed is substantially flat.

15. The toner container according to claim 12, further comprising:
   an elastic member disposed on a surface of the shutter which faces the toner outlet.

16. The toner container according to claim 12, further comprising:
   toner within the toner container.

17. An. image forming apparatus comprising the toner container according to claim 12.

* * * * *